(12) United States Patent
Freeny, Jr.

(10) Patent No.: US 7,110,744 B2
(45) Date of Patent: Sep. 19, 2006

(54) COMMUNICATION AND PROXIMITY AUTHORIZATION SYSTEMS

(75) Inventor: Charles C. Freeny, Jr., Dallas, TX (US)

(73) Assignee: Automated Business Companies, Spring, TX (US)

(*) Notice: Subject to any disclaimer, the term of this patent is extended or adjusted under 35 U.S.C. 154(b) by 388 days.

(21) Appl. No.: 10/205,097

(22) Filed: Jul. 19, 2002

(65) Prior Publication Data

US 2002/0187779 A1 Dec. 12, 2002

Related U.S. Application Data

(63) Continuation of application No. 09/652,077, filed on Aug. 31, 2000, now Pat. No. 6,490,443.

(60) Provisional application No. 60/152,184, filed on Sep. 2, 1999.

(51) Int. Cl.
*H04B 5/00* (2006.01)
*H04M 11/00* (2006.01)
*H04M 17/00* (2006.01)
*G07B 15/00* (2006.01)

(52) U.S. Cl. .................. 455/406; 455/550; 455/552.1; 455/41.2; 379/143; 379/144; 705/13; 705/26; 705/418

(58) Field of Classification Search .............. 455/406, 455/550, 552.1, 41.2; 379/143, 144; 705/13, 705/26, 418
See application file for complete search history.

(56) References Cited

U.S. PATENT DOCUMENTS

| | | | |
|---|---|---|---|
| 5,361,397 A | 11/1994 | Wright | |
| 5,559,504 A | 9/1996 | Itsumi et al. | |
| 5,742,905 A | 4/1998 | Pepe et al. | |
| 5,771,446 A | 6/1998 | Wilkinson | |
| 5,819,234 A * | 10/1998 | Slavin et al. | 340/10.4 |
| 5,825,007 A * | 10/1998 | Jesadanont | 235/384 |
| 6,026,375 A | 2/2000 | Hall et al. | |
| 6,061,557 A | 5/2000 | Lazaridis et al. | |
| 6,078,806 A | 6/2000 | Heinonen et al. | |
| 6,091,956 A * | 7/2000 | Hollenberg | 455/456.5 |
| 6,101,483 A | 8/2000 | Petrovich et al. | |
| 6,169,890 B1 * | 1/2001 | Vatanen | 455/406 |
| 6,195,541 B1 | 2/2001 | Griffith | |
| 6,259,376 B1 * | 7/2001 | Fuyama | 340/928 |
| 6,263,316 B1 * | 7/2001 | Khan et al. | 705/13 |
| 6,490,443 B1 * | 12/2002 | Freeny, Jr. | 455/406 |

* cited by examiner

*Primary Examiner*—Matthew Anderson
*Assistant Examiner*—Yuwen Pan
(74) *Attorney, Agent, or Firm*—Dunlap, Codding & Rogers, P.C.

(57) ABSTRACT

A proximity service unit for providing at least one predetermined service for use with multiple types of wireless devices. The proximity service unit includes a multiple channel wireless transceiver, a proximity unit validation assembly, and a legacy activation unit. The multiple channel wireless transceiver receives at least two signal types, such as infrared region signals, 900 MHz region signals, 1.8 GHz region signals, and 2.4 GHz region signals. The multiple channel wireless transceiver receives a request authorization code from each of a plurality of respective wireless devices such that the plurality of wireless devices communicate simultaneously with the multiple channel wireless transceiver without air time. The proximity unit validation assembly communicates with the multiple channel wireless transceiver and receives and validates the plurality of request authorization codes received by the multiple channel wireless transceiver. The legacy activation unit receives a service authorization code and provides at least one predetermined service for each wireless device providing the request authorization code resulting in a service authorization code.

19 Claims, 41 Drawing Sheets

| Unique Features | Shared legacy Functions | Features Shared with other PATAS systems |
|---|---|---|
| 1. Accepts Multiple Wireless signals from multiple devices simultaneously within predetermined distances | 1. Utilizes the existing collection and Housing Mechanisms in Pay phones | 1. The complete capabilities can be utilized in the ATM, Store checkout, Building and Hotel systems |
| 2. Communicates locally with the wireless device to avoid air time charges | 2. Utilizes all the capabilities of legacy digital wireless phones except the high powered wireless communication functions | 2 Limited channel capacity versions can be incorporated into subway systems |
| 3. Incorporates Biometrics from either the pay phone or wireless device | 3. Utilizes all the functions currently incorporated in communication Kiosks | 3. The Biometrics features can be incorporated into all PATAS systems |

Figure 18

| Unique Features | Shared legacy Functions | Features Shared with other PATAS systems |
|---|---|---|
| 1. Accepts Multiple Wireless signals from multiple wireless devices simultaneously within predetermined distances | 1. Utilizes the existing collection and Housing Mechanisms in Pay phones | N/A |
| 2. Communicates locally with the wireless device to avoid air time charges | 2. Utilizes all the capabilities of legacy digital wireless phones except the high powered wireless communication functions | N/A |
| 3. Incorporates Biometrics from either the pay phone or wireless device | 3. Utilizes all the functions currently incorporated in communication Kiosks | N/A |

Figure 19

| Unique Features | Shared Legacy Functions | Features shared with other PATAS Systems |
|---|---|---|
| 1. Accepts signals from multiple wireless devices within predetermined distances | 1. Utilizes existing authorization and activation systems | 1. Dual distance signaling features used in ATM, Subway, store and meter systems |
| 2. Authorizes at one distance and activates at a closer distance | 2. Utilizes secure code features of digital wireless devices | |
| 3. Incorporates VIN and customer ID data into wireless device and can only be accessed by toll authority systems | | |

Figure 20a

| Unique Features | Shared Legacy Functions | Features shared with other PATAS Systems |
|---|---|---|
| 1. Accepts signals from multiple wireless devices within predetermined distances | 1. Utilizes existing authorization and activation systems | 1. Dual distance signaling features used in ATM, Subway, store and meter systems |
| 2. Authorizes at one distance and activates at a closer distance | 2. Utilizes secure code features of digital wireless devices | |
| 3. Incorporates Credit data into wireless device and delivered to transportation authority | | |

Figure 20b

| Unique Features | Shared Legacy Functions | Features shared with other PATAS Systems |
|---|---|---|
| 1. Accepts signals from multiple wireless devices within predetermined distances | 1. Utilizes existing authorization and activation systems | 1. Dual distance signaling features used in ATM, Subway, store and meter systems |
| 2. Authorizes PPS service at one distance and activates ATM at a closer distance | 2. Utilizes secure code features of digital wireless devices | |
| 3. Incorporates Credit & customer ID data into wireless device | | |

Figure 21

| Unique Features | Shared Legacy Functions | Features shared with other PATAS Systems |
|---|---|---|
| 1. Accepts signals from multiple wireless devices within predetermined distances | 1. Utilizes existing authorization and activation systems | 1. Dual distance signaling features used in Toll, ATM, Subway, store and meter systems |
| 2. Authorizes PPS service at one distance and activates Access Unit at closer distance | 2. Utilizes secure code features of digital wireless devices | |
| 3. Incorporates Credit customer ID data into wireless device | | |

Figure 22a

| Unique Features | Shared Legacy Functions | Features shared with other PATAS Systems |
|---|---|---|
| 1. Accepts signals from multiple wireless devices within predetermined distances | 1. Utilizes existing authorization and activation systems | 1. Dual distance signaling features used in Toll, ATM, Subway, store and meter systems |
| 2. Authorizes Collection service at one distance and activates meter Unit at closer distance | 2. Utilizes secure code features of digital wireless devices | |
| 3. Incorporates Credit customer ID data into wireless device | | |

Figure 22b

| Unique Features | Shared Legacy Functions | Features shared with other PATAS Systems |
|---|---|---|
| 1. Accepts signals from multiple wireless devices within predetermined distances<br>2. Authorizes and activates service at one Predetermined distance<br>3. Incorporates Owner ID data into wireless device | 1. Utilizes existing authorization and activation systems<br>2. Utilizes secure code features of digital wireless devices | 1. Accepts signals from multiple wireless devices within a predetermined distance |

Figure 23a

| Unique Features | Shared Legacy Functions | Features shared with other PATAS Systems |
|---|---|---|
| 1. Accepts signals from multiple wireless devices within predetermined distances<br>2. Authorizes and activates services at one distance and door at a closer distance<br>3. Allows Door to be secured from inside room and hotel services to be accessed such as SPA | 1. Utilizes existing authorization and activation systems<br>2. Utilizes secure code features of digital wireless devices | 1. Accepts signals from multiple wireless devices within a predetermined distance<br>2. Lets owner access PPS services |

Figure 23b

| Unique Features | Shared Legacy Functions | Features shared with other PATAS Systems |
|---|---|---|
| 1. Accepts signals from multiple wireless devices within predetermined distances | 1. Utilizes existing authorization and activation systems | 1. Accepts signals from multiple wireless devices within a predetermined distance |
| 2. Authorizes and activates services at more than two distances | 2. Utilizes secure code features of digital wireless devices | 2. Operates at least two types of services |
| 3. Incorporates Owner ID and home data into wireless device | | |

Figure 23c

| Unique Features | Shared Legacy Functions | Features shared with other PATAS Systems |
|---|---|---|
| 1. Accepts signals from multiple wireless devices within a predetermined distance
2. Authorizes and activates service at one close distance
3. Incorporates Owner ID and Credit data into wireless device and will not operate if device high power is activated | 1. Utilizes existing authorization and activation systems
2. Utilizes secure code features of digital wireless devices | 1. Accepts signals from multiple wireless devices within a predetermined distance |

Figure 24

| Unique Features | Shared Legacy Functions | Features shared with other PATAS Systems |
|---|---|---|
| 1. Accepts signals from multiple wireless devices within predetermined distances
2. Authorizes and activates different services within selected predetermined distances
3. Allows Customer ID to be entered into store and other services such as PPS when inside store | 1. Utilizes existing authorization and activation systems
2. Utilizes secure code features of digital wireless devices | 1. Accepts signals from multiple wireless devices within a predetermined distance
2. Lets owner access PPS services |

Figure 25

| Unique Features | Shared Legacy Functions | Features shared with other PATAS Systems |
|---|---|---|
| 1. Accepts signals from multiple wireless devices within predetermined distances
2. Authorizes and activates different services within selected predetermined distances
3. Owner ID & VIN to be entered into ignition system and door key not required –Anti Theft—Toll--AVM | 1. Utilizes existing authorization and activation systems
2. Utilizes secure code features of digital wireless devices | 1. Accepts signals from multiple wireless devices within a predetermined distance |

Figure 26

| Unique Features | Shared Legacy Functions | Features shared with other PATAS Systems |
|---|---|---|
| 1. Accepts signals from multiple wireless devices within predetermined distances
2. Authorizes Carrier credit machine one distance and activates PPS at farther distance
3. Incorporates Credit & customer ID data into wireless device | 1. Utilizes existing authorization and activation systems
2. Utilizes secure code features of digital wireless devices | 1. Dual distance signaling features used in ATM, Subway, store and meter systems
2. Accepts Signals from multiple wireless devices |

Figure 27

| Unique Features | Shared Legacy Functions | Features shared with other PATAS Systems |
|---|---|---|
| 1. Accepts signals from multiple wireless devices within predetermined distances
2. Authorizes and activates different services within selected predetermined distances
3. Owner ID and credit in device supplied by Vending Machine ISP | 1. Utilizes existing authorization and activation systems
2. Utilizes secure code features of digital wireless devices | 1. Accepts signals from multiple wireless devices within a predetermined distance
2. Utilizes PPS in break room machines |

Figure 28

COMMUNICATION AND PROXIMITY AUTHORIZATION SYSTEMS

CROSS REFERENCE TO RELATED APPLICATIONS

The present patent application is a continuation application of U.S. Ser. No. 09/652,077, filed Aug. 31, 2000, now U.S. Pat. No. 6,490,443, which claims the benefit of U.S. provisional patent application identified by U.S. Ser. No. 60/152,184, entitled "New Communication and Proximity Authorization Systems", which was filed on Sep. 2, 1999.

STATEMENT REGARDING FEDERALLY SPONSORED RESEARCH OR DEVELOPMENT

Not applicable.

SUMMARY OF THE INVENTION

The present invention relates to a pico pay phone system (PPS). The present invention will allow multiple wireless devices to access a single pay phone or other public kiosk communication unit designed to detect and recognize multiple wireless service providers' signals and protocols at the same time. In particular, the invention is directed to services provided by either public communication companies, such as SWBT or GTE, or kiosk companies, such as Air Touch, located in airports and large hotels along with private company services, such as offered by DirectTV and AT&T Cable (formally TCI). The preferred embodiment has a minimum of four types of wireless signaling detection capabilities such as Infrared, 900 Mhz, 1.8 Ghz and one other FCC-approved signaling detection capability plus the frequency of the original wireless specialty device if the proximity system already has such a design (for example in the case of Digital Cable Systems there is a remote control unit). For each of the distinct communication capabilities, the PPS has an automatic detection system to recognize both the type of service and service provider protocols and wireless device features. The system has wireless base station multiple channel capability on the input side for each of the types of signals (Infrared, 900 Mhz, 1.8 Ghz, etc.) and multiple channel time division multiplex (TDM) capability on the output side using a standard high speed switch connected to, for example, a T1 line (or several T1 lines) such as used in most office buildings or network service provider systems today. Thus, a single unit can easily service several hundred phones simultaneously for, for example, $0.35 cents each. This will potentially bring in several thousand dollars a day per phone or kiosk instead of less than a hundred dollars a day for existing pay phones and kiosks. In addition, the preferred embodiment has a biometrics recognition system for ID and credit transaction services. The PPS can also issue access numbers to people so they do not have to stand in line and wait to access the service when they have to pay real money because they are not recognized by the credit authorization system of the Invention.

The Proximity Authorization Transaction System (PATAS) invention is first directed to a general multiple signal frequency transceiver transaction unit (also referred to herein as a multiple channel wireless transceiver) designed to operate with most of the wireless device frequency signal types approved by the FCC for the digital cell phone, pager, and Infrared devices in use today and that will be in use during the next 10 years that can be used or adapted to most any proximity system. Then descriptions of adapting PATAS for each of the more specific proximity systems (also referred to herein as proximity service units) are provided, along with the inclusion of the cross features shared by some of the systems, such as the incorporation of the PPS invention into an ATM unit along with other ATM features.

The specific improved proximity systems include, but are not limited to, proximity systems such as (1) vehicle toll systems (2) subway and bus systems, (3) vehicle systems, (4) ATM systems, (5) buildings and hotel systems, (6) home access systems (7) garage door systems, (8) parking lot systems (9) parking meter systems, (10) store checkout systems, (11) gas dispensing systems (12) mobile transportation credit systems and (13) vending machine systems, and (14) large public or private facility systems, such as entertainment facilities, that network any combination of the proximity systems (1) through (13) together to have an integrated facility management system. For example, the entertainment facility could be a stadium having ATM systems, store checkout systems, parking lot systems, parking meters systems, and vending machine systems which are networked and integrated together such that a consumer need only use a wireless device as discussed herein to activate and thereby receive each of these services or goods.

The present invention also relates to a master proximity signaling unit MPSU (also referred to herein as a proximity authorization unit). The MPSU is an alternative to having to pay for high power wireless communication devices and/or services, such as a cell phone or pager or hand held computer with wireless communication features just to get the convenience of a single device handling most of the proximity services people use in their daily lives. The MPSU incorporates multiple low power type signaling capability into a low cost device specifically designed to allow all the multiple proximity services authorization devices to be incorporated into a single unit. The single unit can deliver the information to the proximity service provider machine (also referred to herein as a proximity service unit) in a much simpler and more convenient manner than done with existing devices and at less cost. In addition the MPSU can be used to communicate over local pico payphone networks as described in the application (Pico Phone). Thus the Invention described herein allows the consumer to have a very inexpensive proximity authorization unit to replace the 10 to 20 devices and cards now required and that also can serve as an inexpensive communication device without the wireless service provider costs attached. In essence the invention can replace all the cards, keys, signaling devices, and communication devices with a single unit that is lightweight and easy to carry.

DESCRIPTION OF THE SEVERAL VIEWS OF THE DRAWINGS

FIG. 18 is a table that summarizes the special features and functions of the Pico Pay System.

FIG. 19 is a table that summarizes the special features and functions of the general PATAS.

FIG. 20a is a table that summarizes the special features and functions of the vehicle phone system.

FIG. 20b is a table that summarizes the special features and functions of the subway/bus system.

FIG. 21 is a table that summarizes the special features and functions of the ATM System.

FIG. 22a is a table that summarizes the special features and functions of the parking system.

FIG. 22b is a table that summarizes the special features and functions of the parking meter system.

FIG. 23a is a table that summarizes the special features and functions of the garage access and control system.

FIG. 23b is a table that summarizes the special features and functions of the building and hotel system.

FIG. 23c is a table that summarizes the special features and functions of the house access and control system.

FIG. 24 is a table that summarizes the special features and functions of the gas dispensing system.

FIG. 25 is a table that summarizes the special features and functions of the store checkout system.

FIG. 26 is a table that summarizes the special features and functions of the vehicle system.

FIG. 27 is a table that summarizes the special features and functions of the mobile transportation credit system.

FIG. 28 is a table that summarizes the special features and functions of the vending machine system.

DETAILED DESCRIPTION OF THE INVENTION

Pico Pay System

Figure 1:
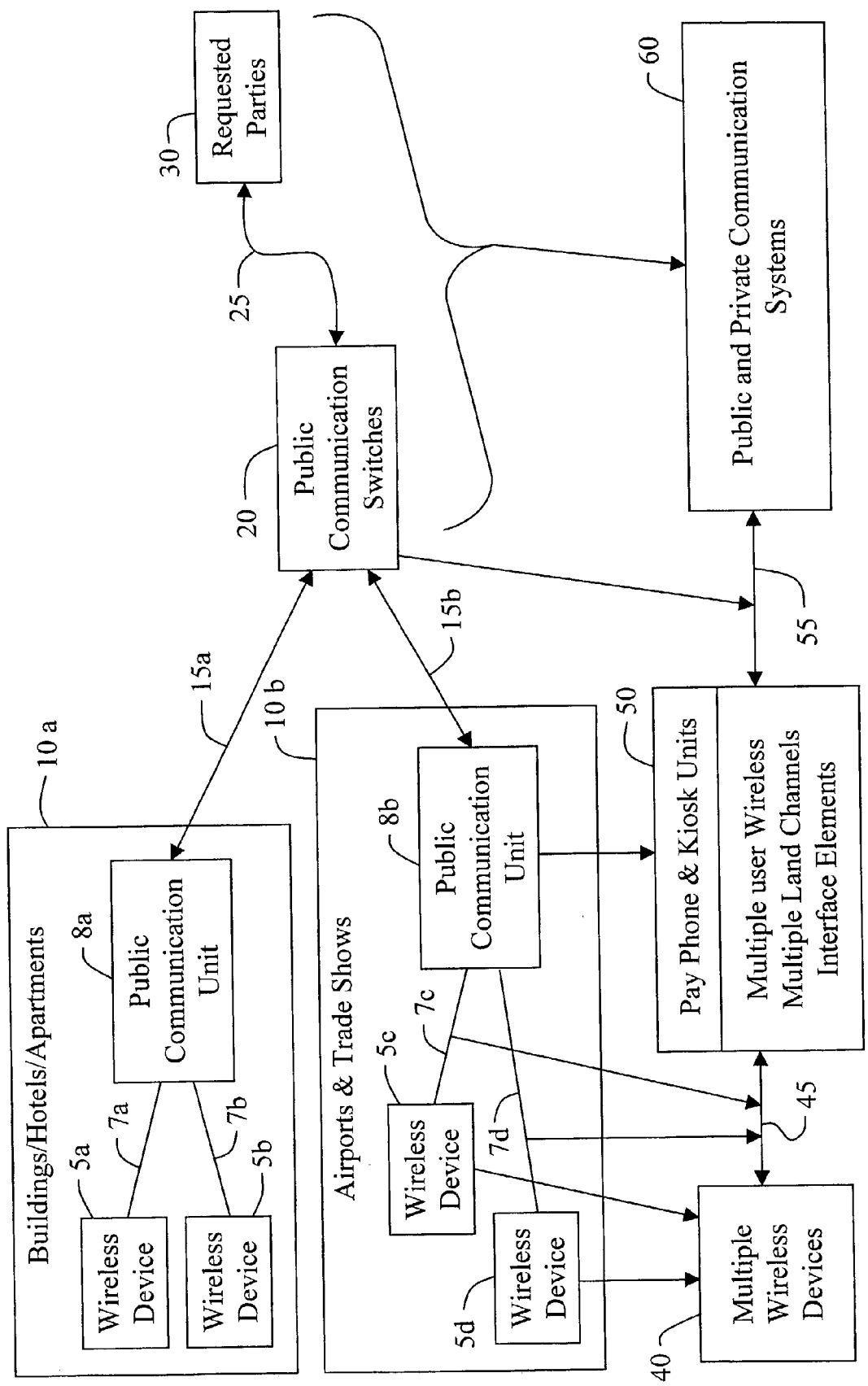
FIG. 1 is a block diagram showing the basic elements of the Pico PaySystem (PPS).

The terms "no air time", "do not require air time", "no air time costs", "no customer air time charges", "without air time" or similar terms, as used herein mean that when a communication is made between a wireless device and some type of service provider, such as a pay phone system, vending machine system, toll collection system, credit card system, ATM (automated teller machine) system, vehicle system, subway or toll booth system, checkout station system, parking meter system, mobile credit system, or the like, a commercial communication service provider, such as Air Touch Communications, Sprint or the like, is not activated and the user or customer is not charged air time. Thus, the terms "no air time", "do not require air time"! "no air time costs", "no customer air time charges", "without air time" or similar terms refer to the communication being made between the wireless device and the service provider without using commercial airwave communication channels.

The various aspects of a pico pay system (PPS) 6 invention can be described with the aid of FIGS. 1 through 6. The general operation will be described with the aid of FIG. 1 in which an airport and trade show scenario 10b and building/hotel/apartment scenario 10a are depicted. In both cases, public communication units 8a and 8b (functionally shown as public communication unit 50) are shown that takes both the conventional single pay phone caller in the conventional fashion but also connects multiple wireless devices 5a, 5b, 5c, and 5d (functionally shown as wireless devices 40) to their respectively requested telephone numbers via lines 7a,7b,7c, and 7d (functionally shown as 45) and via lines 15a, and 15b (functionally shown as 55) using the public communication system 60 that functionally represents connections through the required public communication switches 20, last mile connections 25 and ultimately to the requested parties 30 during the same time period. During the remainder of the description it will be understood that multiple wireless devices 40 are connected to the public communication units 50 and the public communication system 60 during the same time period. Also it will be understood that the wireless devices such as 5a, 5b, and 5d can be made by different suppliers and can be operating at least on one of three different signaling frequencies such as an Infrared region, 900 Mhz region and 1.8 Ghz region and different protocols as designed by the manufacturer in their different models.

For example the public communication unit 50 can detect and service a simple wireless home phone (wireless device 40) and simultaneously a sophisticated portable computer (wireless device 40) or PDA (wireless device 40) that has an infrared modem with multimedia capability. The public communication unit 50 also can detect the popular analog and digital cell and pager phones made by Motorola, Nokia, Ericsson, NEC and others. In addition the public communication unit 50 anticipates advanced wireless devices such as those described in co-pending applications (Ser. No. 09/325,500), which is hereby expressly incorporated herein by reference, and a MPSU (i.e., a proximity authorization unit described hereinafter) that have fingerprint authorization features and capability built in to interface with pay phones of the type described herein.

Figure 2:
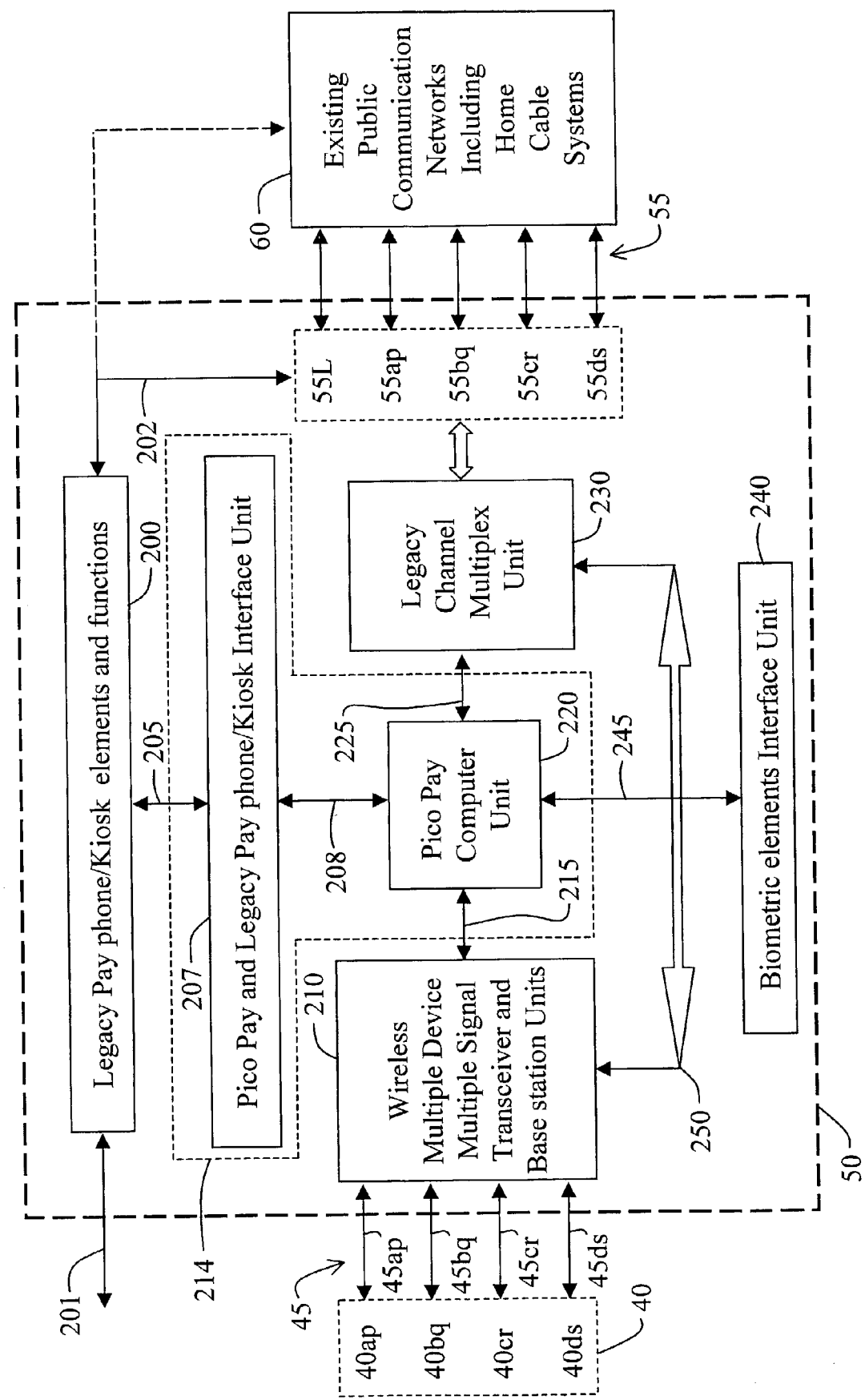
FIG. 2 is a block diagram showing the elements for controlling simultaneous multiple wireless inputs and the multiple land line connections.

With the aid of FIG. 2 the elements for interfacing with these multiple type wireless devices 40 in a simultaneous manner are described where the wireless devices 40 and the public communication unit 50 are shown in greater detail.

Four wireless devices 40 are shown and designated by the reference numerals 40a, 40b, 40c and 40d. The public communication unit 50 has multiple channels, and thus can have several wireless devices 40 connected represented by 40ap, 40bq, 40cr and 40ds where p, q, r, and s each can be any number up to several hundred. The wireless devices 40 are connected to the public communication unit 50 via wireless links 45ap, 45bq, 45cr and 45ds where as a conventional pay phone caller is physically connected to public communication unit 50 via line 201 using the legacy pay phone equipment represented by 200. The conventional caller is connected to the requested party in the conventional manner via line 202 connected to the public communication system 60 via line 55I.

Figure 3:
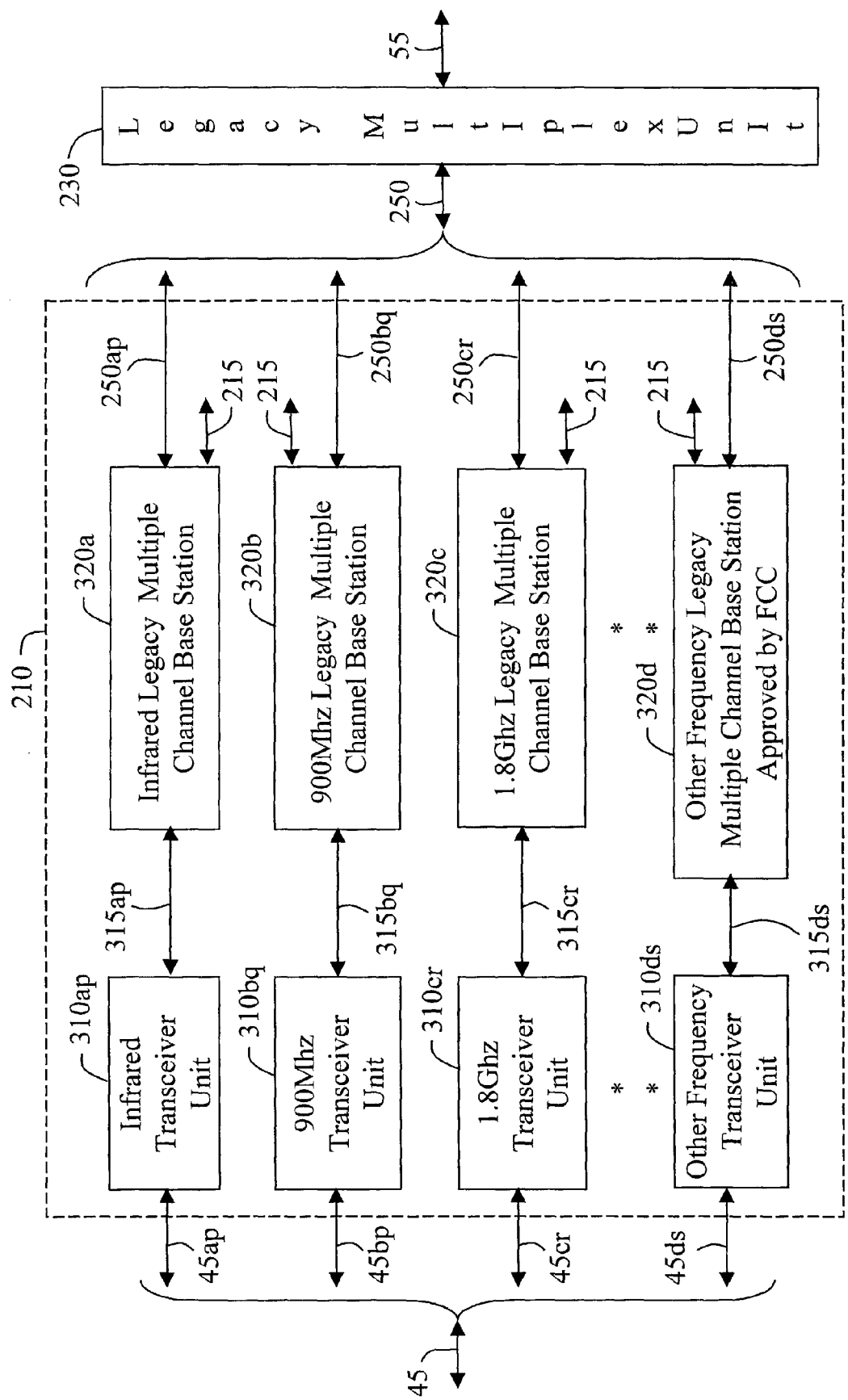
FIG. 3 is a block diagram showing the multiple signal detection elements and legacy wireless base station units.

The wireless device callers are connected to their respective requested parties via a wireless device front end unit 210 described in more detail in FIG. 3 via a multiple line bus 250 controlled by a computer unit 220 (such as a Motorola 68000 series communication computer chip) and a legacy line multiplex unit 230 such as a using Multiplex unit out of a MGX 8800 series unit made by Cisco Inc. that can map up to 10,000 lines to a single port. The legacy line multiplex unit 230 connects each of the wireless devices 5a, 5b, 5c and 5d to their respective parties over a single wide bandwidth line 55 using different TDM channels represented by the group 55ap for the wireless devices connected via 45ap connections, 55bq for the wireless devices connected via connections 45bq, etc. Thus up to several hundred wireless callers can each use the same pay phone/Kiosk (public communication unit 50) at the same time as a single conventional caller uses the phone in a physical manner. In addition, the public communication unit 50 can have a biometric unit 240 controlled by the PPS computer unit 220 in which an available legacy fingerprint unit installed in the biometric unit 240 (such as a Veriprint 2100 model from Biometric Inc.) is used for additional authorization means when requested by the service provider before supplying the requested service data such as bank records or money transfers. The heart of the computer unit 220 can be any of a number of DSP Motorola computers like a MC68230 easily programmable by those skilled in the art or in the case of a Kiosk unit a low cost network dual purpose computer such as a Dell 1300 series using a Linux operating system can be used to control the PPS elements as well as other customer service features that might be provided by the Kiosk unit. The computer unit 220 has all of the other normal computer elements (not shown) required to operate such as RAM and permanent memory elements.

Figure 4:
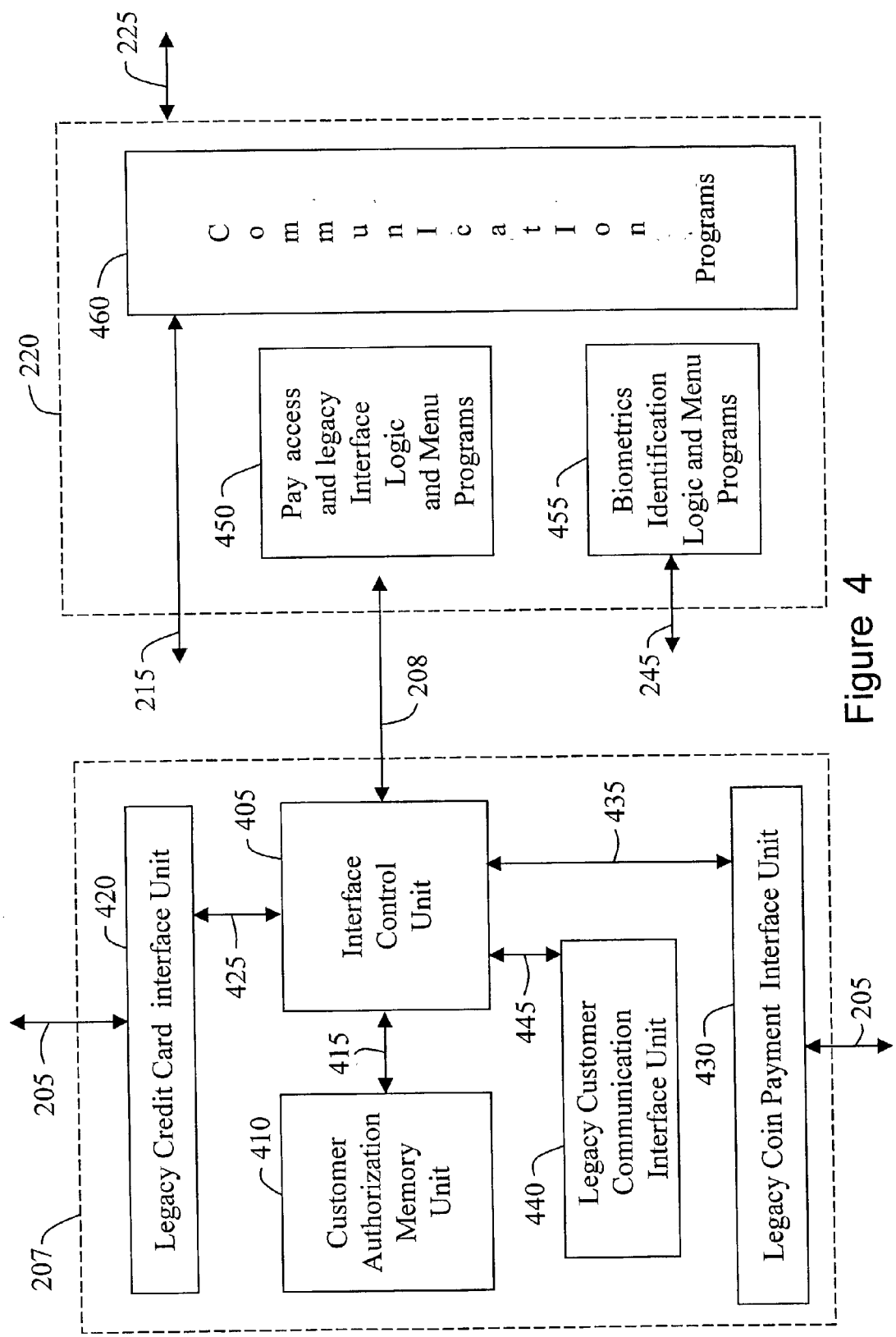
FIG. 4 is a block diagram showing the computer interface programs and legacy unit interface elements.

The functions to be programmed are described in connection with FIGS. 2, 3 and 4 and except for the various payment methods described in connection with FIG. 4. The computer unit 220 programs are primarily interface programs to the communication operating systems available with the legacy equipment. The computer unit 220 interfaces via line 208 with the legacy pay phone or Kiosk existing physical equipment and functions 200 via a PPS interface unit 207 (and described in more detail in connection with FIG. 4).

The legacy pay phone equipment 200 has equipment such as the keyboard input unit, coin payment unit, credit card reader equipment, and audio/video customer interface units available in most public communication payment units in use today and is connected to the PPS interface unit 207 via line 205 to ensure that all of the added PPS equipment and control circuits have the proper electrical, mechanical and timing interface matches with the existing legacy pay phone equipment 200. In the case of a completely new unit that incorporates the PPS features the manufacturer can integrate all of the features described herein with the legacy features of single connect physical connect payphones and Kiosks.

The computer unit 220 controls the timing and connection administration via line 215 connected to the wireless device front end unit 210 described in connection with FIG. 3 and the legacy line multiplex unit 230 via line 225 described earlier.

The communication heart of the PPS is the wireless device front end unit 210 of FIG. 2 that is shown in more detail in FIG. 3. The wireless device front end unit 210 is the basis for the independent claims involving a multiple signal type transaction authorization unit (also referred to herein as a multiple channel wireless transceiver).

In general, the wireless device front end unit 210 includes a multiple channel wireless transceiver 212 capable of receiving at least two signal types. The multiple channel wireless transceiver 212 receives a request authorization code from each of a plurality of the wireless devices 40 such that the plurality of wireless devices 40 communicate simultaneously with the multiple channel wireless transceiver 212 without air time. Each wireless device 40 is capable of communicating the request authorization code when the wireless device 40 is within a predetermined proximity distance from the multiple channel wireless transceiver 212 and each request authorization code uniquely identifies the wireless device 40 from which the request authorization code is received.

In FIG. 3 the elements of the preferred embodiment of the wireless device front end unit 210 (which may or may not be located in the same housing as the other PPS elements) are shown where for example the wireless devices 40*ap* use Infrared signaling and are connected to Infrared transceiver units 310*ap* via lines 45*ap*. The infrared transceiver units 310*ap* are connected to a multiple channel Infrared antenna capable of communicating with multiple wireless devices 40*ap* up to at least a predetermined proximity distance such as a hundred feet. The infrared transceiver units 310*ap* can be obtained from Texas Instruments, for example.

The infrared transceivers 310*ap* (these might be separate units or a single multiplexed unit) are connected to a legacy Infrared Base station unit 320*a* via line 315*ap* that can handle several hundred channels simultaneously. Each authorized channel 250*ap* is connected to the multiple line Bus 250 when an authorization signal is provided to the legacy infrared base station unit 320*a* from the computer unit 220 via line 215.

The connection authorization is made either by obtaining authorization from a credit card or entering a request authorization code provided by physical pay numbering described in more detail in connection with FIG. 4. The request authorization code described above is for the access to the public communication system 60 and does not authorize long distance or other services wherein payment fees depend on the service provided.

For example when a wireless (or physical caller) dials a 1-800 number authorization would most likely be automatically given as soon as the 1-800 was decoded by the legacy infrared base station unit 320*a* and sent to the computer unit 220 via line 215 for processing as is currently the case with most public pay phone systems.

The other type of wireless devices 40*bq*, 40*cr* and 40*ds* are described to operate in a manner similar to that just described. The 900 Mhz devices connection procedure are described by repeating the above description and replacing elements 45*ap*, 310*ap*, 315*ap*, 320*a*, 255*ap* above with 45*bq*, 310*bq*, 315*bq*, 320*b* and 255*bq* respectively along with replacing the word "Infrared" with "900 Mhz". The 1.8 Ghz device group and other frequency wireless device group are similarly described by substituting the elements 45*cr*, 310*cr*, 15*cr*, 20*c* and 255*cr* for 1.8 Ghz devices and 45*ds*, 310*ds*, 315*ds*, 315*d*, and 255*ds* for other wireless frequency groups approved by the FCC. Base station capability for the 900 Mhz and 1.8 Ghz are readily available from suppliers such as the GSN dual mode model 900/1800 from Nokia.

In summary, the heart of the PPS communication operation is the ability to handle many types of wireless devices 5*a*, 5*b*, 5*c* and 5*d*, (or 40*a*, 40*b*, 40*c* and 40*d*) both in terms of device signaling frequencies and in terms of device protocols. The device protocol capability is discussed in more detail in connection with FIG. 6.

As discussed in connection with the prior art there has been very little done to service multiple wireless devices even in the private market because there is very little incentive for a wireless LAN (WLAN) vendor to have multiple capability within the same customer complex. It is much easier to tell the customer to use the same type of WLAN than trying to anticipate the different types of wireless devices 5*a*, 5*b*, 5*c* and 5*d* a customer might purchase. Thus the advantage of designing a multiple wireless signal type interface (WLAN) unit for the public market is that the consumer has already demonstrated the willingness to pay for wireless interconnect convenience.

The public communication unit 50 is also provided with a proximity unit validation assembly 214 communicating with the multiple channel wireless transceiver 212. The proximity unit validation assembly 214 receives and validates the plurality of request authorization codes received by the multiple channel wireless transceiver 212 and outputs a service authorization code in response to each of the request authorization codes upon validating the respective request authorization code.

To provide for both coin and credit transactions special types of access numbering methods must be utilized so several hundred customers do not have to stand in line waiting for access to a single unit. One such system can be described with the aid of FIG. 4. The PPS interface unit 207 is provided with a customer authorization memory unit 410 that keeps track of what wireless customer is assigned what active number. The active numbers range from 0001 to 9999 for example so that up to 10,000 wireless devices 5*a*, 5*b*, 5*c* and 5*d* can be serviced simultaneously if required for example in a large building such as a hotel during a large trade show such as COMDEX. The purpose of keeping track of the wireless customers is two fold. One reason is to control the legacy line multiplex unit 230 connecting the Public communication system party to the respective wireless device 5*a*, 5*b*, 5*c* and 5*d*. The second reason is that if the wireless device owner pays by coin then a request authorization code is given to the wireless device owner (say number 0026) so that the wireless device owner can enter the request authorization code at his convenience as long as the request authorization code is entered before some predetermined time later (say 15 minutes) and the owners wireless device 5*a*, 5*b*, 5*c* and 5*d* will be connected to an outside line.

This is similar to taking a number when entering a service office so that you do not have to stand in line while waiting for the service. Only this is better because as soon as the wireless device owner is ready for the service after getting the request authorization code, they can have the service. The request authorization codes are assigned by the computer unit 220 either after a signal via line 215 that is generated each time a request by one of the wireless transceiver units 310, such as the infrared transceiver units 310*ap*, signals it needs a new number because a new customer device 40 is trying to get service.

The computer unit 220 then generates a number not currently in use and starts a timer that will run a predetermined time unless turned off because time has expired or a public communication connection is made via line 55.

If the timer expires before a connection is made the customer number is released in the available customer number pool and the wireless device 5*a*, 5*b*, 5*c* and 5*d* must be reconnected by the same process. In cases where the wireless device customer 40 wants to pay by coin, voice (and/or display) instructions are given to the customer via line 215 to the wireless device front end unit 210 and to the wireless device 40 via 45 that are derived from a legacy communication unit 440 that is activated by an interface controller 405 via line 445 once the computer unit 220 signals that the wireless customer wants to pay by coin.

This option is always available to the wireless device owner and is given to him each time he tries to makes a connection. Once the customer notifies they want to pay by coin the legacy pay phone equipment 200 is told what money to expect by the interface controller 405 via line 435 to a legacy coin payment interface unit 430. The legacy coin payment interface unit 430 sends a signal to the legacy pay phone equipment 200 via line 205 and the legacy pay phone equipment 200 then notifies the legacy coin payment interface unit 430 via line 205 that a valid payment has been made. Then the service authorization code is sent to the interface controller 405 via line 435 which in turn notifies the computer unit 220 via line 208 that a connection is authorized by coin payment.

Figure 5:
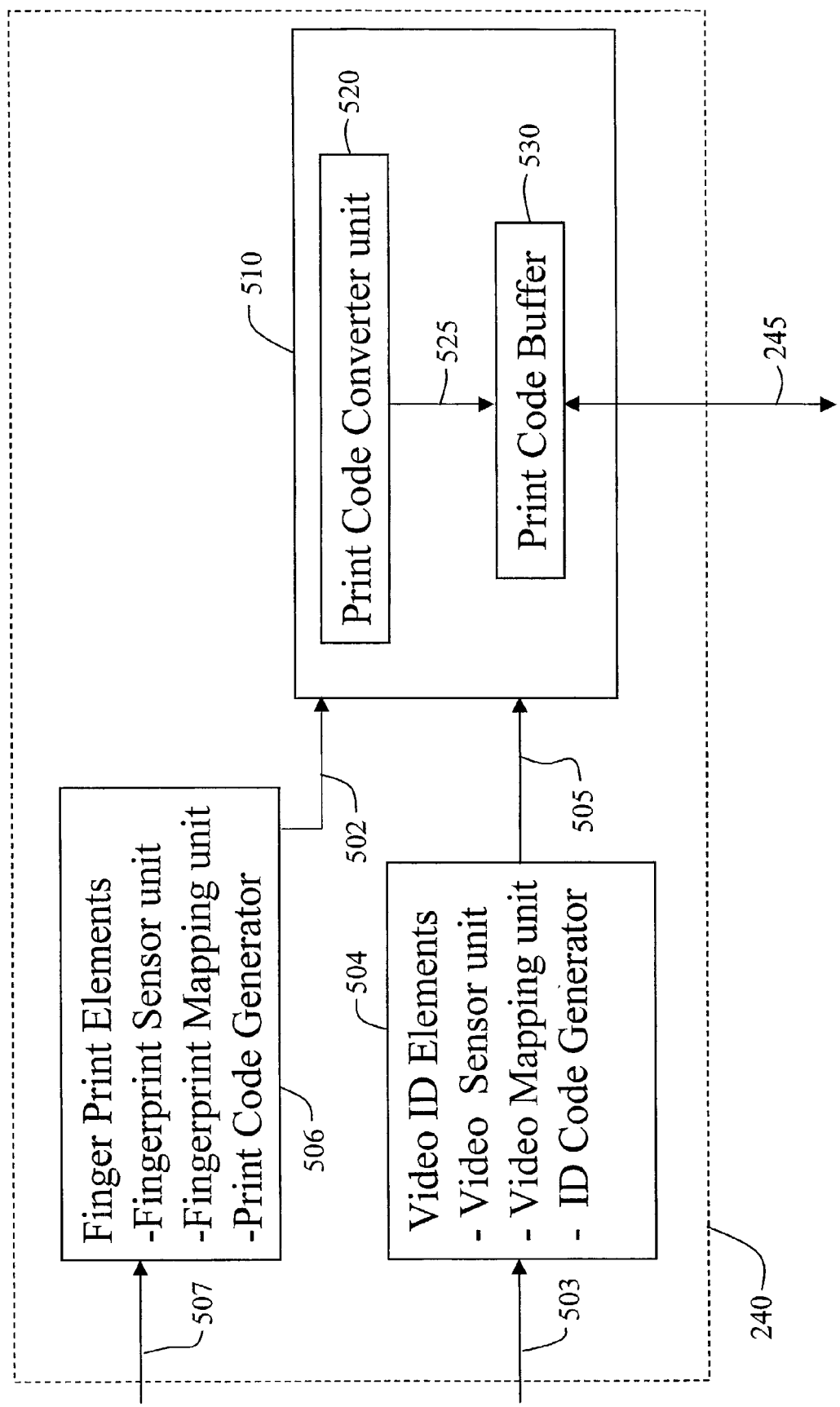
FIG. 5 is a block diagram showing the biometric adapter interface elements.

In anticipation that credit card and other sensitive monetary e-commerce transactions will require Biometric identification in the future the biometric unit 240 is incorporated into the PPS housing and the elements are shown in greater detail in FIG. 5. The biometric unit 240 has a legacy fingerprint detector 506 and an Iris detection element 504 (such as incorporated in the model 2100 from Biometerics Inc. and a Quickcam video element) connected to a biometrics adapter unit 510 via lines 502 and 505 whose function is to convert the legacy detector signals into the electrical and format for the interface controller 405 via the print code converter unit 520. The converted detector signals are transmitted to a buffer unit 530 via line 525. The buffer unit 530 outputs the detector signals to the computer unit 220 via line 245. It might be noted that the print code converter unit 520 and the buffer unit 530 might well be incorporated into the computer unit 220 but are shown here as separate for the sake of clarity. Any instructions required to be given the customer regarding when and how to use the legacy finger print detector 506 or iris detection element 504 are stored in the computer unit 220 memory unit and delivered to the customer in a manner similar to that described in connection with the payment methods associated with FIG. 4. With the functions discussed for both FIG. 4 and FIG. 5, the customer will have to have physical contact or very close proximity (less than two feet) with the PPS unit to perform the coin payment and fingerprint or video identification functions respectively.

Figure 6:
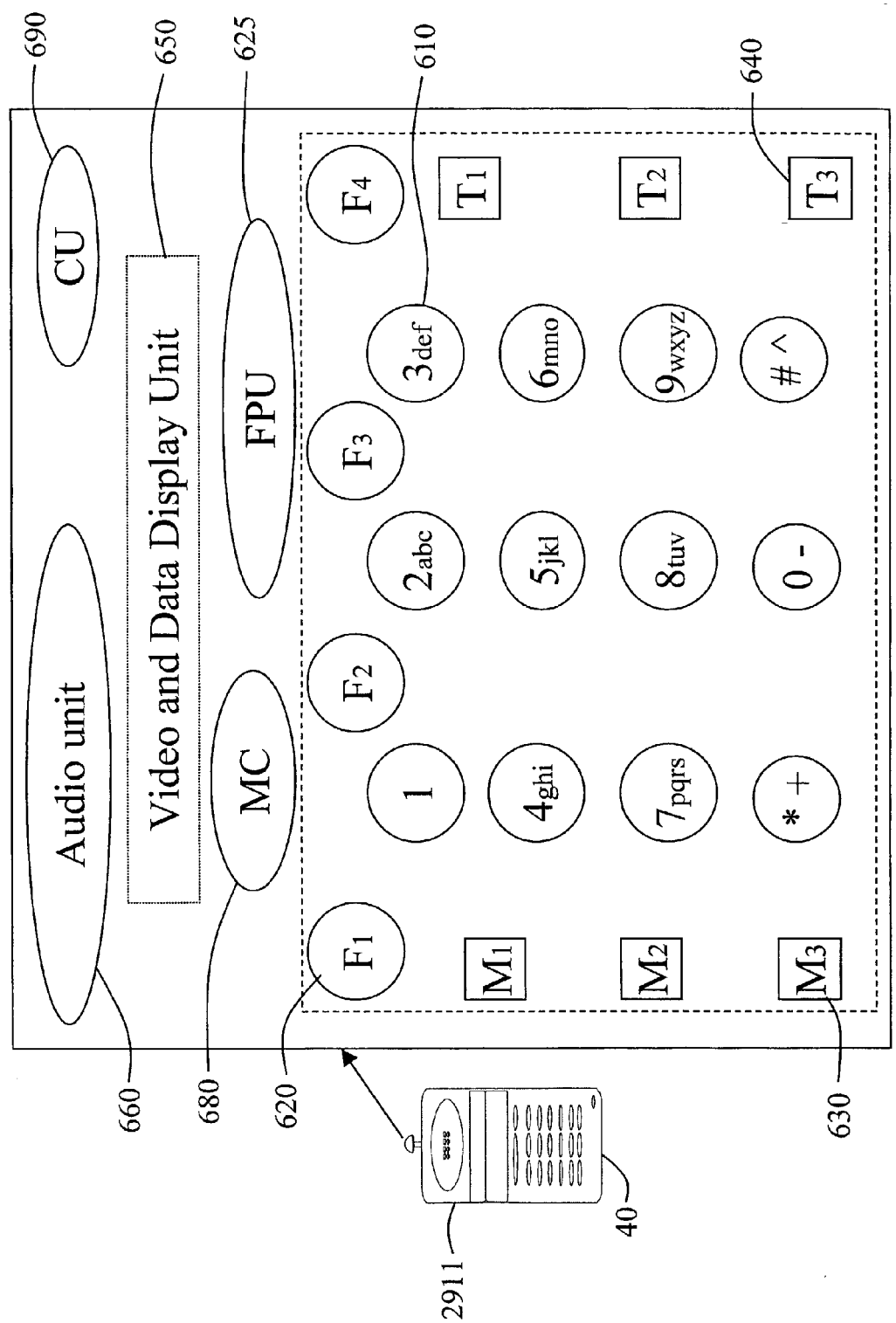
FIG. 6 is a block diagram showing a wireless device preferred input/output communication capability elements.

However, the finger print or video authorization functions may be performed using the customers wireless device 40 as discussed in connection with FIG. 6 along with other services requested by a customer. In future wireless devices such as those described in Co-pending applications Ser. No. 09/325,500 and the Master PASS system a fingerprint and or video unit is housed on or with the wireless device 40 such as the FPU element 625 shown in FIG. 6. The rest of the elements shown in FIG. 6 represent those currently available in most mobile computers with wireless capability such as the Palm Pilot VII wireless note book computer or Nokia 9000 series digital phones. Elements 650 and 660 represent the audio and video (display) functions currently available and element 680 represents the menu select able control functions along with special function elements 630 and 640. The menu select able control functions for example might be a macro for requesting e-mail once the customer is connected to their e-mail service provider. Another control function for example maybe controlled by one of the special function elements 630 and control a customer bank balance request after the customer is connected to their bank. The keyboard elements 610 are shown and are available on every wireless device contemplated to be used with the PPS along with element 650 or 660 or both 650 and 660. That is, every wireless device 40 that can operate with the PPS must have at least a keyboard capability and one form of audio or visual customer communication capability.

The special features and functions of the Pico Pay System are summarized in the table of FIG. 18 that lists both the common and the special unique features of the system from those associated with the other Proximity systems Description of the Proximity Authorization
Transaction System Invention In addition to the PPS 6 just described, a PATAS system 700 constructed in accordance with the present invention is shown. In general, other proximity systems that can be improved and made operative using an Advanced Wireless Authorization Unit (AWAU) 719 portion of the PPS invention with the appropriate interface modifications are shown in FIGS. 7 to 17 along with a general proximity system case identified as 720 shown in FIGS. 7 and 8. The terms "proximity system" and "proximity service unit" can be used interchangeably herein.

Figure 7:
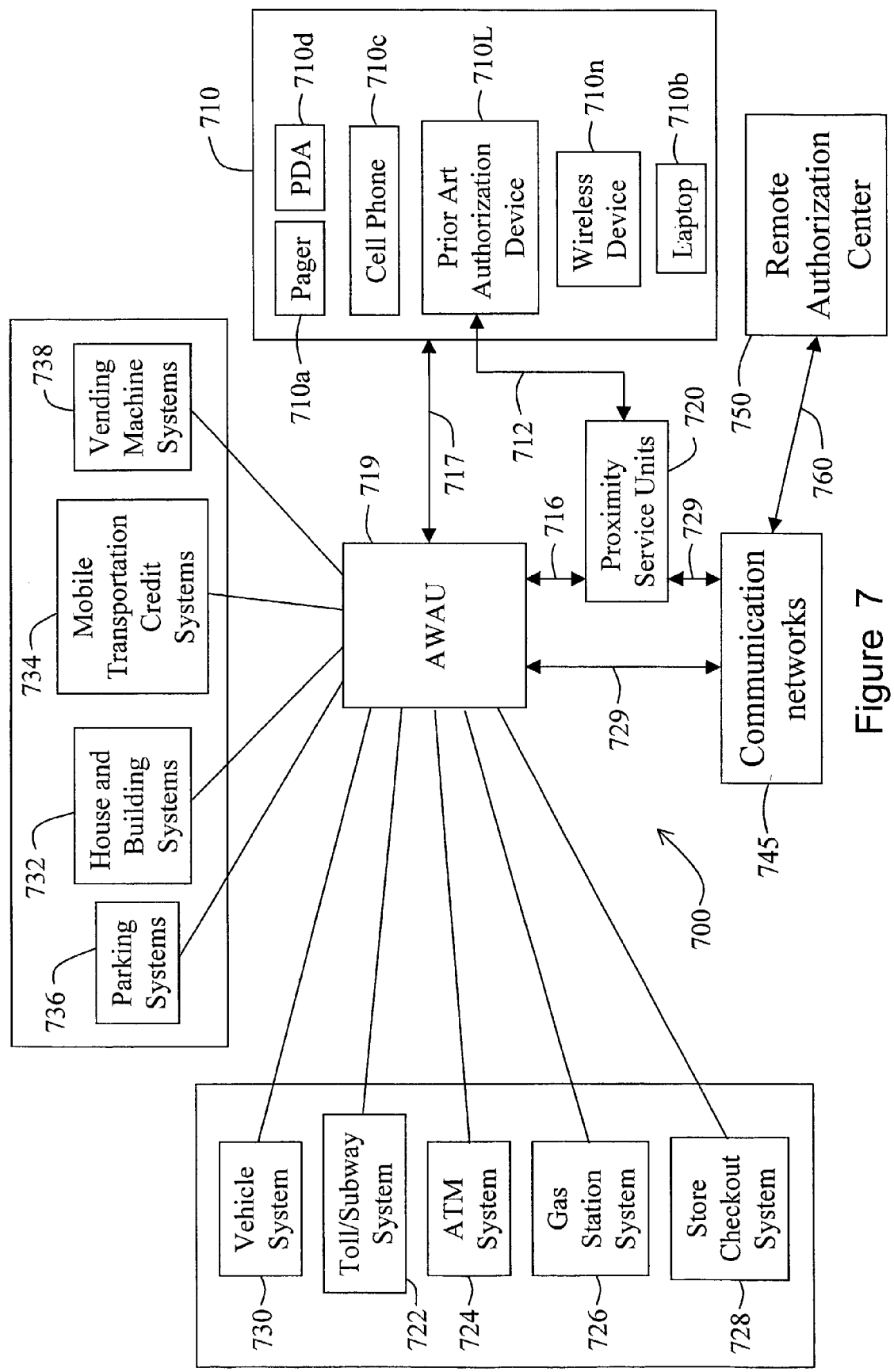
FIG. 7 is a block diagram showing other proximity systems that can be made to operate with wireless or an advanced wireless authorization unit of this invention.

The specific proximity systems identified in FIG. 7 and in FIGS. 9 through 17 are referred to as, 722 for the toll/subway systems, as 724 for the ATM systems, as 726 for the gas station systems, as 728 for the store checkout systems, as 730 for the vehicle systems, as a 732 for the parking systems (including parking meters), as 734 for the mobile transportation credit systems such as used in taxis and buses, as 736 for the house and building systems, as 738 for the vending machine systems that also can be made to work with wireless devices operating on different frequencies.

In FIG. 7 the basic operation of the proximity systems improved by the AWAU 719 can be described by starting with multiple wireless devices 710 shown in FIG. 7 where five different type wireless devices 710 such as a digital cell phone, pager, computer, PDA or a specialty device are shown. For the sake of clarity let each of the wireless devices 710 not designed for the proximity system operate on a different frequency or have a different protocol and or both. These wireless devices 710 that will activate existing Proximity systems will be denoted by 710a, 710b, 710c and 710n for purposes of clarity. A proximity device 710L is also shown in FIG. 7. The proximity device 710L is already designed to operate with proximity systems 720, 722, 724, 726, 728, 730, 732, 734, 736 and 738 (it may or may not be wireless). For example, the proximity device 710L is a wireless device for a legacy garage door system and for most Toll Tag systems for yet another example. However there are many proximity systems 720 that do not have wireless devices that operate them but only use cards, keys, biometrics, or coins in some combination as was the case of the PPS proximity systems described in connection with FIGS. 1–6 before a system similar to the AWAU 719 was incorporated.

However for the sake of clarity, all legacy (where legacy is defined to mean "not designed to operate with at least one of the wireless devices 710a, 710b, 710c, or 710n") proximity systems will have a legacy authorization transaction unit 830 along with an original device 710L of some nature that operates the original system. The 710L device is generally described along with the additional 710 wireless device elements 710a, 710b, 710c and 710n that are allowed to operate the modified proximity system after the AWAU 719 elements that are operated by 710a, 710b, 710c, 710n via 717 are connected to the general proximity system 720 via 716, and described in more detail with the aid of FIG. 8.

The purpose of the current invention is to extend the customer base for these existing proximity systems 720 that only operate with the 710L device to the customers operating the wireless devices 710a through n. The character n is chosen to make it clear that the general proximity system 720 having the AWAU 719 may be designed to accommodate up to n different device signal types where n will depend on how many different signal frequencies devices are made to operate in the future by the various wireless device manufacturers such as, Motorola, Nokia, NEC, Ericsson, Overhead Door, 3Com, Automobile manufacturers, security companies and others. The number n, also heavily depends on the number of wireless device frequencies approved by the FCC for use in the proximity service business.

For the sake of clarity it will be assumed during the remainder of the description that the wireless device 710a operates in the infrared frequency region approved by the FCC for wireless device operation, the wireless device 710b will operate in the 900 Mhz region approved by the FCC for wireless device operation, the wireless device 710c will operate in the 1.8 Ghz region approved by the FCC for wireless device operation and the wireless device 710n will represent those that are made to operate in any of the other regions approved by the FCC for wireless device operation. Also the operation of the legacy 710L device(s) in connection with the general proximity system 720 (that represents the proximity system before the AWAU is appended) for each of the specific proximity systems 722, 724, 726, 728, 730, 732, 736 and 738 is omitted from the discussion of FIGS. 9 through 17 since in all cases these are existing legacy systems and the proximity device 710L and general proximity systems 720 operations are well known to those skilled in the art.

When needed specialty considerations and/or the benefits afforded by the invention are discussed in each particular proximity system described with the aid of FIGS. 9–17. However the legacy proximity device 710L and the general proximity system 720 is discussed with the aid of FIGS. 7 and 8 in the general case where any of the wireless devices 710 can operate any type of general proximity system when 720 when the AWAU 719 and the general proximity systems 720 are combined as described.

In the general proximity system 720 and the specific proximity systems (722, 724, 726, 728, 730, 732, 734, 736 and 738) the signaling between the wireless devices 710 and the AWAU proximity system transaction units is denoted by 717 as shown of FIG. 7 in order to simplify the drawings with out sacrificing the clarity of the description.

The AWAU 719 is provided with a multiple channel wireless transceiver 740 capable of receiving at least two signal types, i.e. different frequency signal types or protocols. The multiple channel wireless transceiver 740 receives a request authorization code from each of a plurality of the wireless devices 710a–n such that the plurality of wireless devices 710a–n are capable of communicating simultaneously with the multiple channel wireless transceiver 740 without air time. Each wireless device 710a–n is capable of communicating the request authorization code when the wireless device is within a predetermined proximity distance from the multiple channel wireless transceiver 740 and each request authorization code uniquely identifying the wireless device 710a–n from which the request authorization code is received.

For the general case any one of the wireless devices 710, say for example the wireless device 710a which operates using Infrared frequency signals communicates to the AWAU 719 via line 717 that is connected to the general proximity system 720 via a line 716 housed therein and described in further detail in connection with FIG. 8.

Figure 8:
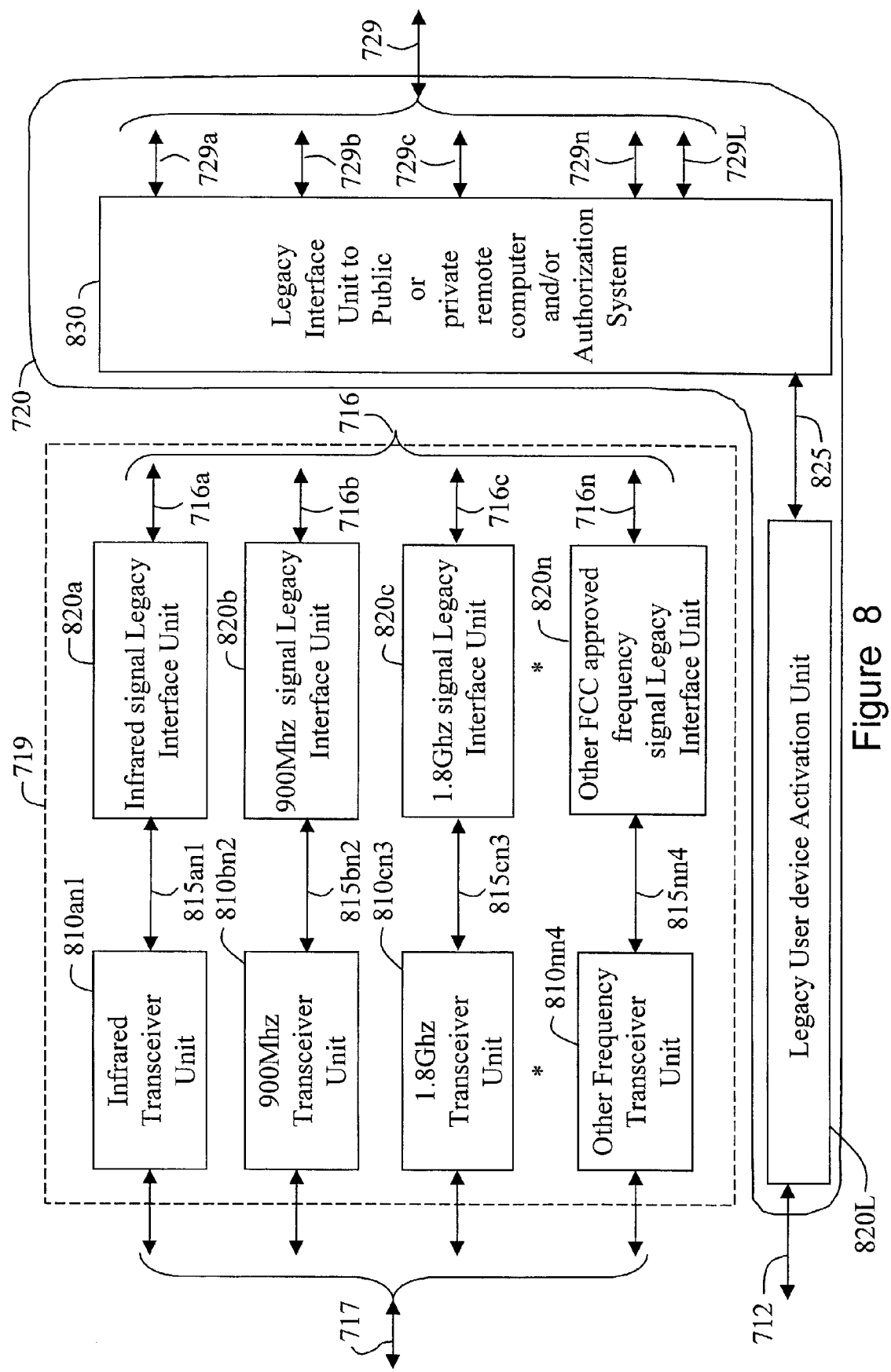
FIG. 8 is a block diagram showing a basic interface between the Advanced Wireless Authorization Unit (AWAU) and the Legacy Authorization Transaction Unit (LATU).

The legacy proximity device 710L is shown connected to the general proximity system 720 via a line 712 and a description of the operation for this general case is described in FIG. 8 where 712 is connected to a legacy activation unit 820L which might be something as simple as a coin payment box if the proximity device 710L for example is a coin. If the proximity device 710L is a credit card, then the legacy activation unit 820L would be a credit card reader for example. In the case where the legacy activation unit 820L, such as the credit card reader, needed to be connected to a remote data base 750 for authorization, a request for authorization along with the credit card information would be sent by the legacy activation unit 820L to a legacy authorization transaction unit 830 via a line 825 where upon the legacy authorization transaction unit 830 would make the request to the remote database 750 via lines 729L and 760 to the remote database 750.

In some cases, the legacy authorization transaction unit 830 authorization unit might be required to communicate via the line 729L with the remote database 750 via line 760 where lines 729L and 760 might be connected together through any number of private and public communication networks 745, including the Internet prior to making a final connection to the remote database 750, for example. Once the requested proximity service or action authorization, i.e. a service authorization code, is received by the legacy authorization transaction unit 830 the legacy activation unit 820L is notified and the service is delivered to the customer. The above description of the legacy proximity device 710L made to operate the general proximity system 720 will not be repeated for all the special cases and the legacy activation unit 820L in the general proximity system 720 is omitted from FIGS. 9 through 17 since the essence of the invention is to allow activation using the legacy activation unit 820L but allow the request for service, i.e. the request authorization code, to be also made by customers through the Advanced Wireless Authorization Unit or AWAU 719 for activating the general proximity system 720. However, the equivalent of the legacy authorization transaction unit 830 is shown in each of the FIGS. 9–17 since the authorization might require remote communication in each of the cases depending on the owner of the general proximity system 720.

The general AWAU 719 that will work with the general proximity systems 720 other than pay phones or communication Kiosks as described earlier in connection with FIGS. 1–6 is described in further detail with the aid of FIG. 8 but the in depth workings of the general proximity system 720 are not repeated here for the sake of brevity with out sacrificing clarity of operation.

Referring now to FIG. 8, shown therein in more detail is the AWAU 719. The multiple channel wireless transceiver 740 of the AWAU is provided with a plurality of wireless transceivers 810an1, 810bn2, 810cn3, and 810nn4. In FIG. 8, the possible wireless signals going to the general proximity system 720 from any of the wireless devices 710a, 710b, 710c and 710n are shown going to the AWAU 719 via the line 717 and are connected to operate distinct sets of the wireless transceivers 810an1, 810bn2, 810cn3, and 810nn4 where for example the wireless transceivers 810 for infrared devices are represented by 810an1. N1 represents the different number of infrared transceivers in 810an1 that are available to accommodate more than one infrared wireless device 710.

The number n1 may be determined because the designer allows different transceivers 810an1 to have the ability to detect the same type infrared signal frequency and protocols but allows for more than one user to be connected at the same time or they may be because the transceivers 810an1 are able to detect several different type signal frequencies and/or protocols of infrared devices but not does not allow users to be connected at the same time. The detection of a signal from the devices 710b is done by 810bn2, devices 710c is done by 810cn3 and devices 710n is detected by 810nn4 respectively. The numbers n1, n2, n3, and n4 associated with a, b, c, and n can be different for each case depending upon which type wireless transceiver is shown. That is, the number n1 of transceivers 810an1 does not have to be the same as n2 for 810bn2. Also, the AWAU 719 might only have two types of wireless transceivers say 810an1 type and 810bn2 type. The number of type signals a, b, c, or n and the number of transceiver channels n1, n2. etc. for each signal type will depend on the proximity system designer and will increase the more customers the proximity system owner wants to accommodate.

For example a parking garage, parking meter system, or retail store credit system will tend to want as many type wireless transceivers 810 and as many channels as possible since the one time cost is amortized very quickly as the number of users increase.

Once one of the wireless transceivers 810an1 not in operation detects a signal from the wireless devices 710a when a user gets within a predetermined distance and causes their wireless device 710a signal, i.e. request authorization code, to exceed a predetermined transceiver threshold, say normally less that 200 feet for example, a legacy interface unit 820a is notified via line 815an1.

In various embodiments of the present invention, a detector system for detecting the distance from the wireless transceiver 810an1 to the wireless device 710a is provided in the wireless transceiver 810an1, 810bn2, 810cn3 and 810nn1 of the multiple channel wireless transceiver 740. For example, when the AWAU 710 is utilized with the toll/subway systems 722, the multiple channel wireless transceiver 740 is programmed to detect a first signal strength from the wireless device 710a and a second signal strength from the wireless device 710a. A signal is transmitted to the legacy interface unit 820a and/or the legacy authorization transaction unit 830 so as to validate the plurality of request authorization codes in response to the multiple channel wireless transceiver 740 detecting the first signal strength. A signal is transmitted to the legacy interface unit 820a and/or the legacy authorization transaction unit 830 in response to the multiple channel wireless transceiver 740 detecting the second signal strength so as to cause the legacy interface unit 820a and/or the legacy authorization transaction unit 830 to output the service authorization codes in response to the multiple channel wireless transceiver 740 detecting the second signal strength. The toll/subway system 722 then provides the predetermined toll service, such as activating the gate or red/green light, for example, to pass the wireless device owner through the toll/subway system 722.

In one preferred embodiment, the multiple channel wireless transceiver 740 detects the first signal strength in response to the wireless devices 710a being within a first proximity distance from the multiple channel wireless transceiver. The multiple channel wireless transceiver 740 detects the second signal strength in response to the wireless devices 710a being within a second proximity distance from the multiple channel wireless transceiver 740. The first proximity distance is greater than the second proximity distance. For example, the first proximity distance can be 500 feet and the second proximity distance can be set close in say 20 feet. Thus, authorization can preferably be obtained before the wireless device owner is close to the gate or red/green light to speed up the passage of people through the toll/subway system 722, for example.

The legacy interface unit 820a is connected to the specific transceiver 810an1 that made the detection of the signal from the specific wireless device 710a. The legacy authorization transaction unit 830 in the proximity system 720 is notified via line 716 and the legacy authorization process described in connection with 710L is completed so as to receive a service authorization code upon validation of the request authorization code. While this process is being completed the signal connection is maintained between the wireless device 710a and the wireless transceiver 810an1 units by the legacy interface unit 820a during the remainder of the transaction process by assigning a temporary number that correlates the specific wireless transceiver 810an1 with the wireless device 710a using identifying parameters received from the specific wireless device 710a detected. It should be understood that the legacy authorization transaction unit 803 can be referred to herein as a "proximity unit validation assembly".

Also two way communication capability is always assumed to be unavailable or in effect unless otherwise specified. In some cases, the wireless device 710a is automatically activated when reaching a predetermined proximity distance from the AWAU 719 and in others cases, the wireless device 710a is all ways activated by the customer when a service is desired. Cases where automatic activation takes place are in moving vehicles such as toll gates and parking lots for example. Most other cases the services is manually requested by activation of the wireless device 710 to provide the request authorization code. Identifying parameters are used to develop a queue for delivering the requested service in the correct order and to the correct wireless device 710a. The identifying parameters as a minimum includes a unique device ID, such as the manufacturers identification number (MIN) or service provider identification number (SID) normally transmitted with cell phones or pagers and the time the wireless device 710a is detected. However other proximity information and user ID such as fingerprint or credit card # or a PIN number might be required or requested as part of the authorization process.

The legacy interface units 820a, 820b, 820c and 820n of the AWAU 719 handle all of these administrative items along with staying in connection with 820L, via line 716, responsible for delivering the service requested and collecting the payment information. If remote communication is required the legacy activation unit 820L will connect the legacy interface unit 820a communication channel line 716a to the legacy authorization transaction unit 830 connected to the remote database 750 via line 729a and 760. Again, as in the case of the 710L device description 729a might be connected to 760 via many communication networks 745 including the Internet.

It should be noted that multiple channel capability might be required to handle each wireless device 710 similar to that described in connection with the Pico Pay system 6 but double subscripts are omitted on the out put side in FIGS. 9–17 since in most cases multiple simultaneous authorization is not required like it was with the Pico Pay system 6. Also in many cases such as the house and building system 736, one line would be used at a time even if remote communication was needed. In those cases the legacy interface units 820a, 820b, 820c, 820n of the AWAU 719 along with the legacy authorization transaction unit 830 and lines 729a, 729b, 729c and 729n would all be reduced to a single authorization unit interfacing with the multiple transceiver devices 810an1, 810bn2, 810cn3 and 810nn4 where every transceiver device was unique and only represented one type of wireless signal device 710.

Once authorization is approved by the legacy authorization transaction unit 830 the service authorization code is output to the legacy activation unit 820L via the line 825 and the requested service, i.e. checkout services, toll services, garage door opening services and the like, is provided to the device user by the legacy activation unit 820L and the specific 810an1 that was connected to the specific wireless device 710a is released by the legacy interface unit 820a. The legacy interface unit 820a, for example, then waits to detect the next wireless device 710 coming within the predetermined proximity distance.

The term "legacy activation unit", as used herein, broadly refers to a device for providing predetermined services, such as pay telephone services, checkout services, toll services, garage door opening services and the like.

Also the temporary number can be erased from memory unless the proximity service provided requires that unique numbers be generated each time a specific wireless device 710 is connected to a specific wireless transceiver 810a. This would probably be a rare requirement since normally the user ID along with the time tag information is all that is required by a service provider billing system.

The above description for the general case, omitted a discussion of the Biometric systems and authorizations that might be required or the possible advanced digital wireless service communication capability for the 710a, 710b, 710c or 710n wireless devices as done in connection with the Pico Pay System 6. These features were discussed in connection with FIGS. 5 and 6 and are preferably utilized by the wireless device 710a, 710b, 710c or 710n. Thus, the same discussion would apply in connection with fully describing and repeating those features in connection with FIG. 8 (the general case) and FIGS. 9–17 associated with each of the specific proximity systems. For the sake of brevity, these description are expressly incorporated herein by reference and will not repeated since no new features are contemplated in connection with the claims associated with FIGS. 8–17.

The specific cases for the more notable proximity systems are described with the aid of FIGS. 9–17 where the AWAU 719 is described to operate with each specific type of proximity system so that after incorporating this invention, they will also operate with wireless devices 710 operating on frequencies not originally designed for their service.

In the specific cases shown in FIGS. 9–17, the legacy activation unit 820L ranges from units that only accept physical keys, cards or coins such as ATM's, House and building locks, parking meters and gates, vending machines and retail store check out counters, to those that have specialized wireless activation devices such as toll tags, entry gates and garages. Some of the specific cases shown have both a card, key, or coin activation means and a wireless means such as vehicles, security access systems, and gas station systems.

However, prior to this invention, it is believed the systems 722, 724, 726, 728, 730, 732, 734, 736 and 738 in FIGS. 9 through 17 have not been able to operate with digital wireless devices 710 that operate on different frequencies and have a communication capability other than to effect the proximity system activation function described herein. In summary the systems have not been capable of operating to operate with either modified (see application Ser. No. 09/325,500 the content of which is hereby expressly incorporated herein by reference) or unmodified devices such as cell phones, pagers, notebook computers, or an all in one wireless activation and communication devices such as Master PASS.

The general features and functions of the general case PATAS system 700 are shown in the table of FIG. 19 that lists both the common and the special unique features of the PATAS system 700 for use with the general proximity system 720 from those associated with the Pico Pay system 6 described in connection with FIGS. 1–6.

Figure 9:
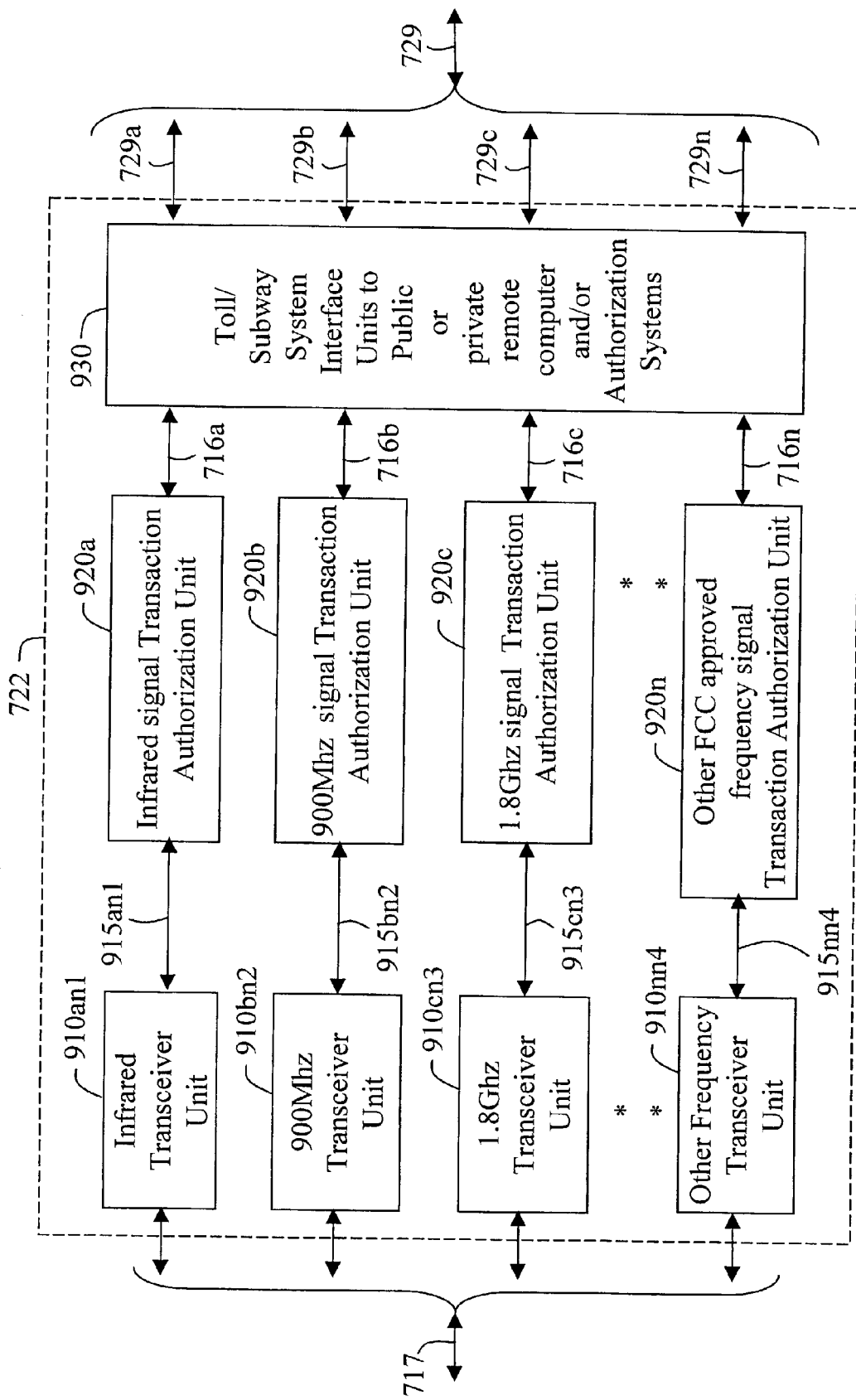
FIG. 9 is a block diagram showing the elements of a local Toll/Subway multiple signal detection and transaction unit.
Figure 10:
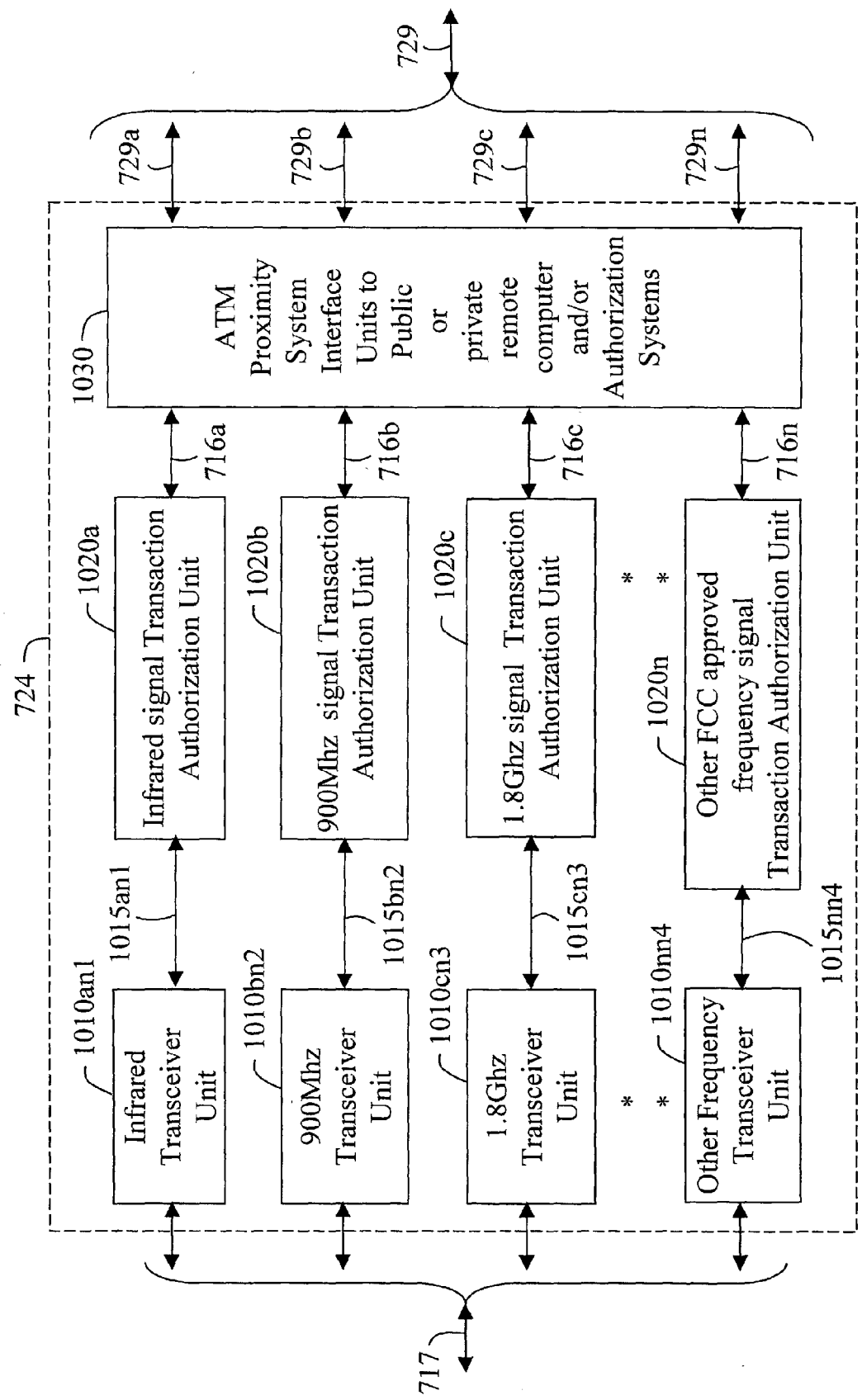
FIG. 10 is a block diagram showing the elements of a local ATM multiple signal detection and transaction unit.

In FIG. 9 the toll/subway system 722 is shown where the AWAU 719 is incorporated into the toll/subway system 722.

For purposes of brevity, the legacy interface units 920a, 920b, 920c, and 920n are similar in construction and function to the legacy activation elements 820a, 820b, 820c and 820n, except that the authorization portion of the legacy activation unit 820L has been incorporated into respective legacy interface units 920a, 920b, 920c, and 920n and the activation portion of the legacy activation unit 820L is omitted for the reasons discussed earlier (i.e. no changes in the service activation elements of the toll/subway system 722 are contemplated in this invention). The activation by devices 710a through 710n via 717 to elements 910an1 through 910nn4 along with their connections to the legacy interface units 920a, 920b, 920c, and 920n and respectively via lines 915an1, through 915nn4 respectively is identical in operation as 810an1 through 810nn4 and 815an1 through 815nn4 in FIG. 8 discussed previously.

Most toll systems now have lanes that only pass vehicles with a mountable electronic tags (e.g. TIRIS made by Texas Instruments series 5000 reader systems) plus all systems have lanes that only use coins and some have lanes that allow vehicles to pass using either type activation device. Unfortunately both of these activation devices (tags and coins) are usually different in every state and city and controlled by a local transportation authority. Cross country trucks for example might have to have ten devices if they wanted to use toll tags and travelers using rent cars are simply out of luck.

It is estimated that all the toll tags lumped together in the USA market number less than 10 million units for over a 100 million cars (approximately 10%). In any one market the number is less that 1% of the vehicles have tags because they are not portable to other cities, states, or countries. However, 40% of the vehicles that use toll systems now have a cell phone or pager and the number is expected to reach 75% within three years. Consequently a system such as described herein would move the customer base in each area from less than 1% to 75% of the vehicles in three years with very little investment. The proximity and correct gate activation functions would have to be properly implemented. Although these can be handled in a number of ways by those skilled in the art a preferred method which improves the existing methods is as follows. A two activation signal strength system is incorporated into units 910an1 through 910nn4 and 920a through 920n wherein the first signal strength level activates the authorization computer and the second activation level activates the gate or red/green light. The current toll tag systems mostly have very expensive systems because mostly operate with special purpose transponders for the purpose of both authorization and activation and the detection distance is short less than 50 feet in most cases. This means that gates speeds have to be kept low which requires more gates to be added to increase the vehicle count per unit of time. With the toll/subway system 722, authorization distance can be set out to 500 feet and red/green light distance set close in say 20 feet. Consequently gate speeds can be doubled in order to handle the increase in customers caused by allowing cell phone and pager customers to use the toll systems. Clearly, the old systems would eventually be phased out when it so easy to give a customer an account by just knowing their pager or cell phone number. Note that this same modification would be used in parking lots, airport gates, subway and bus systems with slight parameter modifications to tailor the activation distances and the authorization distances to match the speed and signal type of the 710a through 710n device to the proximity system reliability requirements.

The special features and functions of the vehicle Toll 722 PATAS system are shown in the table of FIG. 20a that lists both the common and the special unique features of the 722 PATAS from those associated with the other Proximity systems The activation devices for the subway/toll system shown in FIG. 9 have similar devices but they are mostly cards and coins that people carry and they also suffer from the lack of portability between communities. However, portability is not the main problem with subways or buses as much as convenience. People keep having to get more coins or get their subway debit cards refilled and again visitors are always greatly inconvenienced when in a new city especially in other countries. A cell phone or pager unique number capability and the built in billing system associated with them would allow local authorities to greatly reduce their service costs by incorporating the system described herein. Also, the one billion customer base (counting cell phones and pagers) world wide is not insignificant. Thus, in the case of toll systems, the customer base would increase dramatically with the adoption of this system.

In the case of public transportation systems the operating cost would decrease dramatically and allow people to use the public transportation systems world wide with out having to learn a new system in each city. Also there would be a noticeable increase in riders just due to the convenience for visitors and travelers. In those cases where the transportation carrier had access to the public communication system a PPS unit could be offered riders so they could be using their cell phones while riding the subway or train and only paying the $0.35 cents and no air time costs. Special activation considerations would be added to the activation portion of the 910*an*1 and 920*a* units for example in addition to the Customer ID authorization features already discussed in connection with the general case of FIG. 8. The special features and functions of the toll/subway system 722 are shown in the table of FIG. 20*b* that lists both the common and the special unique features of the toll/subway system 722 from those associated with the other Proximity systems In FIG. 10, the ATM system 724 is shown in more detail. The ATM system 724 includes the AWAU 719 elements and the legacy activation transaction unit 830 elements both incorporated into the ATM system 724. In other words, the ATM system 724 includes a plurality of wireless transceivers 1010*an*1, 1010*bn*2, 1010*cn*3 and 1010*nn*4, a plurality of legacy interface units 1020*a*, 1020*b*, 1020*c*, and 1020*n*, and a legacy authorization transaction unit 1030.

The wireless transceivers 1010*an*1, 1010*bn*2, 1010*cn*3 and 1010*nn*4 are similar in construction and function to the wireless transceivers 810*an*1, 810*bn*2, 810*cn*3 and 810*nn*4, which were described hereinbefore with reference to FIG. 8 except as discussed hereinafter. For purposes of brevity, the legacy interface units 1020*a*, 1020*b*, 1020*c*, and 1020*n* are similar in construction and function to the legacy activation units 820*a*, 820*b*, 820*c* and 820*n*, except that the authorization portion of unit 820L has been incorporated into the legacy interface units 1020*a*, 1020*b*, 1020*c*, and 1020*n* and the activation portion of 820L is omitted for the reasons discussed earlier (i.e. no changes in the service activation elements are contemplated in this invention). The legacy activation transaction unit 1030 is similar in construction and function as the legacy activation transaction unit 830, except as discussed hereinafter.

The activation by devices 710*a* through 710*n* via 717 to the wireless transceivers 1010*an*1 through 1010*nn*4 along with their connections to the legacy interface units 1020*a*, 1020*b*, 1020*c*, and 1020*n* respectively via lines 1015*an*1, through 1015*nn*4 respectively is identical in operation as 810*an*1 through 810*nn*4 and 815*an*1 through 815*nn*4 in FIG. 8 discussed previously.

Most prior art ATM systems only allow operation using credit or debit or smart cards plus all systems require PIN numbers to be inserted. Both of these activation devices (cards and PIN numbers) are usually different but normally the instruction are easy to follow. However because money is involved more Biometric information is the growing trend. Especially at ATM's that have had cameras installed for years to record the person requesting and making the transaction. Also, it has always been a problem for example a person waiting in line might see the PIN number entered and steal the persons card. A cell phone or pager unique number capability and the built in billing system associated with them would allow ATM companies to immediately expand their customer base by allowing users to enter all of their credit card information from their cell phone or pager unit in a more convenient and safe manner. The number of reduced manual re-entries alone because of normal data entry mistakes would unload the on line network system by 20% it has been estimated. Also expanded service fee's could be generated if the Pico Pay feature was added to each ATM unit.

For example if each ATM collected and additional $35 and hour (this would be 100 customers using the machines $0.35 cent phone service at once and talking one hour or 10 customers using the ATM at once but talking only 6 minutes) a machine would generate an additional $25,000 a month. Also other services such as email, stock quotes, etc could be provided to customers for very nominal fees over their cell phones devices because no customer air time charges are involved, while the legacy customers used their credit cards with the old physical manual method.

Again, special authorization and activation considerations would be added to the activation portion of the 1010*an*1 and 1020*a* units for example in addition to the Customer ID authorization features already discussed. The proximity and service activation functions have to be properly implemented. Although these can be handled in a number of ways by those skilled in the art a preferred method which improves the existing methods is as follows. A two activation signal strength system is incorporated into units 1010*an*1 through 1010*nn*4 and 1020*a* through 1020*n* wherein a first signal strength and/or protocol activates the authorization computer for ATM services other than those that require the menu screen of the ATM to be used. These might be for the Pico Pay or e-mail and other communication services that do not require close physical proximity to the ATM system 724. The second activation level activates the ATM menu screen when the customer is very close say less than one foot and allows the existing legacy ATM services to be provided but the credit card and PIN numbers can be pulled from the cell phone, wireless computer device, or pager or put in on command from the wireless device depending on the selected mode of the menu.

Figure 11:
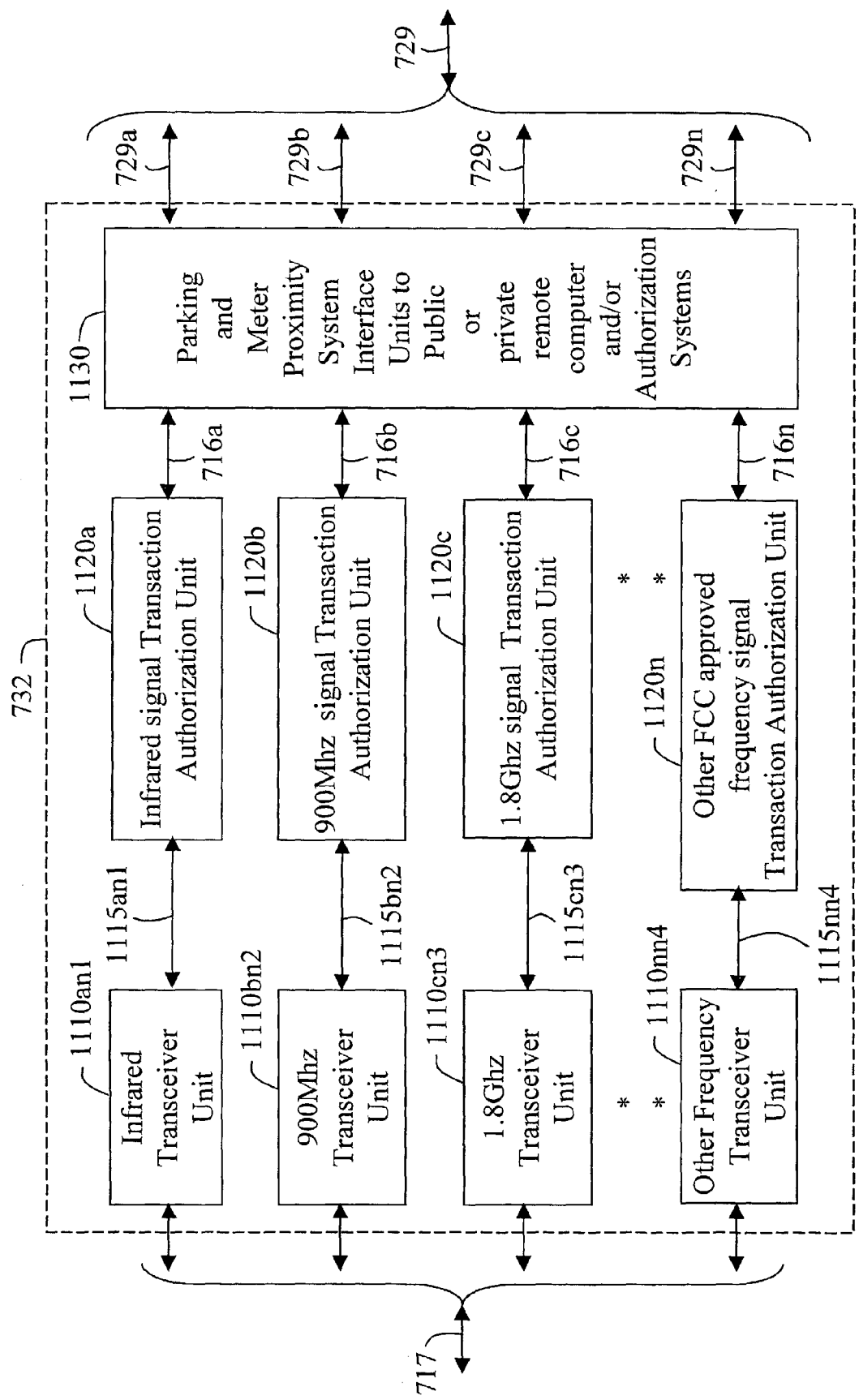
FIG. 11 is a block diagram showing the elements of a local parking and meter system multiple signal detection and transaction unit.

The special features and functions of the ATM system 724 are shown in the table of FIG. 21 that lists both the common and the special unique features of the ATM system 724 from those associated with the other Proximity systems In FIG. 11, the parking system 732 is shown in more detail. The parking system 732 can be provided on or adjacent to a parking lot (both public and private such as an apartment complex) or a municipal parking meter. The parking system 732 includes the AWAU 719 elements and the legacy activation transaction unit 830 elements both incorporated into the 736 elements. In other words, the parking system 732 includes a plurality of wireless transceivers 1110*an*1, 1110*bn*2, 1110*cn*3 and 1110*nn*4, a plurality of legacy interface units 1120*a*, 1120*b*, 1120*c*, and 1120*n*, and a legacy authorization transaction unit 1130.

The wireless transceivers 1110*an*1, 1110*bn*2, 1110*cn*3 and 1110*nn*4 are similar in construction and function to the wireless transceivers 810*an*1, 810*bn*2, 810*cn*3 and 810*nn*4, which were described hereinbefore with reference to FIG. 8 except as discussed hereinafter. For purposes of brevity, the legacy interface units 1120*a*, 1120*b*, 1120*c*, and 1120*n* are similar in construction and function to the legacy activation units 820*a*, 820*b*, 820*c* and 820*n*, except that the authorization portion of unit 820L has been incorporated into the legacy interface units 1120*a*, 1120*b*, 1120*c*, and 1120*n* and the activation portion of 820L is omitted for the reasons discussed earlier (i.e. no changes in the service activation elements are contemplated in this invention). The legacy activation transaction unit 1130 is similar in construction and function as the legacy activation transaction unit 830, except as discussed hereinafter.

The activation by devices 710*a* through 710*n* via 717 to elements 1110*an*1 through 1110*nn*4 along with their connections to 1120*a*, 1120*b*, 1120*c*, and 1120*n* respectively via lines 1115*an*1, through 1115*nn*4 respectively is identical in operation as 810*an*1 through 810*nn*4 and 815*an*1 through 815*nn*4 in FIG. 8 discussed previously.

Most parking systems that are accessed controlled only pass vehicles in with a card, or ticket issued when magnetic loop senses the vehicle, electronic thumb unit such as used for cars plus. Unfortunately all of these activation devices (cards, tickets, and beepers) are usually different in every location, city, state and country. Also the collection on exit still requires and attendant operating a money system for both cash and credit cards for parking lots and garages that are in business to make money. Those systems designed for the convenience of the employee or resident can use an automated loop activated gate opener for exiting. However this does not tell the management who is leaving so that although one could determine when a person entered they would not know when they left. In other words, the current controlled employee parking systems are not functional as time card systems unless the employee has to use their entry access device to control the exit gate. By way of example involving the parking systems that now require and attendant for 7 by 24 hour operation the monthly costs would be in the range of $200,000 per parking lot/garage that only had one 7 by 24 hour gate. If more gates were in operation, say during the day 3 gates were in operation then the collection costs for personnel would be nearer to $500,000 per month per garage.

Consequently, the incorporation of the house and building system 736 would bring large savings if some of the parking lots where converted to cell phone or pager operation only. In addition the collection would be done as a service by the cell phone or pager provider similar to 900 service are collected by the phone companies for the private companies. The incorporation of the house and building system 736 into apartment or employee systems would provide a much more secure and low cost method for providing the service to the administrators. The cost would be greatly lowered because the special relative unreliable devices such as cards or gate beepers could be eliminated in favor of entering the persons cell phone number (or deleting the cell phone number when the employee or resident left) or providing the resident a pager if they do not have a cell phone. The employee's or residents would welcome the gas station system 726 in order to eliminate having to carry a special device to use maybe four time a day.

The special features and functions of the parking system 732 for parking access are shown in the table of FIG. 22*a* that lists both the common and the special unique features of the parking system 732 for parking access from those associated with the other Proximity systems.

In FIG. 11 the parking system 732 for parking meters is shown and is discussed here separately since they only use coins at present although some people have advocated debit cards. The incorporation of the AWAU 719 unit would be much less expensive than a coin collecting or card system and the collection of revenues would be much less costly and safe than the current meter systems. The cost of daily collections including the counting and banking of coins is quite large and would be greatly reduced with the present invention. The battery required for operation would last several years between changes and the roving data base collector (described in more detail later) would be notified each time a meter was out of order. Also, the parking system 732 as described would quickly spread to world acceptance and be a great convenience to travelers not familiar with the local coin systems. The wide acceptance would greatly reduce the cost of the meters so that portable and temporary wireless activated meters would become very practical for both cities and wireless device service providers. Since there are no parking meter systems using a wireless activation device at present, the following method of operation is described as follows in order to cover the special claims associated with the parking system 732.

When the parking system 732 is incorporated into a parking meter, a two way manual activation signal system is incorporated into wireless transceiver units 1110*an*1 through 1110*nn*4 and the legacy activation units 1120*a* through 1120*n* instead of automatic two way activation as before (the first ones would probably only work with Infrared and possibly one other cell/pager frequency) wherein the unit 710*a* would request the parking meter to be activated. The wireless transceiver 1110*an*1 and the legacy interface unit 1120*a* would detect this request and ask for the customer ID and Service Providers Identification Number (SPIN) and possibly other information via line 1115*an*1 and 717 back to the wireless device 710*a* to be used to authorize and eventually charge the customers account (in the future the meter might ask for the customers Biometrics code for further identification purposes). The legacy interface unit 1120*a* would already have a predetermined set of SPIN codes for which the meter service was authorized.

The meter collection could be done from a roving vehicle using a special authorization code that authorized the collection of the meter user data base from each meter it interrogated. An alternative method of collection is afforded with this system which would be polling interrogation but this would require up link high power capability (albeit for a very short period). This alternative method is recommended for small towns but the mobile interrogator is preferred in the larger cities where meter maintenance duties are combined with collection duties. This data base in turn could be combined with all other meter data bases for the day and the various SPIN would be separated and the meter usage data for each customer would be sent to authorized device 710*a* Service Providers for collection.

Note that the collector would also be notified when at the meter if a meter had a low battery or was out of order and/or the daily collected data base could automatically send maintenance data to the maintenance department for scheduled meter maintenance. The battery life would typically be on the order of three to five years because of the low power requirements caused by only having to transmit a short distance upon activation several times a day for very short periods. The city would be paid the same day collection data was received by the service provider, and the monthly meter usage for each unit 710a would show up on the 710a customers bill received from a cell phone, pager or other Service provider that administered the system.

Note, an Internet Service Provider (ISP) could administer the service world wide for a number of customers and cities using e-commerce systems that most cities are connected to now). Another interesting feature of the design described above is that users would not have to worry about traffic tickets because they forgot to go put more money in the parking meter. The preferred embodiment design would allow the charges to accumulate until the owner returned to the car and turned the meter off. This would be an option offered by the meter before the meter was activated. In other words the customer with device 710a would have the choice to put in a fixed time amount say down to 5 minutes or leave the meter running until they return. Also the convenience of always having money for the meter to the customer would make all people sign up for such a service.

The special features and functions of the parking system 732 for use with parking meters are shown in the table of FIG. 22b that lists both the common and the special unique features of the parking system 732 for use with parking meters from those associated with the other Proximity systems.

Figure 12:
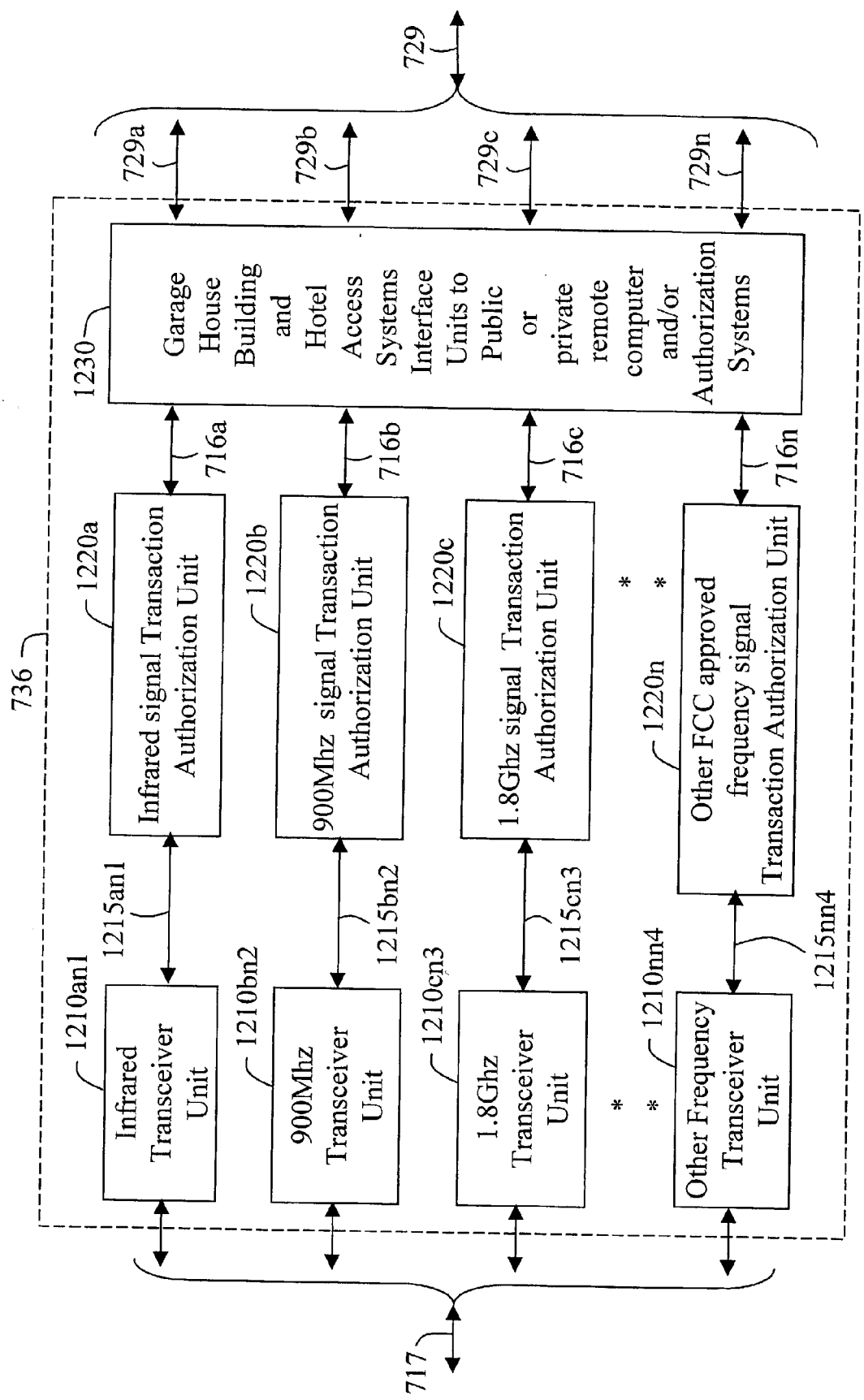
FIG. 12 is a block diagram showing the elements of a local garage, house, building and hotel multiple signal detection and transaction unit.

In FIG. 12, the house and building system 736 for operating garage doors, building doors, hotel doors or house doors and the like is shown in more detail. The house and building system 736 includes the AWAU 719 elements and the legacy activation transaction unit 830 elements both incorporated into the house and building system 736. In other words, the house and building system 736 includes a plurality of wireless transceivers 1210an1, 1210bn2, 1210cn3 and 1210nn4, a plurality of legacy interface units 1220a, 1220b, 1220c, and 1220n, and a legacy authorization transaction unit 1230.

The wireless transceivers 1210an1, 1210bn2, 1210cn3 and 1210nn4 are similar in construction and function to the wireless transceivers 810an1, 810bn2, 810cn3 and 810nn4, which were described hereinbefore with reference to FIG. 8 except as discussed hereinafter. For purposes of brevity, the legacy interface units 1220a, 1220b, 1220c, and 1220n are similar in construction and function to the legacy activation units 820a, 820b, 820c and 820n, except that the authorization portion of unit 820L has been incorporated into the legacy interface units 1220a, 1220b, 1220c, and 1220n and the activation portion of 820L is omitted for the reasons discussed earlier (i.e. no changes in the service activation elements are contemplated in this invention). The legacy activation transaction unit 1230 is similar in construction and function as the legacy activation transaction unit 830, except as discussed hereinafter.

The activation by devices 710a through 710n via 717 to the wireless transceivers 1210an1 through 1210nn4 along with their connections to the legacy interface units 1220a, 1220b, 1220c, and 1220n respectively via lines 1215an1, through 1215nn4 respectively is identical in operation as 810an1 through 810nn4 and 815an1 through 815nn4 in FIG. 8 discussed previously.

Garage door opener wireless activation systems have been around for years and incorporation of the AWAU 719 to obtain the house and building system 736 only requires that the wireless transceivers 1210an1 through 1210nn4 and the legacy interface units 1220a through 1220n elements for one way (or two way for the more expensive models) communication Transceivers be appended to the existing radio receiver unit so that the home owner does not have to carry a separate garage door opener. The added security features and ability to change door opener PIN codes for each authorized person affords the same security as a good building access code systems. The Biometrics features built in the to the AWPS wireless devices (application Ser. No. 09/325,500) can also be required by 1220a before the 820L activation unit is allowed to operate. A two way system for example might be connected to the home security system that might be connected to and Internet service provider that keeps a list of all the authorized codes. The ISP only allows changes to the 1220a authorization system data base upon supplying additional personnel information Identifying a person authorized to change the list of persons authorized to open the garage door.

The special features and functions of the house and building system 736 are shown in the table of FIG. 23a that lists both the common and the special unique features of the house and building system 736 from those associated with the other Proximity systems.

The prior art building and hotel door systems are currently access controlled with a card, key or some sort of Biometric ID code in the more secure facilities. Unfortunately all of these activation devices are usually different in every building and hotel and normally controlled by the building or hotel chain manager or owner. The old mechanical lock and key are rapidly being replaced with the magnetic programmable cards in both office and hotels. It is these new systems of interest since they all ready have activators 820L that can be activated by electronic devices like 810L and a description of this portion of the 1220a is again unnecessary. These systems are designed for the convenience of the employee or customer, and the building or hotel management. However there are still large administrative problems in both buildings and hotels because people forget, lose, or have their cards stolen. Also people are not required to put in PIN numbers because it would be too expensive to have key pads on every hotel door in addition to a electronic card reader unit. In addition the ability to lock the door from the inside in order to prevent unauthorized entry or opening the door while setting on the sofa is not now possible. The lost card and key problem would be greatly reduced and the room security and door opening convenience features would be available after incorporating the house and building system 736.

In accordance with the present invention, the predetermined door codes would be generated either manually or by a hotel or building computer code generator and the information inserted into the persons wireless device such as a persons 710a cell phone or pager. The life span of the authorization could be put in the wireless device, such as two days expiring at 12:00PM on the second day. The ability to change the lock codes stored in the legacy interface unit 1220a for security purposes plus the ability to monitor which employees entered the room and when they entered would become very easy since the database in the lock could be changed and interrogated by using the building manager cell phone and a special macro menu designed to work with the legacy interface unit 1220a. The PIN number to activate the device could be inserted by the customer or employee, so that the door could not be opened until the PIN number was entered that allowed the 710a device to transmit the door authorization information inserted by the building manager or hotel check in clerk. Thus if the person 710a phone or pager was stolen the door could not be opened because the door transmit mode could not be activated. The management tools for employee job performance and contract monitoring alone would pay for this system. In buildings the custodial company would also have to have their own codes so theft and breakage problems would be much easier to resolve. Security company personal would also have to be more accountable regarding their actual activities versus their required contractual activities. In the case of hotels and resorts the wireless device 710a could also be used to activate the vending machines, SPA room, in room video movies, and other additional services and have them automatically added to the bill. These additional service could again only be activated after a guests entered his PIN number into the wireless device 710a and the extra service machine validated that the guests was still checked into the hotel by operating via the legacy authorization transaction unit 1230 unit via line 729a and 760 connected to the hotel database computer 750.

The special features and functions of the Building and Hotel 732 PATAS system are shown in the table of FIG. 23b that lists both the common and the special unique features of the 732 PATAS from those associated with the other Proximity systems.

The prior art house door systems are currently access controlled with a card, key or some sort of Biometric ID code in the more secure homes and gated communities. Fortunately, or unfortunately, all of these 810L activation devices are usually different in every house or subdivision and normally controlled by the builder or home owner association if not by the home owner. The old mechanical lock and key systems are slowly being replaced with the keypad associated with the home security systems. It is these new systems that are of interest since they all ready have activators 820L that can be activated electronically like 810L and a description of this portion of the legacy interface unit 1220a is again unnecessary. These systems are designed primarily with security in mind and for the convenience of the home owner.

However there are still problems because people forget their HIN (Home Identification Number), lose, or have their keys or cards stolen. Also people living in the newer and increasing popular gated communities have to have two sets of access devices and or HIN's to administer. Changing the locks or assigning temporary pass codes for guests is also prohibitively expensive for individual homes. In addition the convenience of locking the door from the inside in order to prevent unauthorized entry or opening the door while setting on the sofa to let in a guest is not now possible. The expense would be greatly reduced and the room security and door opening convenience features would be available with the house and building system 736.

The predetermined door codes would be generated either manually following a menu embedded in the wireless device 710, such as a cell phone or pager or they could be inserted by a security service computer code generator and the information inserted into the wireless device 710a, such as a persons regular house phone, cell phone, or pager or all three using an automatic down load over the persons land line link and wireless service links.

The life span of the temporary authorizations could be put in the wireless device 710a of the guest and set to expire on the day the guests departs. The ability to change the legacy interface unit 1220a lock codes for security purposes plus the ability to monitor which persons entered the room and when they entered would become very easy since the database in the lock could be changed and interrogated by the home security service provider or read out using the home owners cell or home phone with a special macro menu designed to work with the legacy interface unit 1220a lock unit.

The PIN number to activate the wireless device 710a, housing the activation codes, could be inserted by the home owner or guest, so the door could not be opened until the PIN number was entered that allowed the wireless device 710a device to transmit the door authorization codes. Thus if the persons wireless device 710a, such as phone or pager, was stolen the door could not be opened because the door transmit mode could not be activated. Note that if a home used the house and building system 736 described above along with the garage and office building access systems described above, only one wireless device 710a that in most case the owner keeps very good track of, could be used for gate, business, home, and garage door access by just choosing the name on the home or cell phone display and pressing a special function key as shown in FIG. 6 or the normal device send key. Thus the benefits start to become evident of converting all the 10 to 20 proximity systems encountered by individuals in their every day life so that the proximity systems will operate with the few 1 to 3 inseparable communication and computer devices carried by almost every person at home and/or business. The practical aspect of the invention conversion approach is that, the existing devices operating the proximity system will still operate the system after the conversion, so that original customer bases and equipment investments are preserved.

The special features and functions of the house and building system 736 are shown in the table of FIG. 23c that lists both the common and the special unique features of the house and building 736 from those associated with the other Proximity systems.

Figure 13:
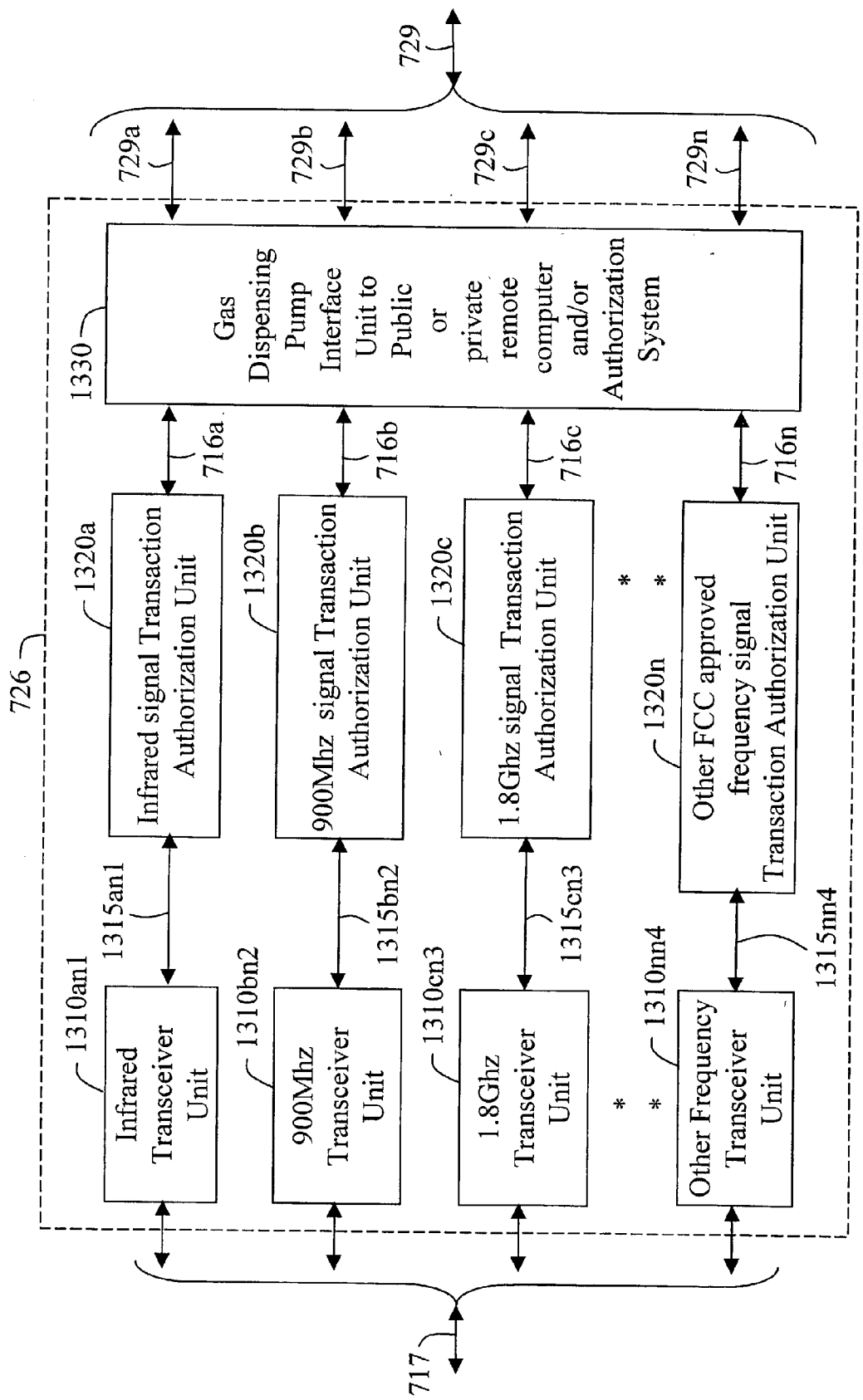
FIG. 13 is a block diagram showing the elements of a local gas dispensing system multiple signal detection and transaction unit.

In FIG. 13, the gas station system 726 is shown in more detail. The gas station system 726 includes the AWAU 719 elements and the legacy activation transaction unit 830 elements both incorporated into the gas station system 726. In other words, the gas station system 726 includes a plurality of wireless transceivers 1310an1, 1310bn2, 1310cn3 and 1310nn4, a plurality of legacy interface units 1320a, 1320b, 1320c, and 1320n, and a legacy authorization transaction unit 1330.

The wireless transceivers 1310an1, 1310bn2, 1310cn3 and 1310nn4 are similar in construction and function to the wireless transceivers 810an1, 810bn2, 810cn3 and 810nn4, which were described hereinbefore with reference to FIG. 8 except as discussed hereinafter. For purposes of brevity, the legacy interface units 1320a, 1320b, 1320c, and 1320n are similar in construction and function to the legacy activation units 820a, 820b, 820c and 820n, except that the authorization portion of unit 820L has been incorporated into the legacy interface units 1320a, 1320b, 1320c, and 1320n and the activation portion of 820L is omitted for the reasons discussed earlier (i.e. no changes in the service activation elements are contemplated in this invention). The legacy activation transaction unit 1330 is similar in construction and function as the legacy activation transaction unit 830, except as discussed hereinafter.

The activation by wireless devices 710a through 710n via 717 to elements 1310an1 through 1310nn4 along with their connections to 1320a, 1320b, 1320c, and 1320n respectively via lines 1315an1, through 1315nn4 respectively is identical in operation as 810an1 through 810nn4 and 815an1 through 815nn4 in FIG. 8 discussed previously.

Most prior art gas systems only dispense gas to vehicles after the person has either paid inside, or paid outside at the pump. The inside payment system will be covered in the description of the store checkout system 728 described with reference to FIG. 14.

There are two methods to pay out side of which the most prevalent is credit or debit cards. The electronic tags such as an 710L unit made by Texas Instruments to work with the 820L special series 5000 reader systems and those 710L and 820L units are being tried by Mobil company. However no large acceptance of such a 710L specialty device over the credit card is evident. The trend in this market for specialty wireless authorization and activation devices is the same as for example the toll and parking gate access systems in that, specialty devices have been developed with no multiple service or standard protocol capability. Thus a consumer must carry yet another device, and remember yet another set of procedures in order to use the wireless service. In most cases the convenience benefit does not warrant the extra learning and device carrying effort the consumer must expend. The preferred 710 unit device for the gas station system 726 is a 710a Infrared signaling type such as the Nokia dual mode digital phone because it requires the customer to be out of the car in close proximity to the 820L dispenser and have the AWPS patent application Ser. No. 09/325,5000 modification would force the high powered portion of the phone to be turned off for possibly safety liability reasons.

Note that the Biometric features described in connection with FIG. 5 could be required for activation (not authorization). The purposes would be similar to those for ATM's and secure building access systems described earlier which are to have better ability to find stolen credit numbers and resolve credit charge disputes.

Figure 14:
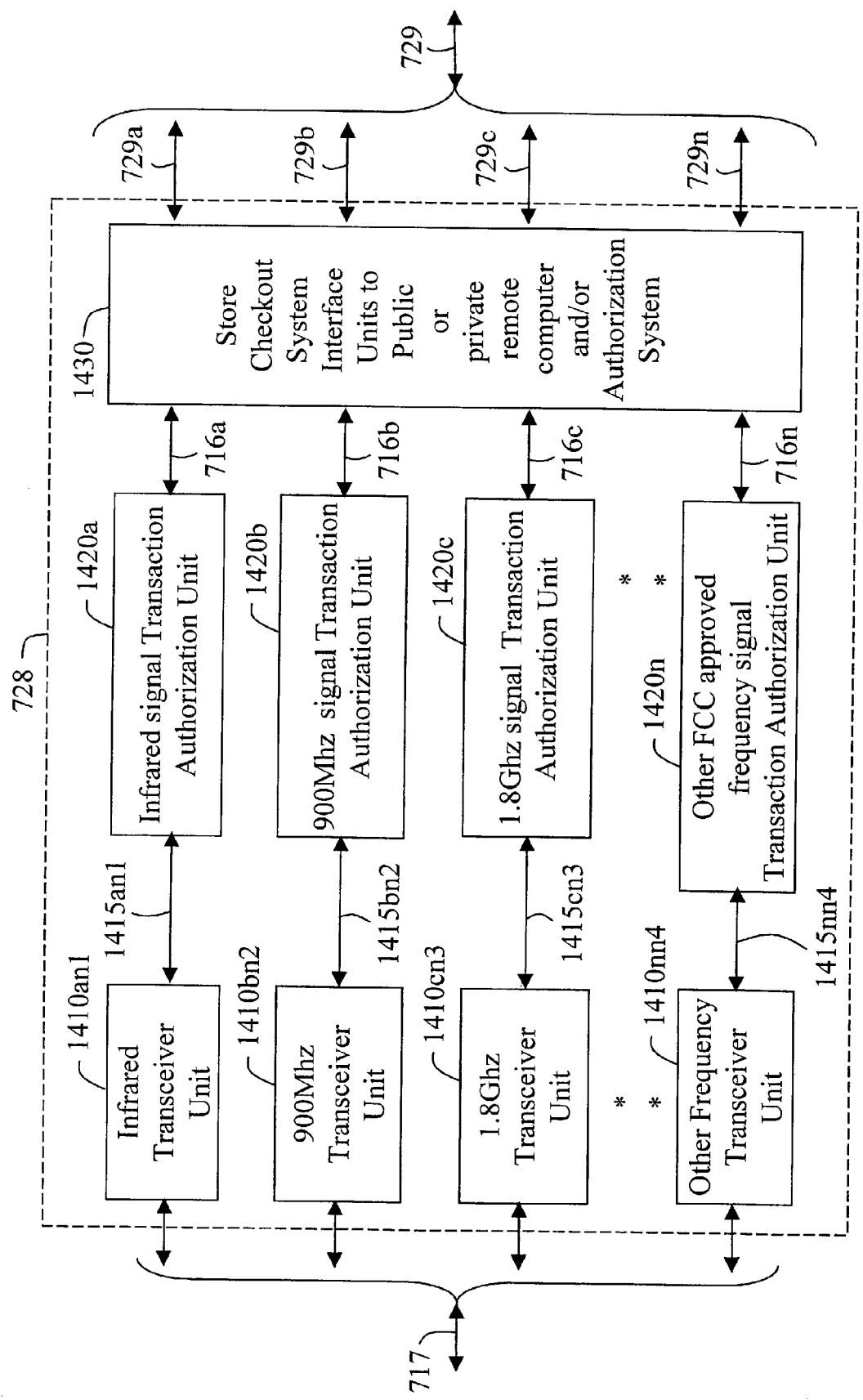
FIG. 14 is a block diagram showing the elements of a local store checkout system multiple signal detection and transaction unit.

The special features and functions of the Gas station system 726 are shown in the table of FIG. 24 that lists both the common and the special unique features of the gas station system 726 from those associated with the other Proximity systems In FIG. 14, the store checkout system 728 is shown in more detail. The store checkout system 728 includes the AWAU 719 elements and the legacy activation transaction unit 830 elements both incorporated into the store checkout system 728. In other words, the store checkout system 728 includes a plurality of wireless transceivers 1410an1, 1410bn2, 1410cn3 and 1410nn4, a plurality of legacy interface units 1420a, 1420b, 1420c, and 1420n, and a legacy authorization transaction unit 1430.

The wireless transceivers 1410an1, 1410bn2, 1410cn3 and 1410nn4 are similar in construction and function to the wireless transceivers 810an1, 810bn2, 810cn3 and 810nn4, which were described hereinbefore with reference to FIG. 8 except as discussed hereinafter. For purposes of brevity, the legacy interface units 1420a, 1420b, 1420c, and 1420n are similar in construction and function to the legacy activation units 820a, 820b, 820c and 820n, except that the authorization portion of unit 820L has been incorporated into the legacy interface units 1420a, 1420b, 1420c, and 1420n and the activation portion of 820L is omitted for the reasons discussed earlier (i.e. no changes in the service activation elements are contemplated in this invention). The legacy activation transaction unit 1430 is similar in construction and function as the legacy activation transaction unit 830, except as discussed hereinafter.

The activation by wireless devices 710a through 710n via 717 to the wireless transceivers 1410an1 through 1410nn4 along with their connections to the legacy interface units 1420a, 1420b, 1420c, and 1420n respectively via lines 1415an1, through 1415nn4 respectively is identical in operation as 810an1 through 810nn4 and 815an1 through 815nn4 in FIG. 8 discussed previously.

Most 820L checkout stations only allow operation using cash, check, credit or debit cards and most have 830 interface units connected via 729 and 760 to credit service operation centers 750. All of these activation devices are well known but different methods and procedures are followed by different store owners and the procedures vary widely by country. However because money is involved more Identification and Biometric information is the growing trend such as the handwriting machines now being employed by Best Buy company that records the persons credit card signature on every credit purchase. Also, it has always been a concern for example that a person card or other ID information is made available to store clerks that might be enticed to sell such information to unauthorized groups in the business of cashing bogus checks for example. A cell phone or pager unique number capability and the built in billing system associated with them would allow stores and opportunity to immediately expand their customer base by allowing users to enter all of their credit card information from their cell phone or pager unit in a more convenient and safe manner. In addition the store could input their incentive cards now issued separately into the customers cell phone and automatic shopping points would be credited to their account upon each purchase. A more advanced store system might have automatic drawings that gives out prizes to one of each person in a store, say every 15 minutes by keeping track of those persons in the store having a 710 unit. People not having the wireless 710 unit operating with the store checkout system 728 would have to enter their store shopping number manually when they entered the store in order to be in the contest. Those entering the contest manually would be erased every time a winner was selected and would have to renter their number in order to be eligible for the next drawing. Whereas, the wireless device 710a owner would automatically be entered into the contest and automatically be removed when they left the store or was a winner which ever occurred first. Also expanded store service fee's could be generated if the Pico Pay feature was added to each store checkout system 728. For example if each large store such as Wal-mart or Best Buy collected an additional $100 an hour (this would be for example 300 customers an hour using the machines at $0.35 cent per call) a store would generate an additional $72,000 a month profit per store in the chain. Also other services such as e-mail, stock quotes, etc could be provided to customers for very nominal fee, over their cell phones devices while they were shopping because no customer air time charges are involved, while the legacy customers used their credit cards with the old physical manual method.

Again, special authorization and activation considerations would be added to the activation portion of the wireless transceiver 1410an1 and the legacy interface unit 1420a. Although these can be implemented in a number of ways by those skilled in the art a preferred method which improves the existing checkout methods is as follows. A two activation signal and signal strength recognition system is incorporated into the wireless transceivers 1410an1 through 1410nn4 and the legacy interface units 1420a through 1420n wherein a first signal type such as low power 900 Mhz to allow store wide Pico pay service protocol activates the store service center including the special free store services that would be provided to the customer while in the store such as the coupon discounts of the day, store shopping points allocation, and the contest drawings described earlier that might be effective. The second preferred activation signal would be that required for actual credit card checkout and the close proximity 710a Infrared signal type is preferred in order to control the correlation of the person with the checkout counter.

The special features and functions of the store checkout system 728 are shown in the table of FIG. 25 that lists both the common and the special unique features of the store checkout system 728 from those associated with the other Proximity systems.

Figure 15:
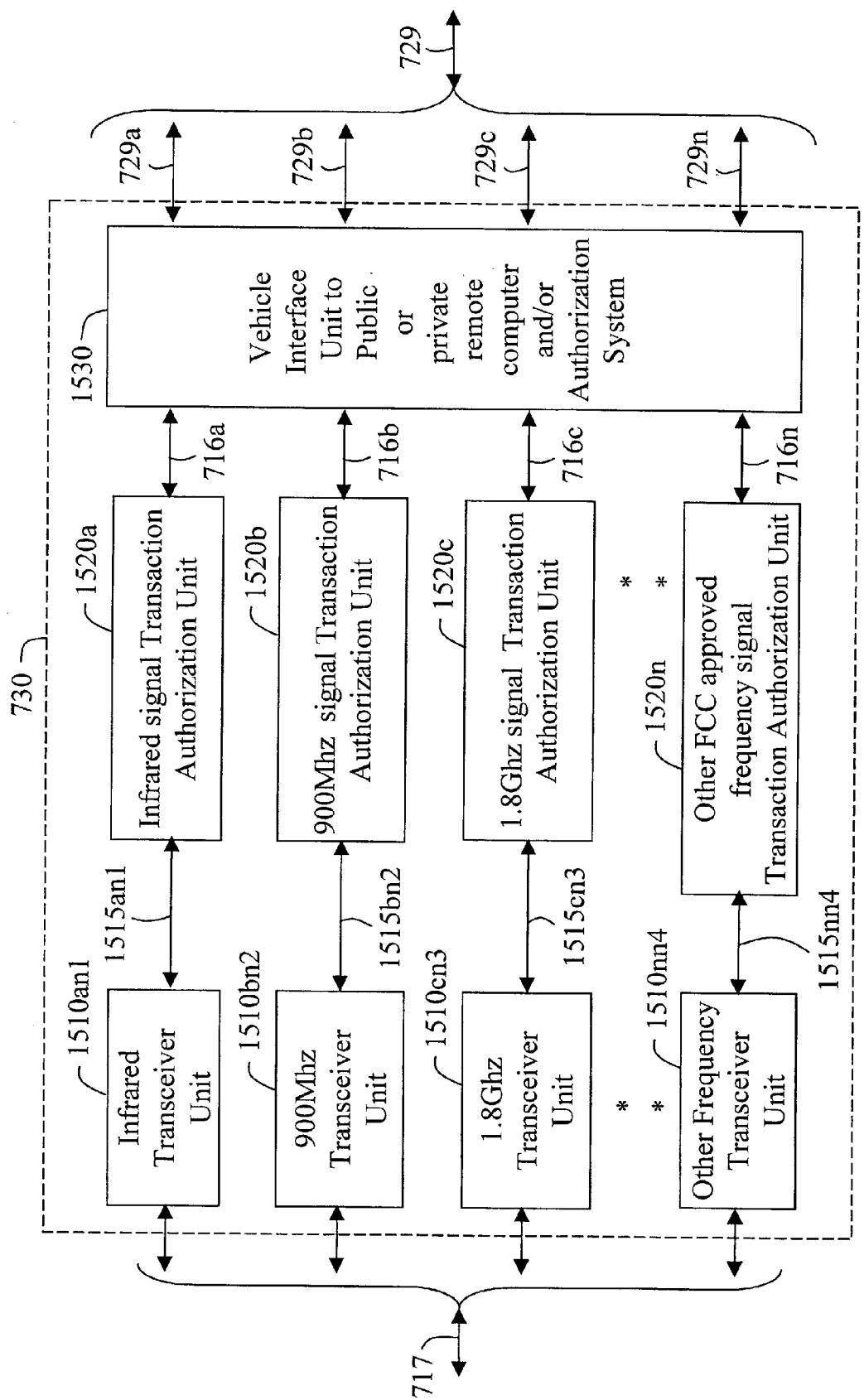
FIG. 15 is a block diagram showing the elements of a local vehicle system multiple signal detection and transaction unit.

In FIG. 15 the vehicle system 730 is shown and is discussed here separately since they only use keys, door entry pads or wireless entry devices at present. The incorporation of the vehicle system 730 would be much less expensive than the special wireless 710L devices currently being used. Also, the vehicle system 730 as described would quickly spread to world acceptance and be a great convenience to travelers renting cars so that several pairs of bulky keys would not be necessary.

In FIG. 15, the vehicle system 730 is shown in more detail. The vehicle system 730 includes the AWAU 719 elements and the legacy activation transaction unit 830 elements both incorporated into the vehicle system 730. In other words, the vehicle system 730 includes a plurality of wireless transceivers 1510an1, 1510bn2, 1510cn3 and 1510nn4, a plurality of legacy interface units 1520a, 1520b, 1520c, and 1520n, and a legacy authorization transaction unit 1530.

The wireless transceivers 1510an1, 1510bn2, 1510cn3 and 1510nn4 are similar in construction and function to the wireless transceivers 810an1, 810bn2, 810cn3 and 810nn4, which were described hereinbefore with reference to FIG. 8 except as discussed hereinafter. For purposes of brevity, the legacy interface units 1520a, 1520b, 1520c, and 1520n are similar in construction and function to the legacy activation units 820a, 820b, 820c and 820n, except that the authorization portion of unit 820L has been incorporated into the legacy interface units 1520a, 1520b, 1520c, and 1520n and the activation portion of 820L is omitted for the reasons discussed earlier (i.e. no changes in the service activation elements are contemplated in this invention). The legacy activation transaction unit 1530 is similar in construction and function as the legacy activation transaction unit 830, except as discussed hereinafter.

The requirement for actual physical keys would not be necessary in the future because the owner would know the car codes and the procedures to temporarily put them in other wireless cell phones in case they lost their phone or wanted to let a friend borrow their car. Also the reliability issue is solved because the ignition system activation unit would not turn off just because a cell phone became inoperative while the engine was running. In the preferred embodiment the cell phone is only required to activate the vehicle engine each time the engine is started, once started the vehicle ignition 820L and cell phone 1520a circuit is deactivated.

However, the owner can activate a deactivation mode recommended in the preferred embodiment that allows the vehicle to be turned off from a remote wireless transmitter operated by the owners wireless pager service provider. Again this is a service that can be provided by an Internet Service Provider (such a system is described in a co-pending application) world wide by subscribing to the service, for say, $1 a month and providing the ISP special codes related to the MID of the vehicle to turn off the key activation unit.

The above anti theft system is much less expensive than the current electronic anti theft systems on the market. The wide acceptance would greatly reduce the cost of both the vehicle entry system and the ignition activation systems because of the volume. The rent car companies would enjoy such a system because they could put the keys in the customers cell phone or pager and the keys would expire if the customer did not return the vehicle within a predetermined time period. Also the rent company, could deactivate the vehicle using the anti theft procedure described above. Trucking companies and toll collection authorities could use the preferred embodiment features associated with vehicle location and gate activation that is different than the preferred embodiment for the toll systems described in connection with FIG. 9 that used the owners mobile 710a through 710n wireless device for activation with the legacy interface units 920a through 920n for the toll/subway systems 722.

This preferred embodiment allows the toll function to be activated by one of the vehicle mounted ignition units 1520a through 1520n operating with one of the legacy interface units 920a through 920n for the toll/subway systems 722 rather than one of the wireless devices 710a through 710n. Such a design would allow automatic vehicle monitoring world wide using an ISP for just pennies per day for each vehicle tracked. for example. The monitoring would not require GPS equipment but would rely on frequent passage of vehicles by Pico Pay and Gas station systems that automatically activate and time stamp the vehicle VIN transmitted by a predetermined one of the 1510a through 1510n units. The inverse location system described above would cost very little to operate since it is completely passive to the vehicle operator and all of the location detectors are already connected to the WWW system via 1530 and 729 to 745 to 760 to 750. Also for a person to disable the location portion of the vehicle unit they would have to turn off their engine every time it sensed a toll booth, Pico Pay unit, or Gas station, or a building with a Pico pay phone or a Store system FIG. 728 with a Pico Pay system for example.

The special features and functions of the Vehicle system 730 are shown in the table of FIG. 26 that lists both the common and the special unique features of the vehicle system 730 from those associated with the other Proximity systems.

Figure 16:
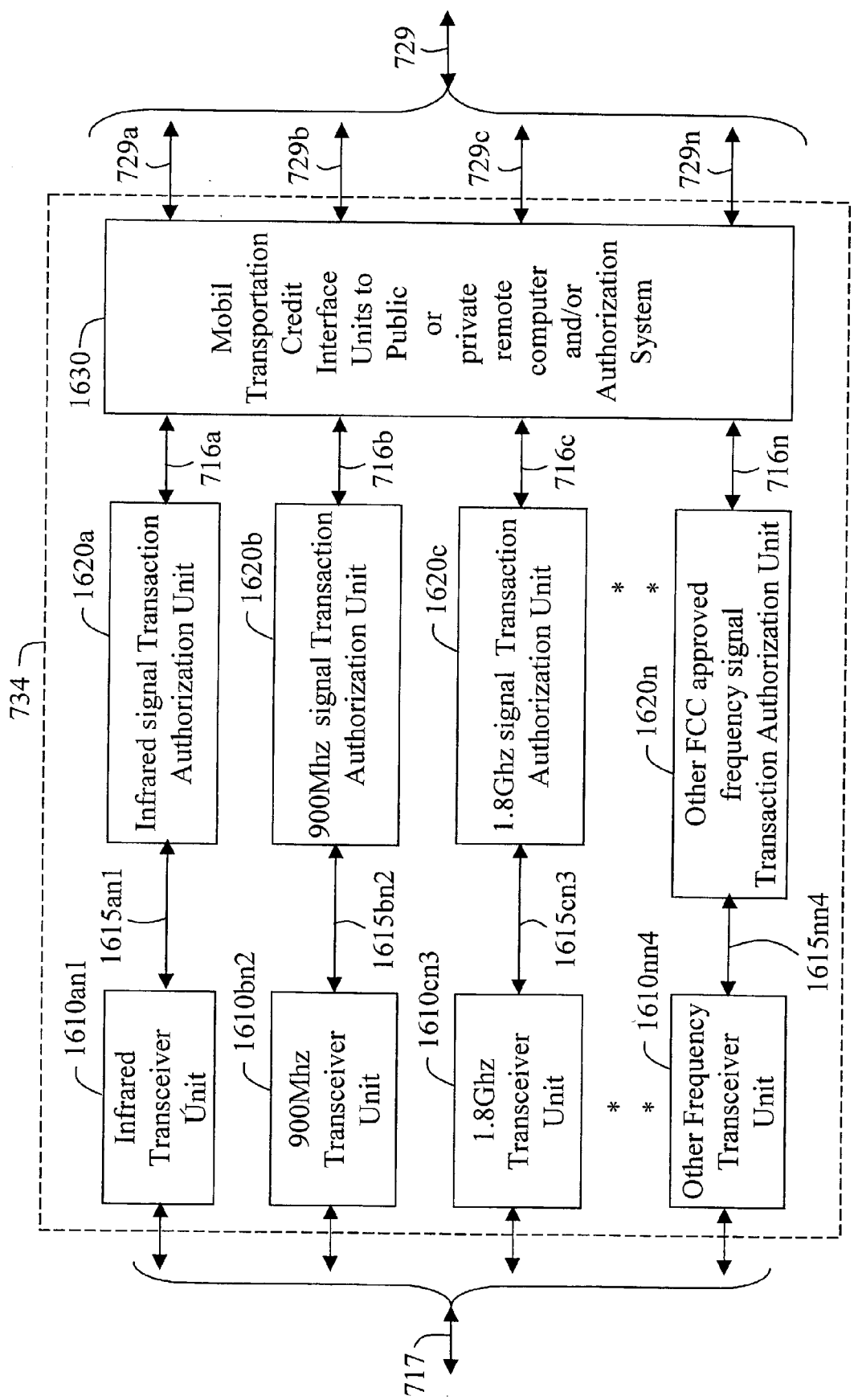
FIG. 16 is a block diagram showing the elements of a local mobile transportation credit system multiple signal detection and transaction unit.

In FIG. 16, the mobile transportation credit system 734 is shown in more detail. The mobile transportation credit system 734 includes the AWAU 719 elements and the legacy activation transaction unit 830 elements both incorporated into the mobile transportation credit system 734. In other words, the mobile transportation credit system 734 includes a plurality of wireless transceivers 1610an1, 1610bn2, 1610cn3 and 1610nn4, a plurality of legacy interface units 1620a, 1620b, 1620c, and 1620n, and a legacy authorization transaction unit 1630.

The wireless transceivers 1610an1, 1610bn2, 1610cn3 and 1610nn4 are similar in construction and function to the wireless transceivers 810an1, 810bn2, 810cn3 and 810nn4, which were described hereinbefore with reference to FIG. 8 except as discussed hereinafter. For purposes of brevity, the legacy interface units 1620a, 1620b, 1620c, and 1620n are similar in construction and function to the legacy activation units 820a, 820b, 820c and 820n, except that the authorization portion of unit 820L has been incorporated into the legacy interface units 1620a, 1620b, 1620c, and 1620n and the activation portion of 820L is omitted for the reasons discussed earlier (i.e. no changes in the service activation elements are contemplated in this invention). The legacy activation transaction unit 1630 is similar in construction and function as the legacy activation transaction unit 830, except as discussed hereinafter.

The activation by devices 710a through 710n via 717 to the wireless transceivers 1610an1 through 1610nn4 along with their connections to 1620a, 1620b, 1620c, and 1620n respectively via lines 1615an1, through 1615nn4 respectively is identical in operation as 810an1 through 810nn4 and 815an1 through 815nn4 in FIG. 8 discussed previously.

Most mobile transportation credit systems are currently installed in taxis and limousine services. Also most all of these services have wireless connections of their own to maintain communications with the driver. All of the current authorization systems use this wireless link to verify credit card information and get approval prior to releasing the passenger. Also, they must handle the customers card or take the card number verbally from the customer and enter it into the credit card verification unit. Many Taxis and limousine services are installing the swipe card unit versions like stores use that interface with the wireless modem and automatically dial and get credit authorization with out driver assistance after the card is swiped.

The improvement afforded by this invention is that (1) the customer can enter the credit information from his cell phone locally with out air time (i.e. without activating a wireless communication service provider) (2) the credit information can be approved locally using the approved SPIN data base as described in connection with the parking meter collection system and (3) the driver never has to stop or take his hands from the wheel or pay for wireless air time just to get paid. This authorization and collection system like the parking meter system, the toll system, the vehicle location system, the parking lot system, and the subway system all have the features amenable to allowing automatic world wide services when properly connected to a properly designed Web site designed to automatically operate and provide customer services based on a single set of customer ID and wireless device information and vehicle information. Such novel designed Web sites and ISP's are described in co-pending application No. 60/161,883, submitted by the inventor. They are not part of these inventions but these inventions make such Web sites feasible and are worth mentioning in this application.

The basic operation for authorization and approval of the service is the same as described in connection with the parking meter system shown in FIG. 11 and will not be repeated here. However the preferred collection methods are different and described as follows. After the customers credit is approved for the service the charges are compiled by the taxi meter and stored in the taxi data base. In the preferred embodiment a receipt is also printed out for the customer. The service charges are accumulated and delivered to the base station In one of several predetermined manners set by the company owner for each driver or shift. One manner is to down load the charge data each time the driver communicates with the base station automatically. This method would not require special scheduling software and not interfere with normal communications. The other would be that the data would download automatically when the service charges exceed a predetermined value selected by the owner. This download would be invisible to the driver. A third method would be to poll the vehicles in operation once and hour and send the collected revenue to the SPIN for collection. The SPIN would pay the taxi company and either debit the customers credit card account or add to a monthly service bill showing when, where and how much was paid for taxi and other transportation services that month.

Figure 17:
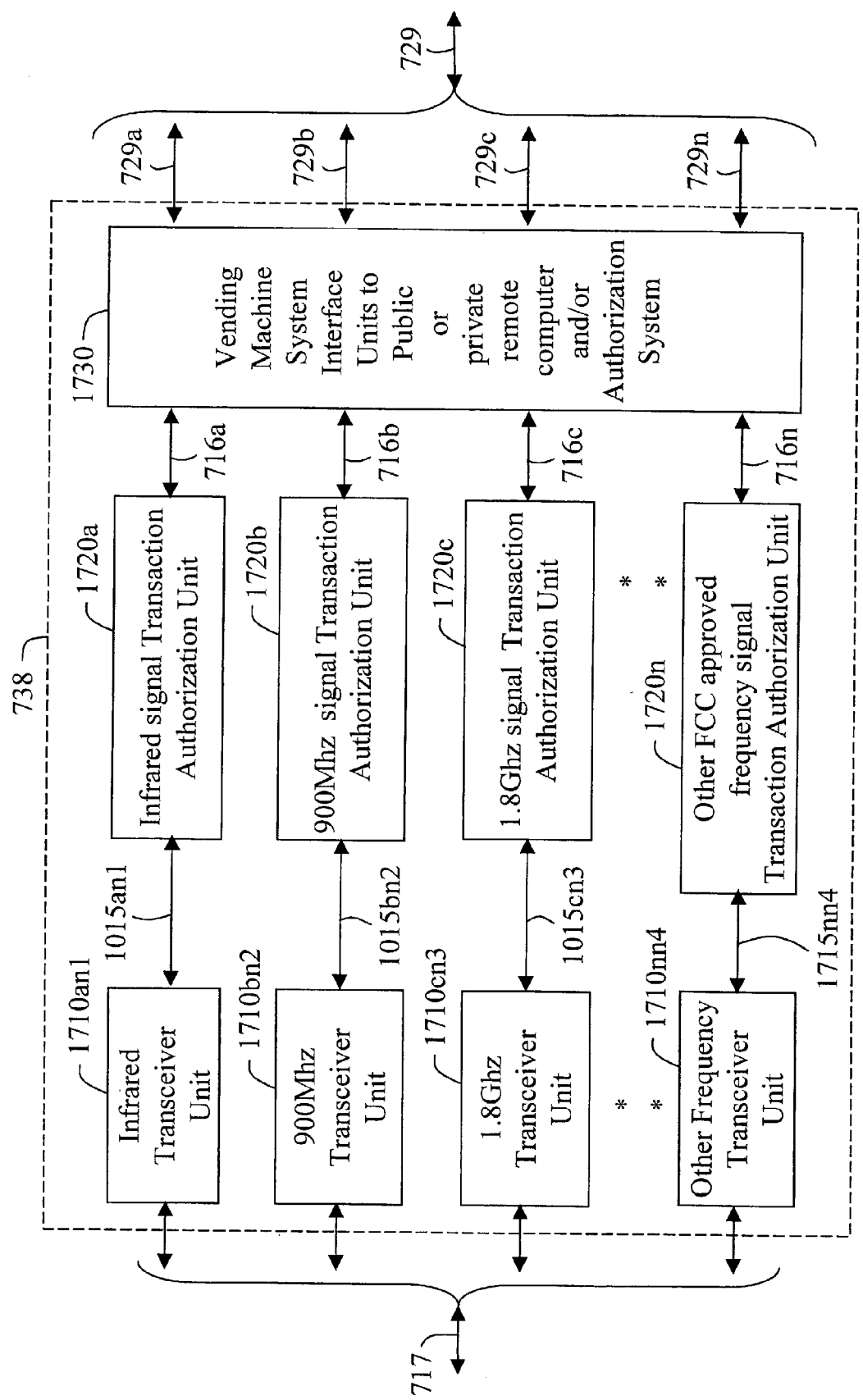
FIG. 17 is a block diagram showing the elements of a local vending machine multiple signal detection and transaction unit.

The special features and functions of the mobile transportation credit system 734 are shown in the table of FIG. 27 that lists both the common and the special unique features of the mobile transportation credit system 734 from those associated with the other Proximity systems In FIG. 17, the vending machine system 738 is shown in more detail. The vending machine system 738 includes the AWAU 719 elements and the legacy activation transaction unit 830 elements both incorporated into the vending machine system 738. In other words, the vending machine system 738 includes a plurality of wireless transceivers 1710an1, 1710bn2, 1710cn3 and 1710nn4, a plurality of legacy interface units 1720a, 1720b, 1720c, and 1720n, and a legacy authorization transaction unit 1730.

The wireless transceivers 1710an1, 1710bn2, 1710cn3 and 1710nn4 are similar in construction and function to the wireless transceivers 810an1, 810bn2, 810cn3 and 810nn4, which were described hereinbefore with reference to FIG. 8 except as discussed hereinafter. For purposes of brevity, the legacy interface units 1720a, 1720b, 1720c, and 1720n are similar in construction and function to the legacy activation units 820a, 820b, 820c and 820n, except that the authorization portion of unit 820L has been incorporated into the legacy interface units 1720a, 1720b, 1720c, and 1720n and the activation portion of 820L is omitted for the reasons discussed earlier (i.e. no changes in the service activation elements are contemplated in this invention). The legacy activation transaction unit 1730 is similar in construction and function as the legacy activation transaction unit 830, except as discussed hereinafter.

The activation by devices 710a through 710n via 717 to the wireless transceivers 1710an1 through 1710nn4 along with their connections to 1720a, 1720b, 1720c, and 1720n respectively via lines 1715an1, through 1715nn4 respectively is identical in operation as 810an1 through 810nn4 and 815an1 through 815nn4 in FIG. 8 discussed previously.

Vending machine systems are currently installed in almost every conceivable place and offer almost every conceivable product. Most all of these machine still require collections of coins and cash although in Europe a service company and a wireless company indicated they where going to work together so that vending machine purchases could be made after getting approval from the credit card company over the wireless phone, i.e. by activating the wireless communication service provider. Again, the airtime cost would probably cost more than the item being purchased from the service provider, such as the vending machine system. It should be said again, all the proximity systems and service described in these inventions do not require air time from the customer and in most cases from the service provider except where that is the normal mode of service provider communication such as with the Mobil Transportation Credit system. There are also some vending machines designed to use debit smart cards so the money is collected from pre approved smart card service providers. Except for the inconvenience of have to carry another card and go get it refilled when empty the debit card system has many of the features of this invention.

The advantages of the vending machine system 738 incorporating features of the present invention are that (1) carrying of cash or credit cards is eliminated (2) the vending machine system 738 become less vulnerable to theft and collections can be done each time the machine is serviced. Also similar to that described in connection with the parking meters where the collection from a wireless unit such as a cell phone and the machine money and inventory data is sent back to headquarters at the same time.

The customer and machine collection data is separated and the money data is sent to the SPIN companies and the machine product requirements are sent to the stocking department and on to the route person handling each machine. Again this authorization and collection system, like the parking system 732 for the parking meter and the parking lot, the toll/subway system 722, and the vehicle system 730 all have the features amenable to allowing a new type of world wide operating service providers other than credit card and phone companies.

For example when the individual machine reporting links are connected (they all report to a separate but pre determined 1-800 number in each country) to a properly designed Web site designed to automatically operate and provide vending machine services based on a single set of customer ID and wireless device information and Vending machine information even the machine product reports could be sent directly to the Vending machine companies along with the money data. Alternately the data could be sorted and posted in a manner to allow the data to be retrieved by the machine service organizations or individuals subscribing to the service directly from the web site upon entering the proper authorization codes.

The special features and functions of the vending machine system 738 are shown in the table of FIG. 28 that lists both the common and the special unique features of the mobile transportation credit system 738 from those associated with the other Proximity systems.

Detailed Description of the Invention Master Proximity Authorization System

Figure 29:
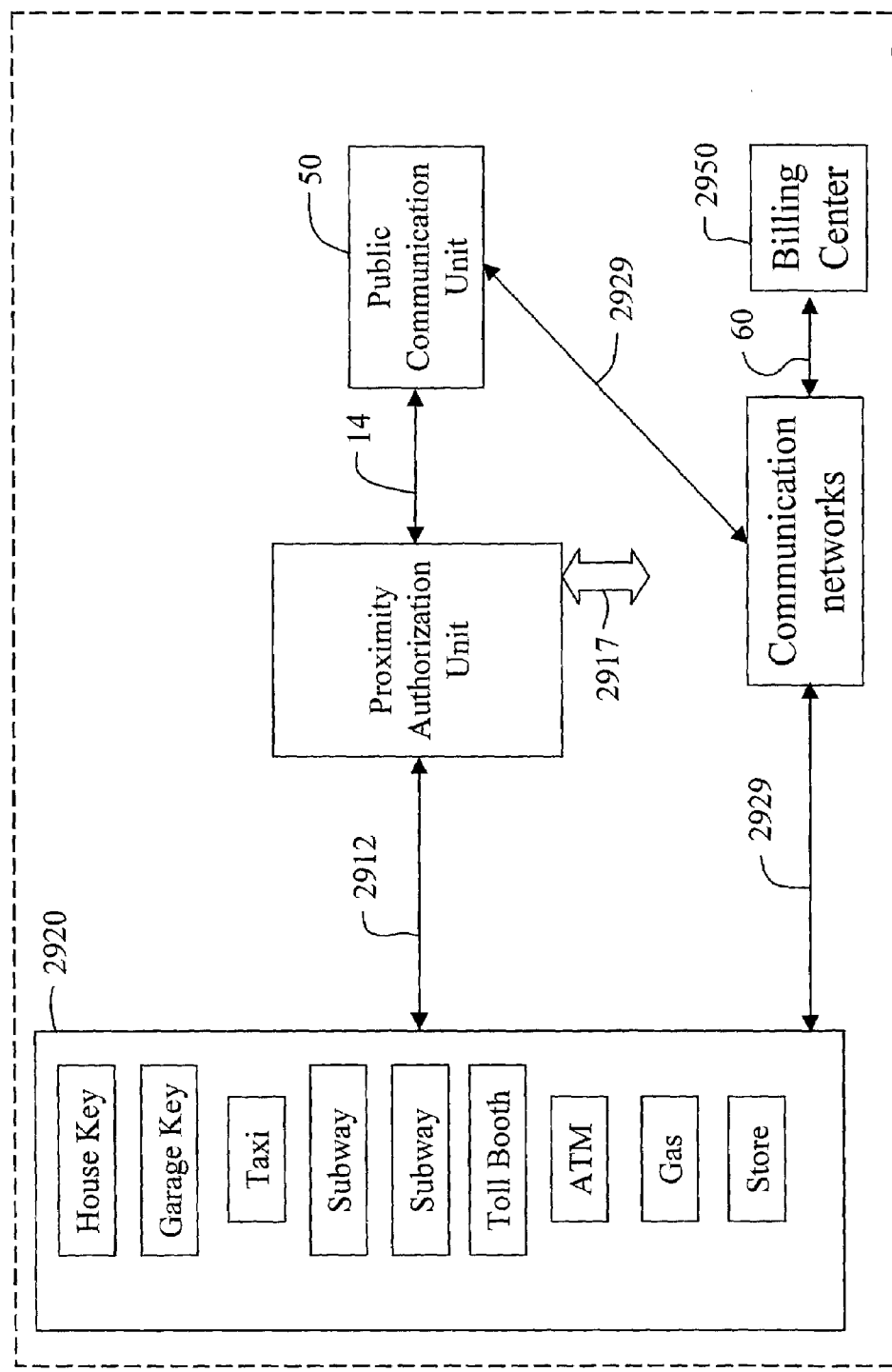
FIG. 29 illustrates common proximity services now operated by separate cards or keys or special signaling devices plus the low power proximity phone service (i.e. public communication unit) feature of the Invention.

Referring now to FIG. 29, shown therein and designated by the reference numeral 2900 is a Master proximity authorization system constructed in accordance with the present invention. The Master proximity authorization system 2900 is provided with a proximity authorization unit 2910, constructed in accordance with the present invention, for activating a plurality of proximity service units 2920 incorporating features of the present invention. Some of the Proximity Service Units 2920 are capable of receiving information via a first signal and some of the proximity service units 2920 are capable of receiving information via a second signal. Each of the proximity service units 2920 provide a predetermined service when activated in response to receiving a request authorization code.

The proximity authorization unit 2910 is provided with a portable housing 2911, a computer unit 3000, and a transmitter/receiver unit 3070. The computer unit 3000 is supported by the portable housing 2911 and has at least one and preferably a plurality of request authorization codes stored therein. Each of the request authorization codes uniquely identify the proximity authorization unit 2910. The transmitter/receiver unit 3070 is supported by the portable housing 2911. The computer unit 3000 retrieves the request authorization code and the transmitter/receiver unit 3070 outputs the request authorization code on the first signal for communication to the proximity service units 2920 capable of receiving the first signal, and the transmitter/receiver unit 3070 outputs the request authorization code via the second signal to the proximity service units 2920 capable of receiving the second signal.

The invention also relates to a unique method for activating proximity service units 2920 wherein each proximity service unit 2920 provides a predetermined service in response to receiving a request authorization code. A plurality of the proximity authorization units 2910 are provided. Each proximity authorization unit 2910 is capable of storing the request authorization code and a preamble code, and outputting the request authorization code and the preamble code. The preamble code includes a request for application program code. The preamble code is output by one of the proximity authorization units 2910. The preamble code outputted by one of the proximity authorization units 2910 is received by at least one of the proximity service units 2920. The proximity service unit 2920, which received the preamble code, outputs the application program code stored by the proximity service unit 2920 in response to receiving the preamble code. The application program code is received by the proximity authorization unit 2910 outputting the preamble code. The proximity authorization unit 2910 then outputs the request authorization code using the application program code received by the proximity authorization unit 2910.

The proximity service unit 2920 can be any device which provides a predetermined service upon activation. For example, the proximity service unit 2920 can be a house key system, a garage key system, a subway gate system, a taxi meter system, a parking lot gate system, a parking meter system, an ATM system, a vending machine system, a gas pump system, a store checkout system, a toll booth system, a vehicle control system, or the public communication unit 50 described herein before with reference to FIG. 1.

The proximity service unit 2920 communicates with the proximity authorization unit 2910 via either a wireless link 2912 or in some cases a physical link 2917. The physical link 2917 is described in more detail in connection with FIG. 5. The wireless link 2912 is preferably a low power wireless link which does not typically communicate farther than about 300 feet.

Also each of the proximity service units 2920 may be linked via lines 2929 to a network 2945 that is linked to a control or billing center 2950 via link 2960 that may use the internet or switched networks and others as shown in FIG. 1.

Figure 31:
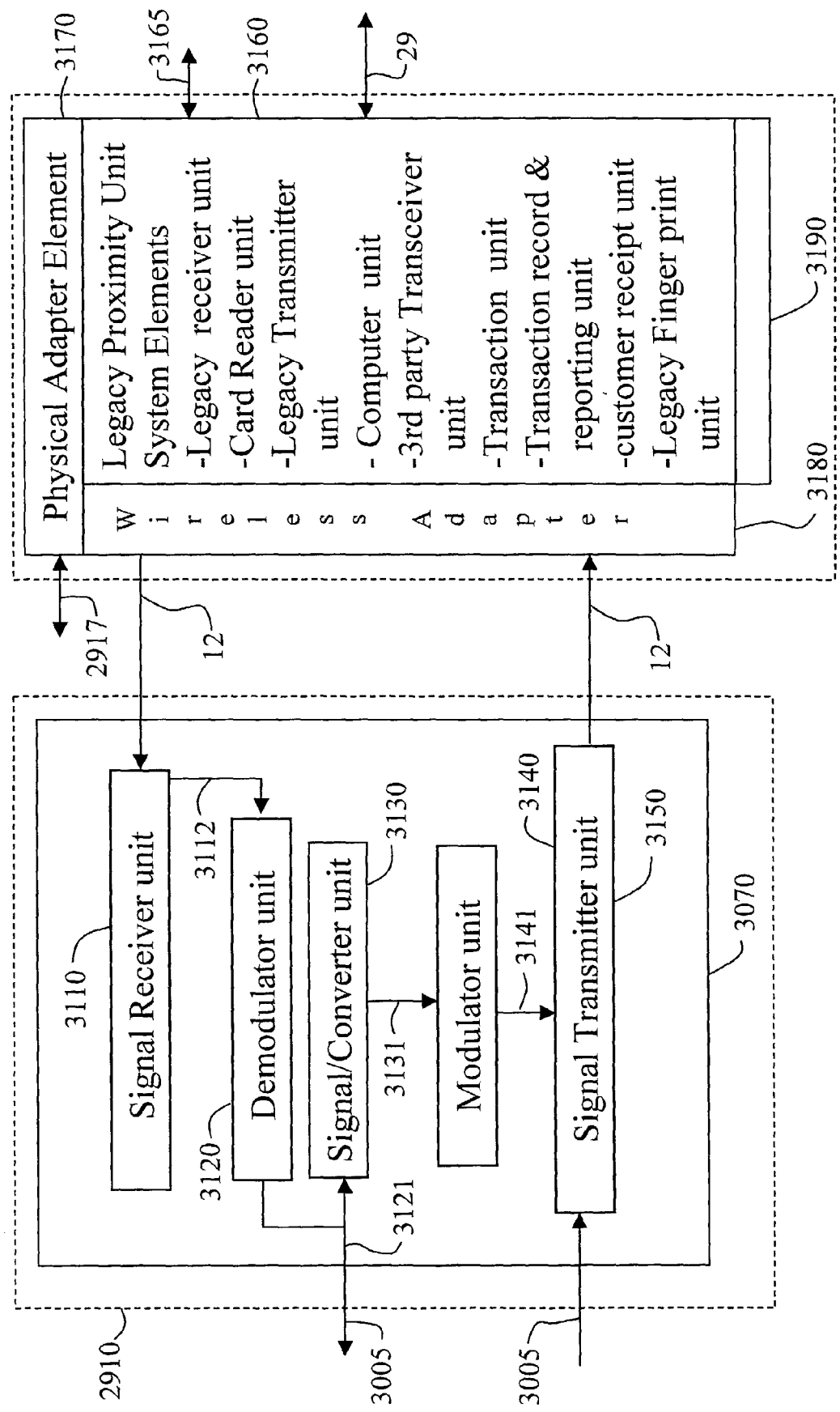
FIG. 31 is a block diagram showing a more detailed view of a transmitter/receiver unit of the proximity authorization unit of FIG. 30 and a more detailed view of a proximity service unit for use in the system depicted in FIG. 29.

Referring to FIG. 31, the proximity service units 2920 are provided with a legacy proximity unit 3160, a physical adapter element 3170, a wireless adapter element 3180, and a biometric adapter element 3190.

The legacy proximity unit 3160 includes legacy features for providing predetermined services, such as card reader unit, a transaction unit, a transaction record & reporting unit, a customer receipt unit and the like. If the proximity service unit 2920 is a vending machine for dispensing candy, the legacy proximity unit 3160 would include a housing for holding the candy and a system for dispensing the candy.

The physical adapter element 3170 receives at least a portion of the proximity authorization unit 2910 is utilized for providing the physical link 2917 between the proximity authorization unit 2910 and the proximity service unit 2920. For example, the physical adapter element 3170 can be a docking station.

The wireless adapter element 3180 can be a wireless transmitter/receiver unit for providing communication between the legacy proximity unit 3160 and the proximity authorization unit 2910 via the wireless link 2912. The wireless adapter element 3180 will be described in more detail below.

The biometric adapter element 3190 interfaces the proximity service unit 2920 to a biometric unit for utilizing an individual's unique biometric features as part of the authorization process prior to the proximity service unit 2920 providing the predetermined service.

In accordance with the present invention, the proximity authorization unit 2910 and the proximity service units 2920 can communicate via the wireless link 2912, the physical link 2917 and a combination of both the wireless link 2912 and the physical link 2917.

For example, when the proximity service unit 2920 is the vehicle control system the proximity authorization unit 2910 can be used to replace both the current legacy wireless door opening unit that comes with most cars today and the physical ignition key by interfacing the proximity authorization unit 2910 with the legacy vehicle control elements. The vehicle doors can be controlled as currently done whereas the vehicle ignition system can be made much more safe and theft proof if the proximity authorization unit 2910 is required to communicate with both the physical link 2917 for example and the wireless link 2912 or yet another wireless link before the vehicle ignition system will operate.

Further, in accordance with the present invention, the proximity service unit 2920 can be activated either automatically or manually by the proximity authorization unit 2910. For example, when the proximity service unit 2920 is a toll booth system, the toll booth system can be activated either automatically or manually by the proximity authorization unit 2910 when the vehicle is within a predetermined distance of the toll booth system. Further, dual signaling modes can be utilized. For example, the authorization process using the request authorization codes, such as owner codes delivered to the toll booth system from the proximity authorization unit 2910 can be activated for example at a first proximity distance, and the gate or light signal showing approval is done at a closer second proximity distance. This can be accomplished in one preferred embodiment by the wireless adapter element 3180 determining the signal strength of the request authorization code transmitted to the wireless adapter element 3180 by the proximity authorization unit 2910, for example.

As another example, the proximity service unit 2920 can also be the ATM system, or the vending machine system. The ATM system or the vending machine system can be activated either automatically or manually by the proximity authorization unit 2910 when the person is within a predetermined proximity distance of the ATM system or the vending machine system. The authorization process using the request authorization code transmitted to the ATM system or the vending machine system can be activated for example at one distance for services not requiring the owner of the proximity authorization unit 2910 to physically use the menu on the ATM system or the vending machine system. In accordance with the present invention, if the owner of the proximity authorization unit 2910 needs to physically use the menu on the ATM system or the vending machine system, the menu operation can be enabled at a closer distance using the signal strength detected by the wireless adapter element 3180, for example. In the case of the ATM system and the vending machine system, the request authorization code can be transmitted to the wireless adapter element 3180 to begin the authorization process, and a physical connection between the proximity authorization unit 2910 and the physical adapter element 3170 can be used to activate the menu services.

Further, in accordance with the present invention when the proximity service unit 2920 is the gas pump system, the gas pump system can be activated either automatically or manually by the proximity authorization unit 2910 when the vehicle is within a predetermined proximity distance of the gas pump system. In addition, in accordance with the present invention, the authorization process using the request authorization codes transmitted to the proximity service unit 2920 can be activated for example at one distance, and the gas pump system can be activated to pump gas at a closer distance. This can be accomplished by incorporating a signal strength detector in the wireless adapter element 3180.

If the proximity service unit 2920 is the store checkout system, the store checkout system can be activated either automatically or manually by the proximity authorization unit 2910 when the proximity authorization unit 2910 is within a predetermined proximity distance of the store checkout station. The authorization process using the authorization request codes transmitted to the wireless adapter element 3180 of the proximity service unit 2920 from the proximity authorization unit 2910 can be activated for example at a first proximity distance. The proximity service unit 2920 can deliver special services to the customer via the audio or video elements of the proximity authorization unit 2910 or send greetings to regular customers for example telling them of store specials. The store checkout system can approval the transaction at a second proximity distance (which is closer than the first proximity distance) using either the signal strength detected by the wireless adapter element 3180 or using the physical adapter element 3170 to deliver the correct authorization information to the store checkout system.

In all of the above descriptions the authorization information that can be stored in the proximity authorization unit 2910 for delivery to the proximity service units 2920 can include credit card numbers plus PIN or special local authorization numbers such as a Service Provider Identification Number (SPIN) wherein the proximity service units 2920 can locally approve the transaction as described in more detail in connection with FIGS. 2 and 6. In addition the proximity authorization unit 2910 can either automatically sense and determine the required signal type and/or protocol to be sent to one of the proximity service units 2920 such as for example would be the preferred embodiment in the toll booth system, or the owner can program the proximity authorization unit 2910 unit to manually delivery of the request authorization code information with some proximity service units 2920 and automatically deliver the request authorization code information to other proximity service units 2920.

The proximity authorization unit 2910 menu controlled code and communication modes are described in more detail in connection with FIGS. 30 and 32. Also the preferred embodiment of the proximity authorization unit 2910 code function capability includes on board Biometric code identification methods as described in connection with FIGS. 33 and 36. Biometric code identifiers are often required in both access and financial transaction authorization schemes today and probably will be more so in next generation systems where such methods can greatly reduce theft.

The requirement for remote code verification by the proximity service unit 2920 prior to transaction authorization would depend upon the proximity system owner and collection methods employed. The preferred embodiment does not require remote authorization to be employed for each local transaction as will be described in more detail in connection with FIGS. 30 and 34.

Figure 30:
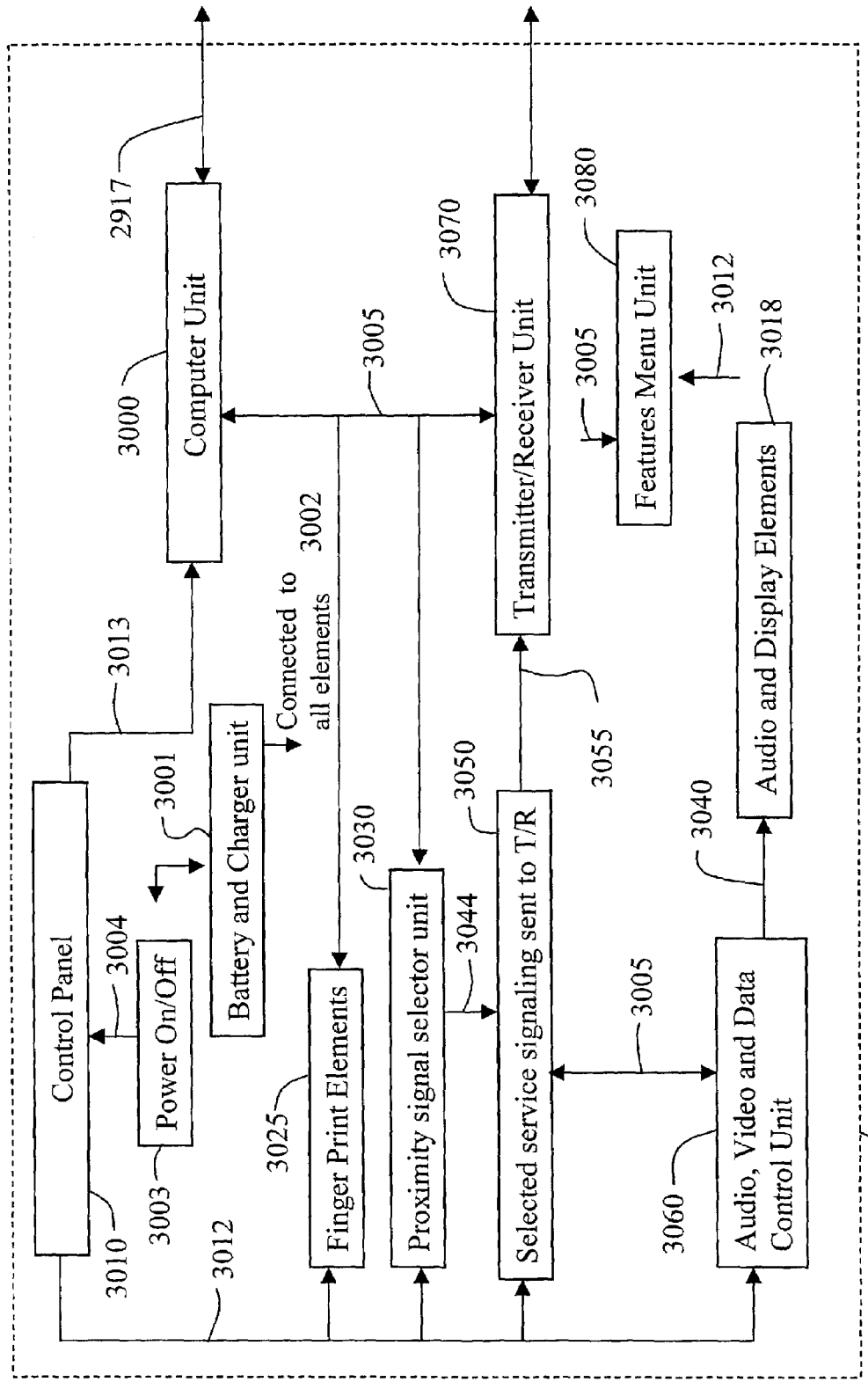
FIG. 30 is a block diagram showing a proximity authorization unit constructed in accordance with the present invention and for use in the system depicted in FIG. 29.

In FIG. 30 the basic design elements incorporated into the proximity authorization unit 2910 are shown wherein there is the computer unit 3000 such as a Motorola 68000 series or TI DSP 6000 series unit or a modified Ericsson Bluetooth Baseband Processor made to operate by the power on off unit 3003 which supplies power to all the elements of the proximity authorization unit 2910 via positive lines 3004 and ground lines 3002. The power on off unit 3003 is connected to a battery and charge unit 3001 and the computer unit 3000 program memory and stored request authorization codes and phone directories for example are maintained even when the proximity authorization unit 2910 is turned off by a control panel 3010 via line 3013.

The computer unit 3000 controls the functions of the biometric unit 3025 via the computer control and command bus lines 3005 as more fully described in connection with FIG. 36. The main purpose of the biometrics unit 3025 is so that the owner can record their biometrics such as their fingerprint code in the biometric unit 3025 and require that for all selected transactions for example require the finger print of the person requesting the transaction to match the stored fingerprint.

The computer unit 3000 controls the functions of a signal selector unit 3030 via the computer control and command bus lines 3005 that selects the type of signal and or protocol that is sent to the service signaling unit 3050 via line 3044. The service signaling unit 3050 in turn sends the selection of the type of signal and/or protocol to the transmitter/receiver unit 3070 via line 3055 to be used in communicating with the wireless adapter element 3180 of the proximity service unit 2920 as more fully described in connection with FIGS. 31 and 34.

The signal selector unit 3030 is under the control of the computer unit 3000 sends command functions via line 3005 and the control panel 3010 sends manual selections via line 3012 so as to select either a signaling mode manually via line 3012 or automatically via computer control and command bus line 3005 for controlling the transmitter/receiver unit 3070 which sends the selected signal to the proximity service unit 2920 as described in connection with FIG. 3.

The signal selected by the signal selector unit 3030 is automatic when the computer unit 3000 has been placed in the automatic recognition mode via line 3013 from the control panel 3010 and most likely the signal selected will be that in either the 900 Mhz region, or IR spectrum or the 2.4 Ghz to 2.5 Ghz frequency range with a protocol representing the type of service the proximity authorization unit 2910 is near. Both the IR spectrum and the 2.4 Ghz to 2.5 Ghz is a frequency range designated globally for unlicensed low power use where as 900 Mhz is used in the cordless home phone systems.

The preferred method for the proximity authorization units 2910 and proximity service units 2920 to communicate in automatic mode is for the proximity service units 2920 to periodically send out a very low power burst telling the proximity authorization units 2910 in the area the MPTU is available for service (say a burst every 3 sec that last for several milliseconds) and then all proximity authorization units 2910 in automatic detection mode and are within detection range of say several hundred feet can have the signal selector unit 3030 select the required signal for communication with the proximity service unit 2910 and notify the service signaling unit 3050 via line 3044.

The preferred method for the proximity authorization units 2910 and the proximity service units 2920 to communicate in manual mode is for the type of service to be selected such as the ATM system or the vending machine system described above and when the owner of the proximity authorization unit 2910 wants the service a connect button on the control panel 3010 is activated and the line 3012 notifies both the signal selector unit 3030 and the service signaling unit 3050 of the type service signal to send and then the signal selector unit 3030 sends the selected signal to the service signaling unit 3050 via 3044.

The control panel 3010 is connected to all the other elements of the proximity authorization unit 2910 via the computer control and command bus lines 3012 which is used in conjunction with line 3013 and the computer unit 3000 computer control and command bus lines 3005 to program and or select the various features available with the proximity authorization unit 2910. A feature menu unit 3080 along with audio and display elements 3018 connected to the control panel 3010 are described in more detail in connection with FIG. 33.

In FIG. 31 the selected T/R signal is sent to both a receiver unit 3110 and a transmitter unit 3150 or as shown by line 3055. In addition the computer unit 3000 notifies a signal converter unit 3130 via the line 3005 how to encode and decode the signals. The encoded signals are sent to a modulator unit 3140 via line 3131 that in turn modulates the transmitter unit 3150 via a line 3141 in the proper fashion for the selected signal. The signals received by the receiver unit 31310 are sent to a demodulator unit 3120 via a line 3112 which in turn sends the demodulated signals to a signal converter unit 3130 via a line 3121 for decoding and conversion to digital format for processing by the computer unit 3000 via computer control and command bus line 3005.

The elements in the transmitter/receiver unit 3070 are all available in a number of available T/R modules such as the Ericsson Radio Module PBA31-301 for example. TI and HP have similar T/R modules for IR for example and there is a multiple mode (with two RF and one IR module that will be in production by Ericsson in the year 2000 for their R380 digital phone) that can be easily adapted to incorporate three RF (900 Mhz, 1.8 Ghz, 2.4 Ghz) and one IR signal types and the protocols into the 270 portion of the MPSU 10 unit.

In FIG. 31, the communication between the transmitter/receiver unit 3070 of the proximity authorization unit 2910 and the proximity service unit 2920 is via line 2912, when communication is wireless or via the physical link 2917 if communication is not wireless. The wireless connection ranges are predetermined and will vary from several hundred feet to only several feet in the case of IR signaling for example.

The existing legacy authorization elements 3160 present in any particular proximity service unit will vary depending upon a number of factors such as age of unit, type of proximity service unit, manufacturer of proximity service unit, etc. All of the elements shown in the legacy proximity units 3160 are available today and part of the prior art. The legacy proximity units 3160, by themselves, are not considered part of this invention as described in more detail in connection with FIG. 34.

For example, most proximity service units that accept credit cards such as the gas pump system, or the store checkout system have communication connections and thus interface via a line 2929 to a remote billing center 2950 via communication networks 2945. Another example would be proximity systems such as a vehicle toll gate and the garage key system that has a legacy proximity unit 3160 connected via a line 3165. The purpose of the interface units 3170, 3180, and 3190 is to add the additional capability required so that the legacy proximity unit 3160 will also be made to operate with one or more of the proximity authorization units 2910 connection and communication methods 17 or 12 as discussed in connection with FIG. 32.

Figure 32:
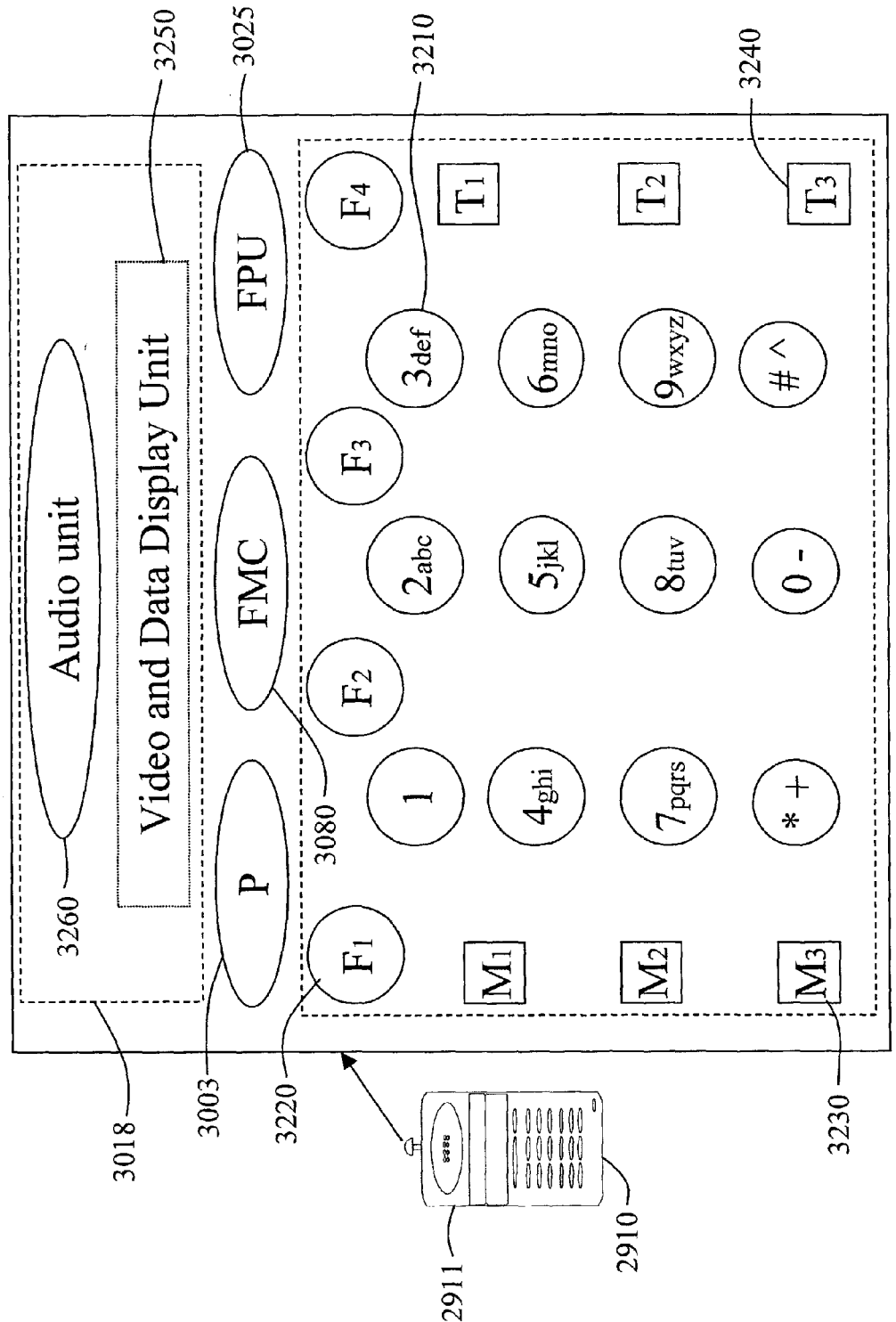
FIG. 32 is a block diagram showing a control unit allowing the owner to operate the various functions offered by the proximity authorization unit.

The preferred physical embodiment of the proximity authorization unit 2910 input and output functions is shown in FIG. 32. The audio and display elements 3018 have both visual output 3250 and audible output 3260 outputs such as found on many pagers, cell phones and PDA's.

The control panel 3010 includes an alphanumeric keyboard 3210 along with three groups of function keys 3220, 3230 and 3240. The feature menu unit 30280 is thumb controlled and the biometrics unit 3025 has both a finger print (FPU) input pad and a camera unit input (CU). The function key group 3220 represented by F1, F2, F3, and F4 may for example control record functions of the proximity authorization unit 2910, such as "record on demand" when F4 is pressed for example. When F4 is pressed then the audio unit 3260 is connected to the computer unit 3000 memory unit and the audio being spoken or received is stored.

Likewise F1 may be for Optical Recording, F2 may be for data entry recording and F3 may signal for recording to be done in a remote location as will be discussed in connection with the low power communication features of the public communication unit 50 in connection with FIG. 35.

The function key group 3230 represented by M1, M2, and M3 for example, can be used to play back or erase recorded data. The function key group 3240 represented by T1, T2, and T3 allow specific services to be addressed such as T1 may represent the wireless gate opening services for Toll and Parking lots for example. All of the Input and output elements of the proximity authorization unit 2910 physical preferred embodiment are available each from several sources and their operation well know to those skilled in the art.

Figure 33:
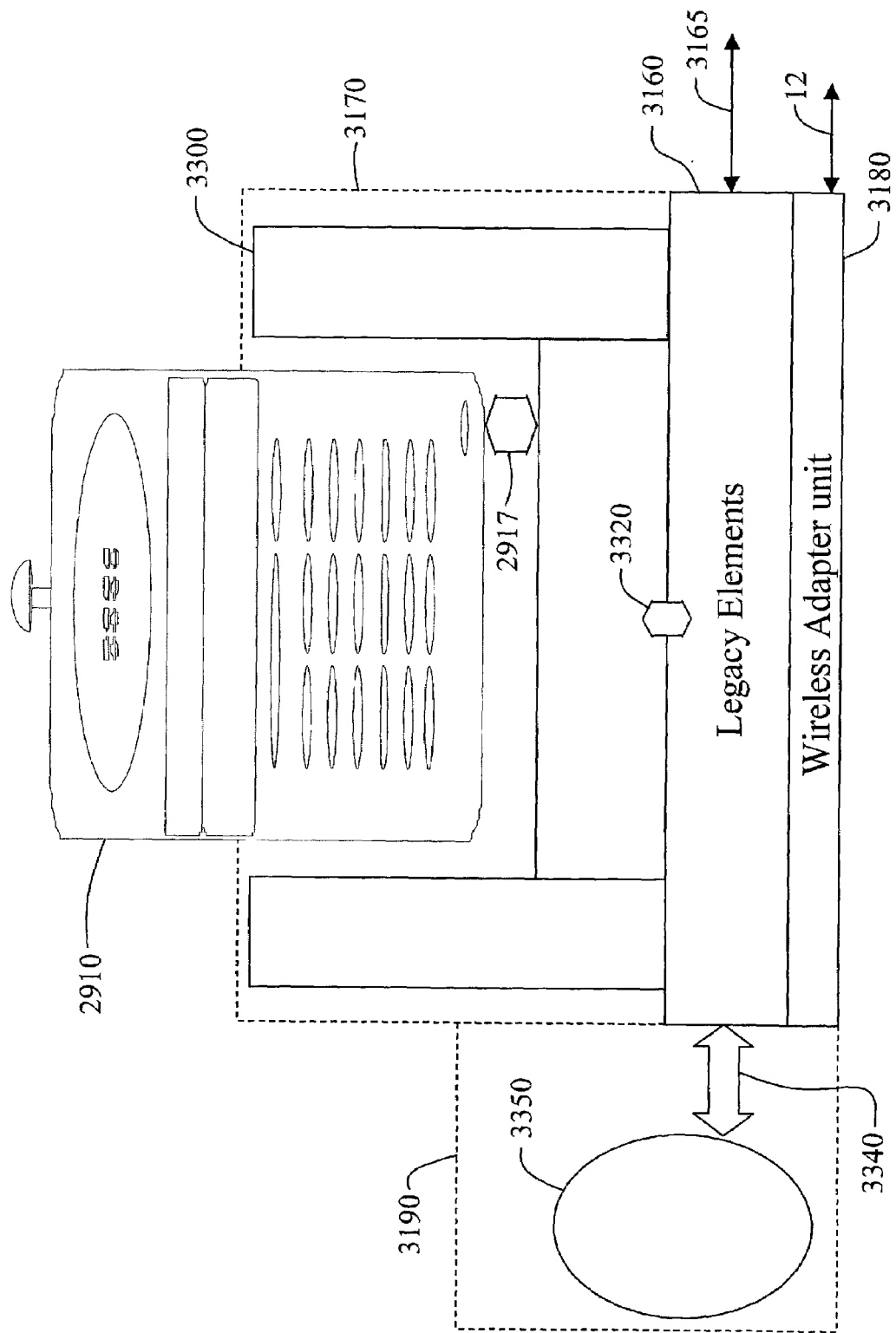
FIG. 33 is a block diagram showing a physical adapter element, constructed in accordance with the present invention, that allows direct readout of code information not requiring wireless signaling to be used.

FIG. 33 shows a method by which the proximity authorization unit 2910 can communicate with the proximity service units 2920 with out having to communicate in a wireless manner. The physical adapter element 3170 is depicted wherein a connector unit 3300 is connected to the legacy proximity units 3160 via connectors 3320 and data is transferred between the proximity authorization unit 2910 via the physical link 2917 desirably using a serial port such as an RJ 11 or newer USB port wherein in the preferred embodiment the male portion of the physical link 2917 is located in the connector unit 3300 and the female portion of the physical link 2917 is located in the proximity authorization unit 2910. A biometric adapter element 3190 is shown as an biometric input unit 3350 connected into the legacy proximity unit 3160 via a connector 3340. The logic flow of these physical adapter units with the legacy elements of 3160 are shown with the aid of FIG. 34.

Figure 34:
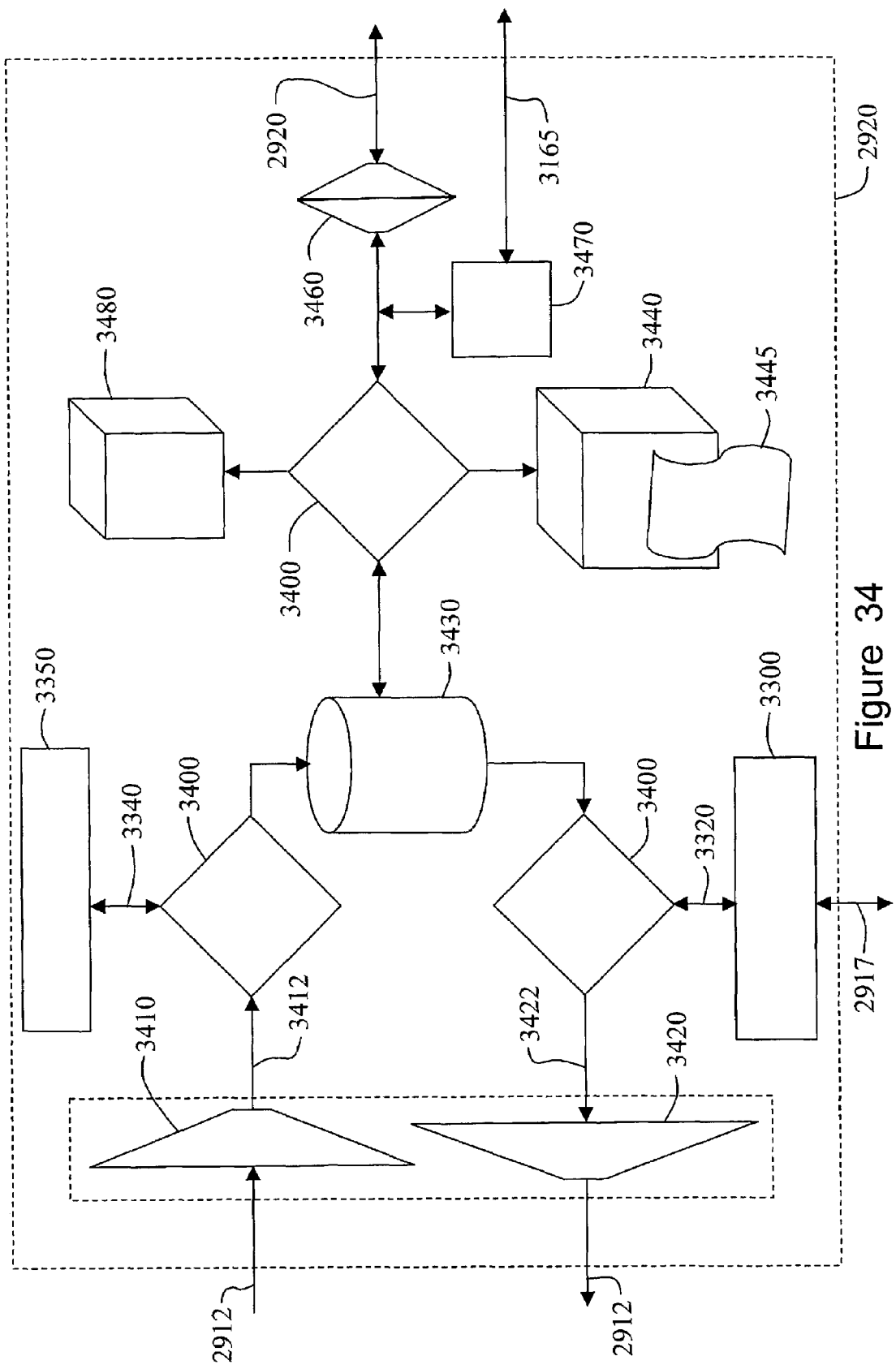
FIG. 34 shows a wireless signaling diagram for performing multilevel functions incorporating features of the present invention that may be required in the proximity authorization process.

In FIG. 34, the legacy proximity units of 3160 include a computer unit 3400 that controls the other legacy proximity units 3160 such as a legacy I/O unit 3470 such as a credit card unit connected to a line 3165 for the data input and a third party communication transceiver unit 3460 connected to a remote authorization site via a line 29 for example.

Upon receipt of a service authorization code, i.e. remote authorization via line 2920, the computer unit 3400 causes a proximity service transaction unit 3480 such as a money dispenser in an ATM system to operate and then the computer unit 3400 notifies a transaction record and reporting unit 3430 to record the transaction for the owner and then the computer unit 3400 may cause a receipt unit 3440 to issue a receipt 3445 to the customer for their records.

Typical legacy POS systems with the legacy features and elements shown in the legacy proximity unit 3160 portion of FIG. 34 can be found in most issues of Business Solutions published monthly by Corry Publishing in Erie Pa.

The wireless adapter element 3180 of the proximity authorization unit 2910, the physical connector unit 3300 and the biometrics input unit 3350 are shown in FIG. 34. In the wireless adapter element 3180 there is both a transmit unit 3420 and a receiver unit 3410 that communicates with the transmitter unit 3150 and receiver unit 3110 respectively via the line 12. The receiver unit 3410 sends data, such as credit card information, PIN data or Service Provider Identification Number (SPIN) in case local authorization is accepted by the proximity service unit 2920, to the legacy system via line 3412 connected to the computer unit 3400. The computer unit 3400 will either accept the data delivered via line 3412 without requiring program modifications (such as credit card data wherein the data is delivered in the same format via line 3412 that the data is delivered to the computer unit 3400 via the legacy I/O unit 3470) or the computer unit 3400 is modified with additional programs being inserted at the time the proximity system owner upgrades their equipment to work with the proximity authorization unit 2910 to allow other forms of service authorizations and or require additional data such as Biometric or POS transactions that require more secure proximity service transaction unit 3480 control.

The additional programs are available from the vendors making the Biometric or POS equipment (see any 1999 monthly issue of Business Solutions published monthly by Corry Publishing in Erie Pa.). A preferred embodiment of the receiver unit 3410 and the transmit unit 3420 operate in the 900 Mhz region, the IR spectrum and 2.4 to 2.5 Ghz frequency ranges which are globally accepted low power signaling types for home and business.

Some of the preferred data communication protocols of the receiver unit 3410 and the transmitter unit 3420 embodiments are WAP and Bluetooth established by major suppliers of proximity Transceiver equipment. Some of the preferred embodiments of improved operating systems to be added to the computer unit 3400 or new computers 3400 if one needs to be added when making the upgrades discussed herein, are Windows CE or Linux.

The preferred embodiment of local authorization software to be incorporated in the proximity service units 2920 is one developed for Web site service providers (see copending application "Proximity Service Provider System", U.S. Ser. No. 60/152,184) and uses private key public key encryption methods wherein the proximity service unit 2910 can compute a special number referred to as a SPIN and output a service authorization code to authorize the proximity service transaction unit 3480 locally when ever the computed SPIN number derived from data received from the customers proximity authorization unit 2910 via receiver unit 3410 matches with a SPIN number stored in the computer unit 34600 periodically inserted by the proximity system owner via the line 29 and the third party transceiver 3460 connected to the computer unit 34600 for example.

The major advantage of local approval is convenience to both the customer and owner or proximity service operator such as a grocery store or hair salon operator. The proximity authorization unit 2910 can operate just like a smart card with the approved credit amount stored in the proximity authorization unit 2910 until transactions are authorized and then data is sent back to the proximity authorization unit 2910 via 3422 to the transmitter unit 34620 from the computer unit 3400 at the same time the transaction is approved locally and recorded in the proximity service unit 2910.

When the transaction data is received in the proximity authorization unit 2910 computer unit 3000 a debit to the remaining approved cash is made and the amount can be checked at any time by the user of the proximity authorization unit 2910 by accessing his account using a predetermined method involving the keyboard described in connection with FIG. 4. However the owner of the proximity authorization unit 2910 can refill their proximity authorization unit 2910 from phones or ATM systems or vending machine systems for example by requesting a remote refill using the third party transceiver unit 3460 connecting to the bank or service provider via line 29 with having to find a special refill station such as an ATM system as required with the Smart Cards in use today.

Figure 35:
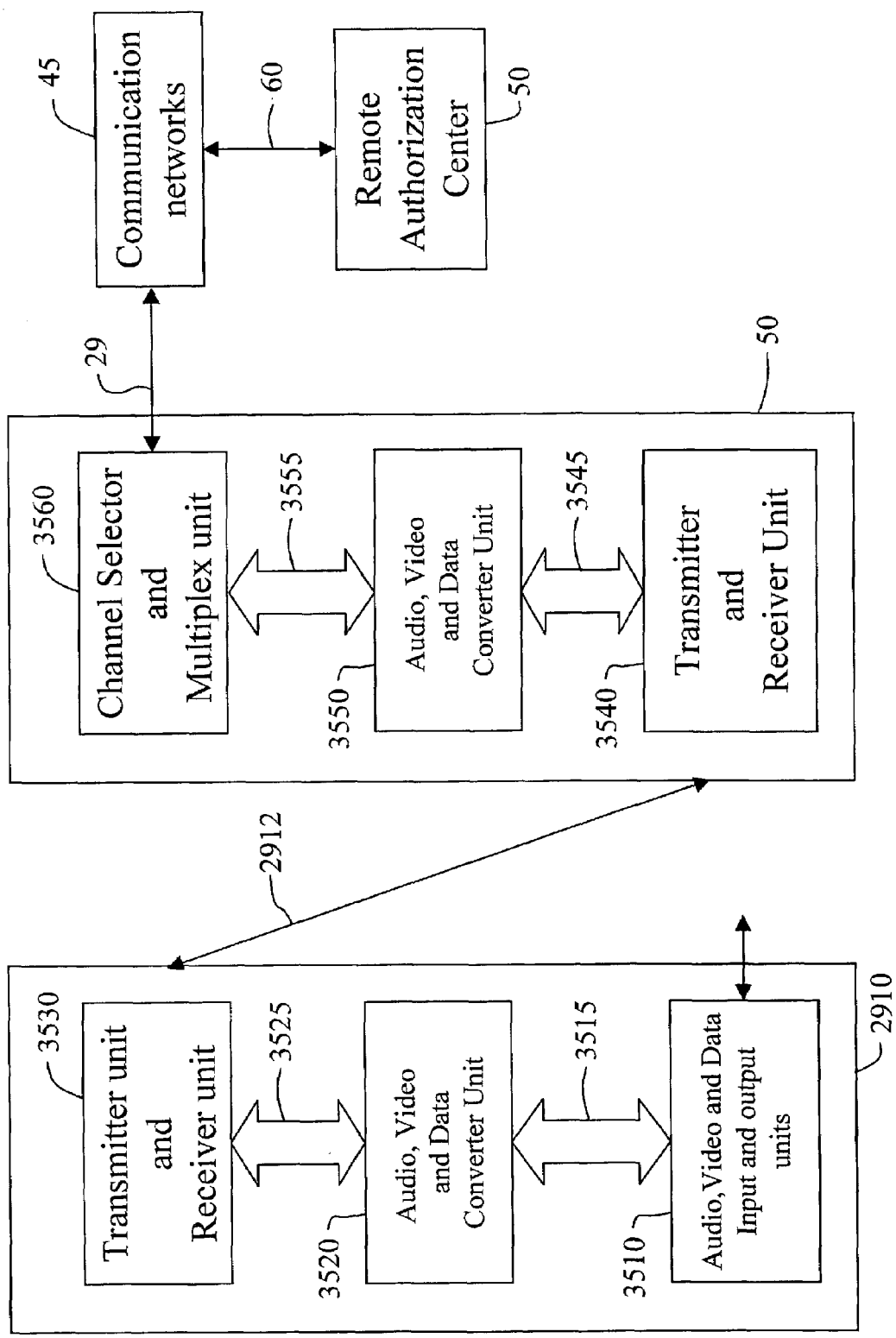
FIG. 35 shows the proximity authorization unit being utilized in combination with the public communication unit shown in FIG. 1 so as to form a pico pay system.

The logic for the proximity authorization unit 2910 communicating with the public communication unit 50 is shown in FIG. 35 wherein multiple proximity authorization units 2910 can communicate simultaneously with the public communication unit 50. The operation of the public communication unit 50 has been described in detail herein and for purposes of brevity this description is incorporated herein by reference.

This feature lets the customers have the convenience of setting down say in an airport, for example, within several hundred feet of the public communication unit 50 has a pico base station wireless unit 3540 (instead of the simpler wireless adapter element 3180 described in connection with FIG. 34) connected to a multiple channel control unit 3450 via 3545 (as part of the added program in the computer unit 34600) connected to a multiplex unit 3560 via line 3555 (such as a T1, unit servicing 24 phones at once) instead of the third party transceiver 3460 as described in connection with FIG. 34.

Thus multiple customers can have the convenience of using their proximity authorization units 2910 with out having to pay for air time when in the vicinity of the public communication unit 50. The elements 3510, 3515, 3520, 3525 and 3530 are similar in construction and function as those elements described in connection with FIGS. 30 and 31.

Figure 36:
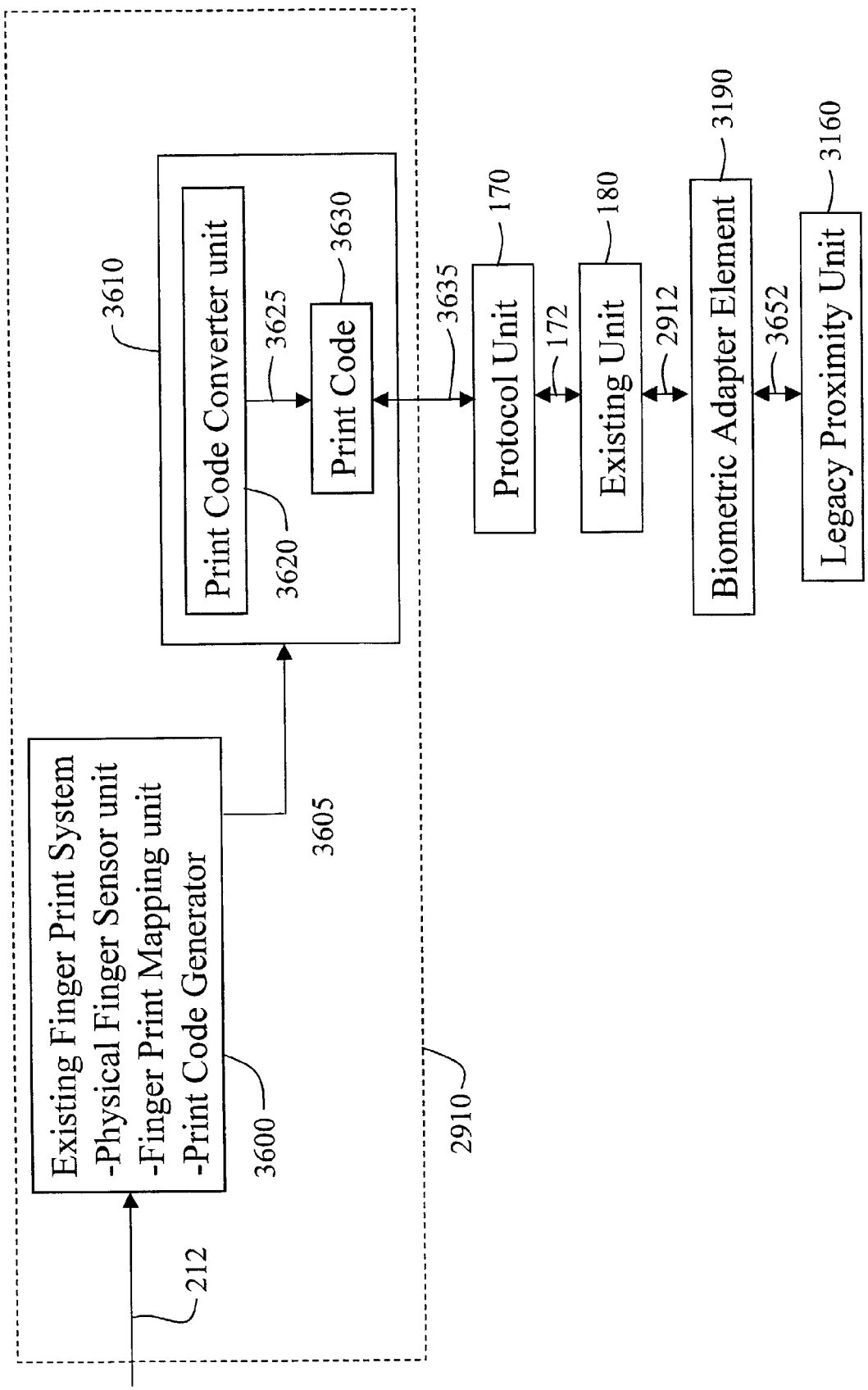
FIG. 36 shows a logic diagram for a biometric unit connecting the proximity authorization unit and the proximity service unit.

In FIG. 36 a more detailed description of how the biometric unit 3025 of the proximity authorization units 2910 interfaces with the computer unit 3400 along with possibly the biometrics adapter element 3190 interfacing in to the same computer unit 3400 in order to greatly reduce fraud and especially to reduce unauthorized entry.

For example many high security access control systems require both finger print and IRIS scan biometrics data from an individual to compare with those stored in a computer data base for the same individual in order to grant access. Thus such proximity access systems would already have the biometric adapter element 3190 connected via connector 3340 (see FIG. 33) to the computer unit 34600 for example along possibly with other access devices interfacing in via legacy I/O unity 3470 for example that might be used by the computer unit 3400 algorithms before access authorization is granted.

Using the SPIN methods described earlier an additional layer (several orders of magnitude actually) of security could be added at access points plus local access authorization could be provided as described with the aid of FIG. 36.

If periodic SPIN numbers were provided to both the proximity authorization unit 2910 computer unit 3000 and the computer unit 3400 of the proximity service unit 2920 wherein the SPIN number provided the proximity authorization unit 2910 computer unit 3000 required the authorized persons biometrics from the unit 3600 for example sent to the biometrics adapter unit 3610 via line 3605 respectively upon signal from the control line 3012 then a biocode converter 3620 would send the biometrics signals conditioned in a predetermined manner via line 3625 to a buffer unit 3630 where the computer control and command bus line 3005 would transfer the signals to the computer unit 3000 to make predetermined encryption calculations.

The predetermined encryption calculations uses the SPIN number for the current period plus the predetermined conditioned biometrics data stored in the buffer unit 3630 to compute a number for transmission to the appropriate proximity service unit 2920 via the appropriate line 12 or 17 to be used in making yet another calculation by the computer unit 3400 of the proximity service unit 2920 using yet another set of biometrics data from biometric adapter element 3190 either sent directly to the computer unit 3400 via connector 3340 or sent to the wireless adapter element 3180 for delivery to the computer unit 3400.

In use, a request authorization code including biometric encrypted data is transmitted from the proximity authorization unit 2910 to the proximity service unit 2920. The user of the proximity authorization unit 2910 then inputs biometric data into the computer unit 3400 of the proximity service unit 2920 via the biometric input unit 3350 and the biometric adapter element 3190, for example.

The computer unit 3400 makes encryption calculations using the biometrics encrypted data sent from the proximity authorization unit 2910 taken at the time authorization is requested plus encryption calculations taken from the biometrics data received from the biometric adapter element 3190 using yet another SPIN number such that if the two calculated numbers differ by some predetermined amount then access is denied.

The predetermined amount of difference in the two calculations can be chosen for the level of security desired. In the manner described both the proximity service unit 2910 and the proximity authorization unit 2920 receive SPIN numbers that use the control centers private key to generate messages involving the master biometrics data base stored at the access control center. However the master biometrics data base for each authorized person only has to be used in generating unique SPIN numbers for each authorized persons and is only transmitted periodically for storage into the proximity 10 units of each authorized person.

But since the same private keys are used in generating messages at both the proximity authorization unit 2910 and the proximity service unit 2920, unless the authorized user generates new biometrics in the proximity authorization unit 2910 at the time entry is requested, the generated numbers will not unlock the necessary numbers generated from the biometrics data taken at the proximity service unit 2920.

Those skilled in the art of encryption methods know that such a method provides security methods much more reliable than those used today.

Figure 37:
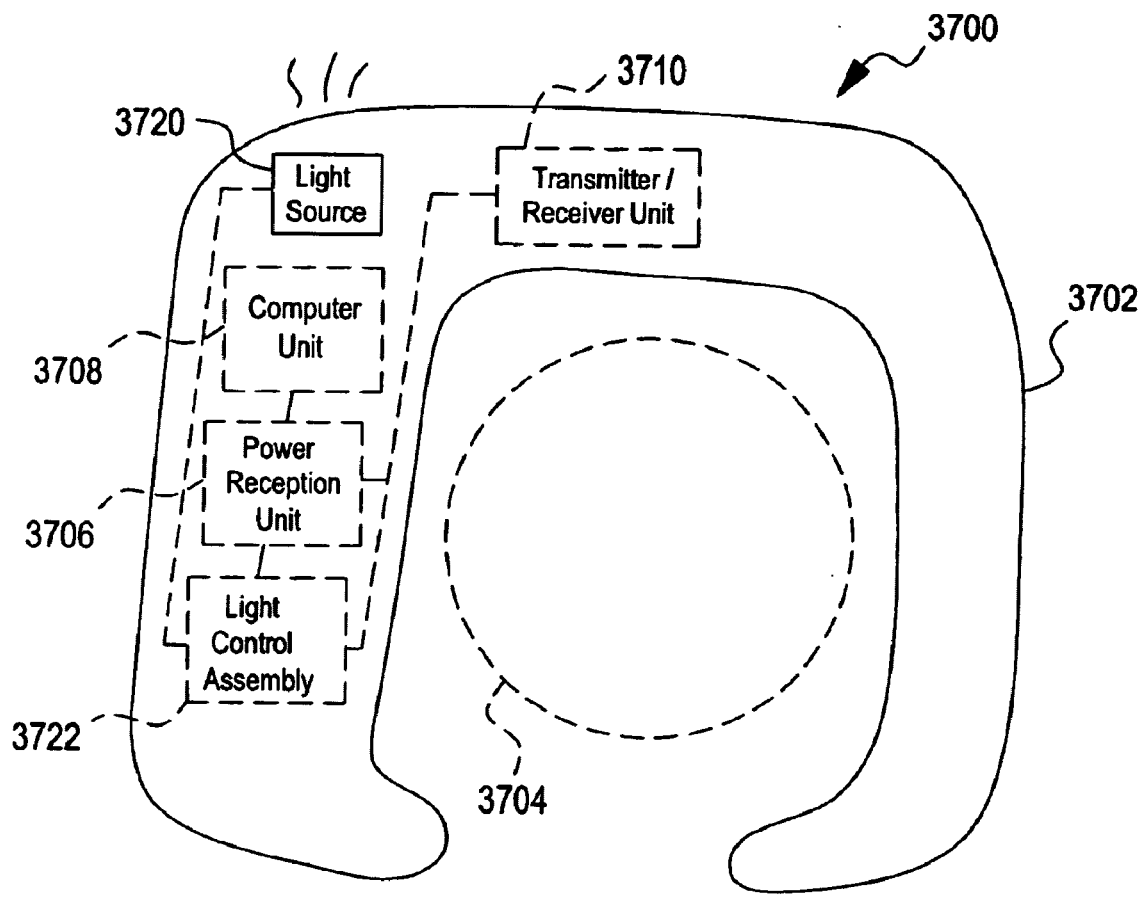
FIG. 37 shows a side elevational view of a proximity authorization unit incorporating features of the present invention with a computer unit, a power reception unit, a light control assembly and a transmitter/receiver unit shown in phantom.

Referring now to FIG. 37, shown therein and designated by the reference numeral 3700 is another embodiment of a proximity authorization unit constructed in accordance with the present invention. The proximity authorization unit 3700 is similar in construction and function to the proximity authorization unit 2910, except as discussed hereinafter. The proximity authorization unit 3700 has a portable housing 3702, which is configured to be worn by an individual. For example, as shown in FIG. 37, the portable housing 3702 can be in the form of a bracelet extendable about a wrist 3704 (shown in phantom) of the individual.

The proximity authorization unit 3700 further comprises a power reception unit 3706 electrically connected to a computer unit 3708, and a transmitter/receiver unit 3710. The computer unit 3708 and the transmitter/receiver unit 3710 is preferably similar in construction and function to the computer unit 2917 and the transmitter receiver unit 3070. The power reception unit 3706 receives a power signal from at least one of the proximity service units 2910, and in response to receiving the power signal, the power reception unit 3706 provides a source of power to the computer unit 3708 and the transmitter/receiver unit 3710 for a period of time sufficient for the computer unit 3708 to retrieve the request authorization code and the transmitter/receiver unit 3710 to output the request authorization code on the first signal and/or the second signal. The power reception unit 3706 can receive the power signal by way of inductive coupling.

The proximity authorization unit 3702 is further provided with at least one light source 3720 (and preferably a plurality of light sources 3720) positioned on the portable housing 3702, and a light control assembly 3722 electrically connected to the light source 3720 for selectively actuating and deactuating the light source for utilitarian or decorative purposes. Only one of the light sources 3720 is shown in FIG. 37 for purposes of clarity.

For example, the power reception unit 3706 can be electrically connected to the light control assembly 3722. Upon reception of the power signal by the power reception unit 3706, the power reception unit 3706 outputs a signal to the light control assembly 3722 to cause the light control assembly 3722 to actuate the light source 3720.

As another example, the transmitter/receiver unit 3710 can receive a service authorization code from at least one of the proximity service units 2910. The service authorization code indicates that the request authorization code has been validated. The light control assembly 3722 receives a signal from the transmitter/receiver unit 3710 in response to the transmitter/receiver unit 3710 receiving the service authorization code so as to cause the light control assembly 3722 to actuate the light source 3720 to indicate to the individual that the request authorization code has been validated.

Alternatively, in accordance with the present invention, rather than having the transmitter/receiver 3710, the power reception unit 3706 and the computer unit 3708, an identifying indicia indicative of a request authorization code, such as a bar code, can be provided on an exterior surface of the portable housing 3702 for scanning by the proximity service unit 2910 in a similar manner as discussed herein.

Figure 38:
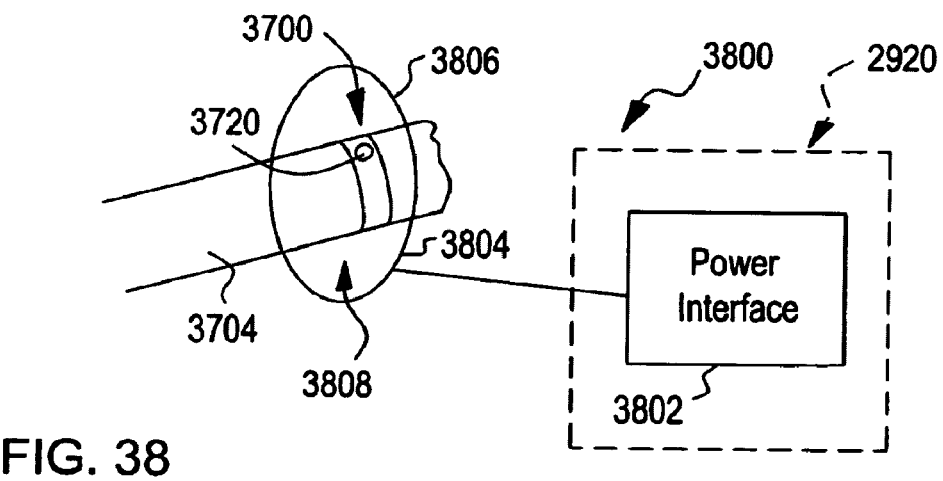
FIG. 38 is a perspective view of a wrist of an individual, having the proximity authorization unit of FIG. 37 disposed thereon, extended through a power antenna for providing a power signal to the power reception unit of the proximity authorization unit.

Referring now to FIG. 38, shown therein is the proximity authorization unit 3700 positioned on the wrist 3704 of the individual. The proximity service unit 2920 can be provided with a power transmitter 3800 for generating and transmitting the power signal to the power reception unit 3706 of the proximity authorization unit 3700.

The power transmitter 3800 is provided with a power interface 3802 and a power antenna 3804. The power interface 3802 generates and transmits the power signal to the power antenna 3804. The power antenna 3804 receives the power signal and transmits the power signal to the power reception unit 3706. As shown in FIG. 38, the power antenna 3804 is preferably configured into a loop 3806 defining an opening 3808 sized to receive the wrist 3704 of the individual. The power transmitter 3800 preferably operates via the techniques of inductive coupling to transmit the power signal to the power reception unit 3706.

It should be understood that the elements of the proximity service unit 2920 other than the power transmitter 3800 have been omitted from FIG. 38 for purposes of clarity.

In use, the individual positions the wrist 3704, upon which the proximity authorization unit 3700 is disposed, through the opening 3808. The power signal is transmitted from the power antenna 3804 to the power reception unit 3706 and the power signal is provided to the computer unit 3708, the transmitter/receiver unit 3710 (and other elements of the proximity authorization unit 3700 which are not shown in FIG. 37 for purposes of clarity). The request authorization code is then transmitted to the proximity service unit 2920 to begin the authorization process. The authorization process has been discussed in detail herein and will not be repeated for purposes of brevity.

What is claimed is:

1. A public communication unit comprising:
    a multiple channel wireless transceiver unit communicating with multiple wireless devices via low-power communication signals, the low-power communication signals including request authorization codes;
    a proximity unit validation assembly validating particular wireless devices based upon the request authorization codes included in the low-power communication signals having valid payment information; and
    a multiplex unit communicating with an Internet, and receiving communication signals from the multiple channel wireless transceiver unit to interface validated wireless devices with the Internet after the proximity unit validation assembly has validated such wireless device.

2. The public communication unit of claim 1, wherein at least some of the low-power communication signals include audio information.

3. The public communication unit of claim 1, wherein at least some of the low-power communication signals include visual information.

4. The public communication unit of claim 1, wherein the multiple channel wireless transceiver unit, further comprises a plurality of wireless transceivers with at least two of the wireless transceivers being adapted to receive different types of low-power communication signals.

5. The public communication unit of claim 4, wherein the different types of low-power communication signals are selected from a group comprising infrared region signals, 900 MHz region signals, 1.8 GHz region signals, and 2.4 GHz region signals.

6. The public communication unit of claim 1, wherein the proximity unit validation assembly accesses a list of authorized codes for validating the request authorization codes.

7. The public communication unit of claim 6, wherein the list of authorized codes are stored in a remote database accessible by the proximity unit validation assembly.

8. The public communication unit of claim 7, wherein the remote database is maintained by an Internet service provider.

9. A pay phone system associated with a proximity service provider for allowing bi-directional data communication between multiple wireless devices and a communication network associated with the proximity service provider when the wireless devices are within a predetermined proximity distance from the pay phone system, the pay phone system comprising:
    a wireless transceiver capable of receiving request authorization codes from the wireless devices, each wireless device being capable of communicating the request authorization code when the wireless device is within a predetermined proximity distance from the wireless transceiver and each request authorization code uniquely identifying the wireless device from which the request authorization code is received;
    a proximity unit validation assembly communicating with the wireless transceiver receiving and validating the plurality of request authorization codes received by the wireless transceiver and outputting a service authorization code in response to each of the request authorization codes having valid payment information; and
    an activation unit receiving the service authorization codes and establishing bi-directional data communication between the communication network and the wireless devices providing the request authorization codes resulting in service authorization codes.

10. The pay phone system of claim 9, wherein the wireless devices communicate with the wireless transceiver via low-power communication signals, and wherein at least some of the low-power communication signals include audio information.

11. The pay phone system of claim 9, wherein the wireless devices communicate with the wireless transceiver via low-power communication signals, and wherein at least some of the low-power communication signals include visual information.

12. The pay phone system of claim 9, wherein the wireless transceiver, further comprises a plurality of wireless transceivers with at least two of the wireless transceivers being adapted to receive different types of low-power communication signals.

13. The pay phone system of claim 12, wherein the different types of low-power communication signals are selected from a group comprising infrared region signals, 900 MHz region signals, 1.8 GHz region signals, and 2.4 GHz region signals.

14. The pay phone system of claim 9, wherein the different types of low-power communication signals are selected from a group comprising infrared region signals, 900 MHz region signals, 1.8 GHz region signals, and 2.4 GHz region signals.

15. The pay phone system of claim 9, wherein the proximity unit validation assembly accesses a list of authorized codes for validating the request authorization codes.

16. The pay phone system of claim 15, wherein the list of authorized codes are stored in a remote database accessible by the proximity unit validation assembly.

17. The pay phone system of claim 16, wherein the remote database is maintained by an Internet service provider.

18. A communication unit connected to a public communication system, the communication unit capable of detecting a plurality of wireless devices and servicing each of the plurality of wireless devices by providing access to the public communication system when the wireless devices are within a predetermined proximity distance from the communication unit, the communication unit comprising:

a multiple channel wireless transceiver unit in communication with a multiplex unit, the multiple channel wireless transceiver unit and the multiplex unit cooperating to receive data from and transmit data to each of the plurality of wireless devices so as to provide access to the public communication system for each of the plurality of the wireless devices when each of the wireless devices is within a predetermined proximity distance from the wireless transceiver, the multiple channel wireless transceiver simultaneously communicating with at least two wireless devices with different types of low power communication signals.

19. The communication unit of claim 18, wherein the public communication system includes the Internet.

* * * * *

UNITED STATES PATENT AND TRADEMARK OFFICE
CERTIFICATE OF CORRECTION

PATENT NO. : 7,110,744 B2 Page 1 of 1
APPLICATION NO. : 10/205097
DATED : September 19, 2006
INVENTOR(S) : Charles C. Freeny, Jr.

It is certified that error appears in the above-identified patent and that said Letters Patent is hereby corrected as shown below:

Column 4, line 53: After ""do not require air time"" delete "!" and replace with -- , --.
Column 5, line 51: Delete "55I" and replace with -- 55L --.
Column 19, line 49: Delete "where" and replace with -- were --.
Column 26, line 12: Delete "person" and replace with -- person's --.
Column 34, line 37: After the number "2910" delete "unit" and after "manually" delete "delivery of" and replace with -- deliver --.
Column 36, line 17: Delete "31310" and replace with -- 3110 --.
Column 38, line 44: Delete "34600" and replace with -- 3400 --.
        line 46: Delete "34600" and replace with -- 3400 --.
Column 38, line 54: Delete "34620" and replace with -- 3420 --.

Signed and Sealed this

Third Day of April, 2007

JON W. DUDAS
*Director of the United States Patent and Trademark Office*